(12) United States Patent
Tange et al.

(10) Patent No.: US 10,101,713 B2
(45) Date of Patent: Oct. 16, 2018

(54) ENERGY ANALYSIS APPARATUS AND RECORDING MEDIUM

(71) Applicant: FUJI ELECTRIC CO., LTD., Kawasaki-shi (JP)

(72) Inventors: Yoshio Tange, Hachioji (JP); Satoshi Kiryu, Machida (JP)

(73) Assignee: FUJI ELECTRIC CO., LTD., Kawasaki-shi, Kanagawa (JP)

( * ) Notice: Subject to any disclaimer, the term of this patent is extended or adjusted under 35 U.S.C. 154(b) by 296 days.

(21) Appl. No.: 15/043,498

(22) Filed: Feb. 12, 2016

(65) Prior Publication Data

US 2016/0161926 A1   Jun. 9, 2016

Related U.S. Application Data

(63) Continuation of application No. PCT/JP2015/051767, filed on Jan. 23, 2015.

(30) Foreign Application Priority Data

Jan. 30, 2014   (JP) .................................. 2014-016170

(51) Int. Cl.
*G05B 13/02* (2006.01)
*G05B 13/04* (2006.01)

(52) U.S. Cl.
CPC .................. *G05B 13/048* (2013.01)

(58) Field of Classification Search
CPC ........ G05B 15/00; G05B 15/02; G05B 17/00; G05B 17/02; G05B 19/00; G05B 19/02; G05B 19/05; G05B 13/04; G05B 13/041; G05B 13/042

USPC ............................................... 700/29–31, 49
See application file for complete search history.

(56) References Cited

U.S. PATENT DOCUMENTS 7,774,173 B2 * 8/2010 Orii .................... G06F 17/50
703/2

FOREIGN PATENT DOCUMENTS

| JP | H11-328239 A | 11/1999 | |
|---|---|---|---|
| JP | 2001-273006 A | 10/2001 | |
| JP | 2004-038618 A | 2/2004 | |
| JP | WO 2014/129470 A1 * | 8/2014 | .............. H02J 3/005 |

OTHER PUBLICATIONS

Wang et al., "An intelligent modeling and analysis method of manufacturing process using the first-order predicate logic", Computer & Industrial Engineering 2009, 56(4), pp. 1559-1565).*

(Continued)

*Primary Examiner* — Hsien Ming Lee
(74) *Attorney, Agent, or Firm* — Rabin & Berdo, P.C.

(57) ABSTRACT

An energy analysis apparatus that analyzes behaviors of a plant. The apparatus includes a processor coupled with a memory device and configured to execute instructions to provide (1) a plant information input unit for accepting inputs of device information indicating device models configuring the plant, and connection information indicating connection between the device models, (2) a plant analysis condition input unit for accepting an input of a plant analysis condition, and (3) a first-order predicate logical expression generation unit for generating a first-order predicate logical expression on the basis of the device information, the connection information and the plant analysis condition.

15 Claims, 53 Drawing Sheets

(56) References Cited

OTHER PUBLICATIONS

Zhang et al, "A semantic study of the first-order predicate logic with uncertainty involved", Fuzzy Optim Decis Making, (2014) 13, pp. 357-367.*

H. Anai et al., "Algorithms of Quantifier Elimination and their Applications—Optimization by Symbolic and Algebraic Methods", University of Tokyo Press, 2011, pp. 214-221.

Y. Tange et al., "Visualization of Optimal Supply and Demand Balance by Quantifer Elimination Approach", Fukuyama, Society of Instrument and Control Engineers, Symposium on Measurement Automated Control Society Control Department, 13th ROMBUN No. 8C2-5.

Yoshio Tange et al., "Visualization of Energy Optimization Problems under Supply and Demand Balance for Energy Saving Pre-verification", The Transactions of the Institute of Electrical Engineers of Japan, C, Jan. 1, 2014 (Jan. 1, 2014), vol. 134, No. 1, pp. 78 to 84.

Y. Tange et al., "Visualization of Optimal Supply and Demand Balance by Quantifer Elimination Approach", Fukuyama, Society of Instrument and Control Engineers, Symposium on Measurement Automated Control Society Control Department, 13th ROMBUN No. 8C2-5, Mar. 2013.

* cited by examiner

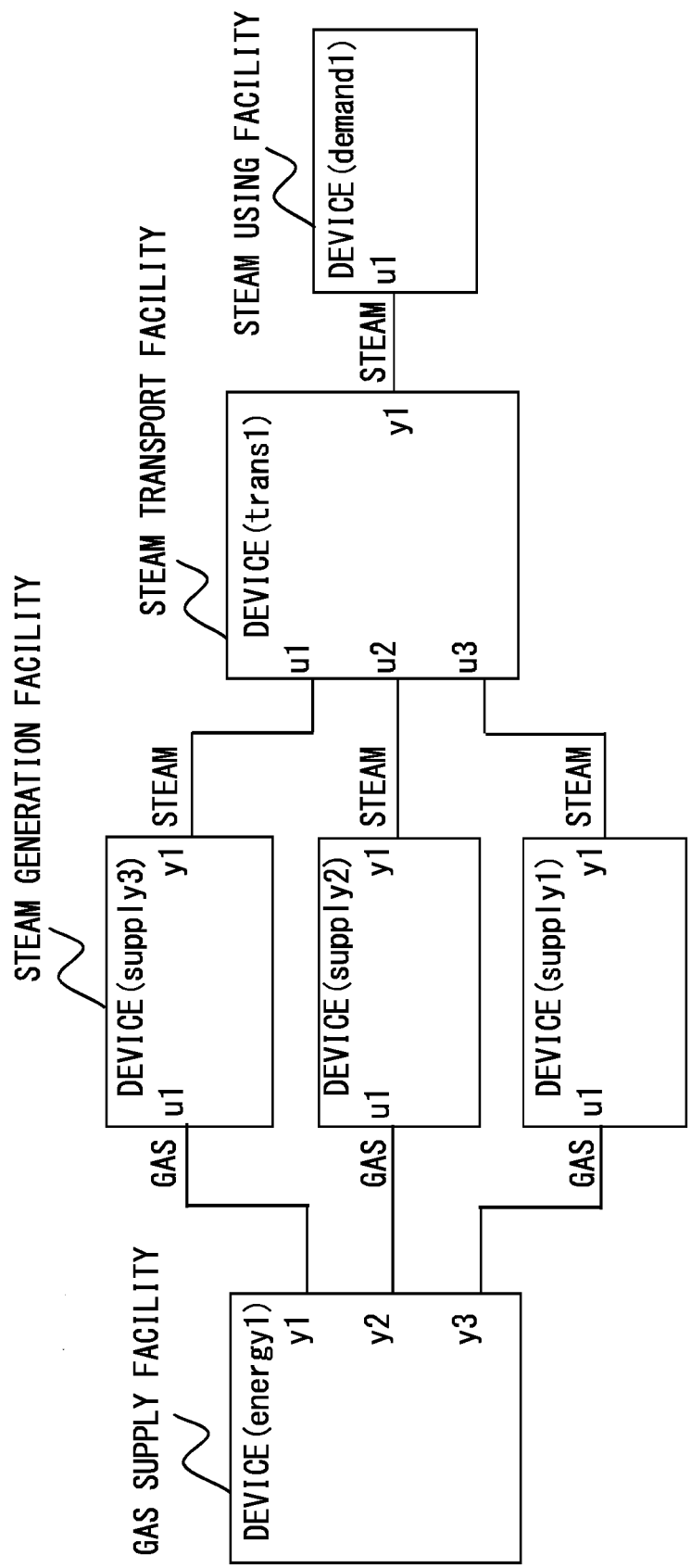
F I G. 2

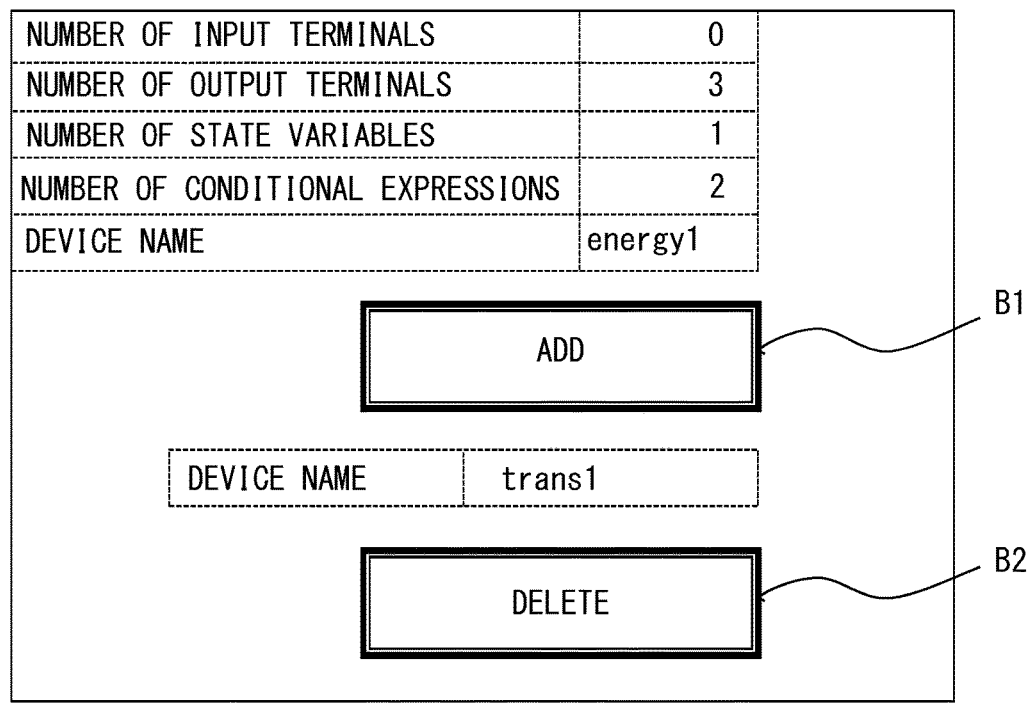
F I G. 4

| DEVICE NAME | energy1 |
|---|---|
| | VARIABLE NAME |
| OUTPUT VARIABLE | y1 |
| OUTPUT VARIABLE | y2 |
| OUTPUT VARIABLE | y3 |
| | VARIABLE NAME |
| STATE VARIABLE | x1 |

| | LEFT SIDE | | RIGHT SIDE |
|---|---|---|---|
| CONDITIONAL EXPRESSION | | | |
| CONDITIONAL EXPRESSION | 0 | = | y1+y2+y3−x1 |

F I G. 5

| CONNECTION NUMBER | CONNECTION SOURCE DEVICE NAME | CONNECTION SOURCE TERMINAL | CONNECTION DESTINATION DEVICE NAME | CONNECTION DESTINATION TERMINAL |
|---|---|---|---|---|
| cnid1 | energy1 | y1 | supply3 | u1 |
| cnid2 | energy1 | y2 | supply2 | u1 |
| cnid3 | energy1 | y3 | supply1 | u1 |
| cnid4 | supply3 | y1 | trans1 | u1 |
| cnid5 | supply2 | y1 | trans1 | u2 |
| cnid6 | supply1 | y1 | trans1 | u3 |
| cnid7 | trans1 | y1 | demand1 | u1 |

F I G. 6

| DEVICE NAME | energy1 | | | |
|---|---|---|---|---|
| RUNNING/STOPPING STATE | CONTINUOUSLY RUNNING | | | |
| OUTPUT VARIABLE<br>OUTPUT VARIABLE<br>OUTPUT VARIABLE | VARIABLE NAME<br>y1<br>y2<br>y3 | | | |
| STATE VARIABLE | VARIABLE NAME<br>x1 | | | |
| CONDITIONAL EXPRESSION OF STOPPING STATE | VALID/INVALID | LEFT SIDE | | RIGHT SIDE |
| CONDITIONAL EXPRESSION | 0:INVALID | 0 | = | |
| CONDITIONAL EXPRESSION OF RUNNING STATE | VALID/INVALID | LEFT SIDE | | RIGHT SIDE |
| CONDITIONAL EXPRESSION | 1:VALID | 0 | = | y1+y2+y3-x1 |

F I G. 1 1

| DEVICE NAME | supply3 | | |
|---|---|---|---|
| RUNNING/STOPPING STATE | SWITCHABLE | | |
| INPUT VARIABLE | VARIABLE NAME | | |
| | u1 | | |
| OUTPUT VARIABLE | y1 | | |
| STATE VARIABLE | VARIABLE NAME | | |
| | x1 | | |
| CONDITIONAL EXPRESSION OF STOPPING STATE | CONDITIONAL EXPRESSION | | |
| | VALID/INVALID | LEFT SIDE | RIGHT SIDE |
| CONDITIONAL EXPRESSION | 1:VALID | 0 = | x1 |
| CONDITIONAL EXPRESSION | 1:VALID | 0 = | u1 |
| CONDITIONAL EXPRESSION | 1:VALID | 0 = | y1 |
| CONDITIONAL EXPRESSION OF RUNNING STATE | CONDITIONAL EPXPRESSION | | |
| | VALID/INVALID | LEFT SIDE | RIGHT SIDE |
| CONDITIONAL EXPRESSION | 1:VALID | 0 >= | x1-100 |
| CONDITIONAL EXPRESSION | 1:VALID | 0 <= | x1-10 |
| CONDITIONAL EXPRESSION | 1:VALID | 0 = | u1- 5*x1 |
| CONDITIONAL EXPRESSION | 1:VALID | 0 = | y1-x1 |

```
ψ :=
∃ energy1_y1(∃ energy1_y2(∃ energy1_y3(          ⎫
∃ supply3_u1(∃ supply3_y1(∃ supply3_x1           ⎬ (1) INFORMATION
...                                              ⎭     FOR ASSIGNING
                                                       QUANTIFIER
(                                                ⎫
( 0 = energy1_y1+energy1_y2+energy1_y3-energy1_x1)  ⎬ (2) CONDITIONAL
)                                                ⎭     EXPRESSION FOR
And                                                    DEVICE energy1
(
  (                              ⎫
  ( 0 = supply3_x1) And          ⎬ (a)
  ( 0 = supply3_u1) And          ⎪
  ( 0 = supply3_y1)              ⎭              ⎫
  )                                              ⎪
  Or                                             ⎬ (3) CONDITIONAL
  (                              ⎫               ⎪    EXPRESSION FOR
  (0 >= supply3_x1-100) And      ⎪               ⎭    DEVICE supply3
  (0 <= supply3_x1-10) And       ⎬ (b)
  ( 0 = supply3_u1- 5*supply3_x1) And ⎪
  ( 0 = supply3_y1-supply3_x1)   ⎭
  )
)
...
( energy1_y1 = supply3_u1) And     ⎫
( energy1_y2 = supply2_u1) And     ⎬ (4) CONDITIONAL
( energy1_y3 = supply1_u1) And     ⎭     EXPRESSION FOR
...                                      CONNECTION INFORMATION
```

| ELIMINATION PRIORITY |
|---|
| 1: HIGHEST |
| 2: SECOND HIGHEST |
| 3: MIDDLE |
| 4: SECOND LOWEST |
| 5: LOWEST |

SELECTS CORRESPONDING ELIMINATION PRIORITY

| DEVICE NAME :energy1 | VARIABLE NAME | QUANTIFIER TYPE | ELIMINATION PRIORITY |
|---|---|---|---|
| VARIABLE | y1 | 1: ∃ | 1:HIGHEST PRIORITY |
| VARIABLE | y2 | 1: ∃ | 1:HIGHEST PRIORITY |
| VARIABLE | y3 | 1: ∃ | 1:HIGHEST PRIORITY |
| VARIABLE | x1 | 0: (INVALID) | 3: MIDDLE |

| DEVICE NAME :supply3 | VARIABLE NAME | QUANTIFIER TYPE | ELIMINATION PRIORITY |
|---|---|---|---|
| VARIABLE | u1 | 1: ∃ | 1: HIGHEST |
| VARIABLE | y1 | 1: ∃ | 1: HIGHEST |
| VARIABLE | x1 | 1: ∃ | 2: SECOND HIGHEST |

F I G. 1 6

F I G. 17

Φ0:=
(
  (
    ( 0 = energy1_y1+energy1_y2+energy1_y3-energy1_x1)
  )
  And
  (
    ( 0 = supply3_x1) And
    ( 0 = supply3_u1) And
    ( 0 = supply3_y1)
  )
  Or
  (
    (0 >= supply3_x1-100) And
    (0 <= supply3_x1-10) And
    ( 0 = supply3_u1- 5*supply3_x1) And
    ( 0 = supply3_y1-supply3_x1)
  )
  ⋮
  (energy1_y1 = supply3_u1) And
  (energy1_y2 = supply2_u1) And
  (energy1_y3 = supply1_u1) And
  ⋮
)

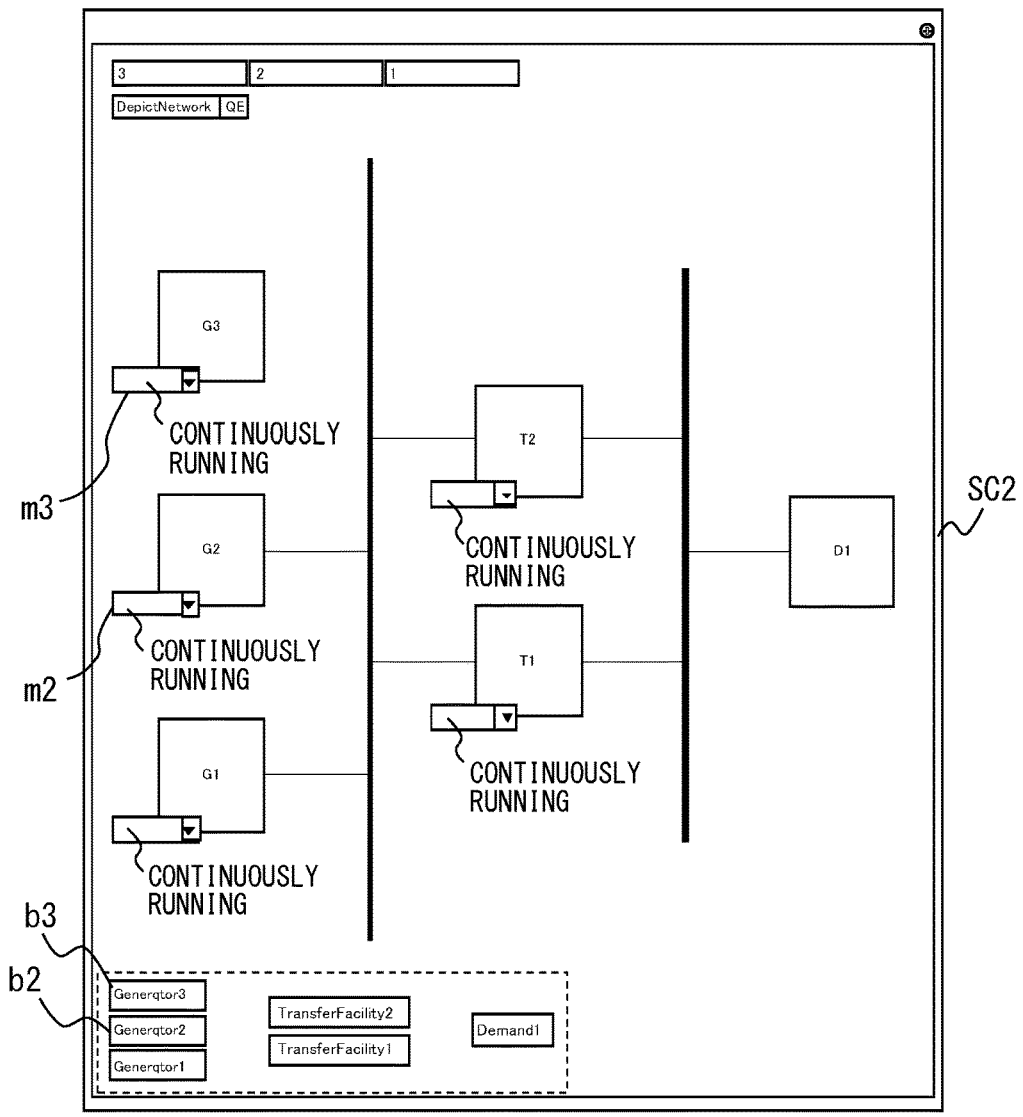
F I G. 20

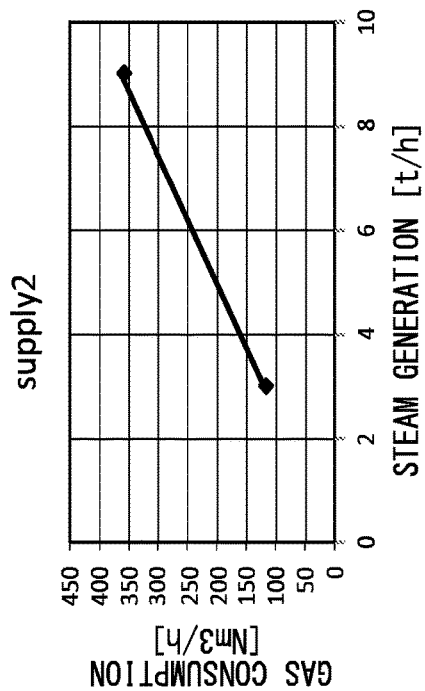
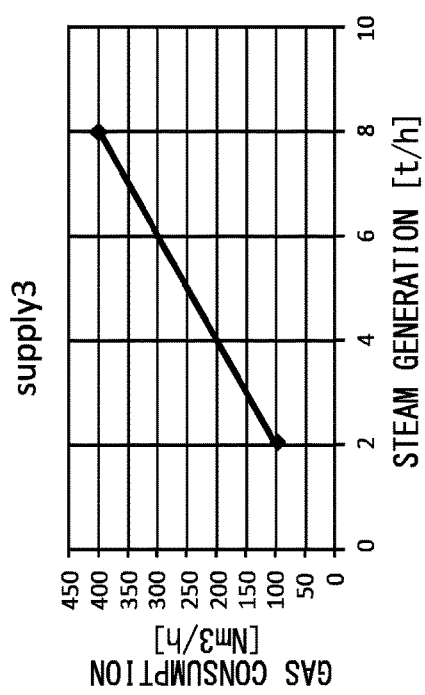
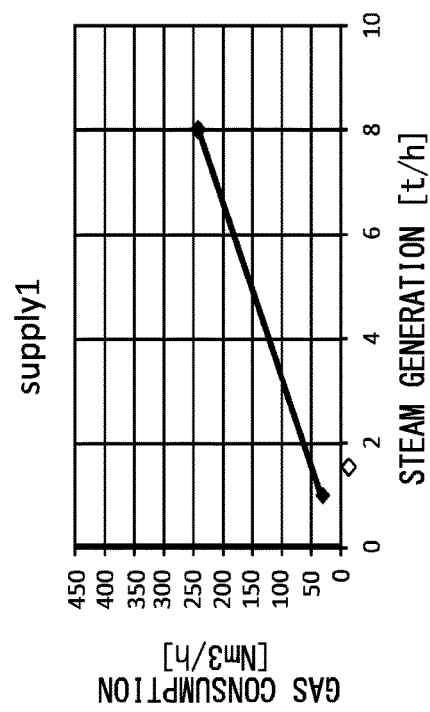
FIG. 23

| DEVICE NAME | energy1 | | | | |
|---|---|---|---|---|---|
| RUNNING/STOPPING STATE | CONTINUOUSLY RUNNING | | | | |
| OUTPUT VARIABLE<br>OUTPUT VARIABLE<br>OUTPUT VARIABLE | VARIABLE NAME<br>y1<br>y2<br>y3 | | | | |
| STATE VARIABLE | VARIABLE NAME<br>x1 | | | | |
| CONDITIONAL EXPRESSION<br>OF STOPPING STATE | VALID/INVALID | LEFT SIDE | | RIGHT SIDE | |
| CONDITIONAL EXPRESSION | 0: INVALID | 0 | = | | |
| CONDITIONAL EXPRESSION<br>OF RUNNING STATE | VALID/INVALID | LEFT SIDE | | RIGHT SIDE | |
| CONDITIONAL EXPRESSION | 1: VALID | 0 | = | y1+y2+y3−x1 | |

F I G. 2 5

| DEVICE NAME | supply3 | | | |
|---|---|---|---|---|
| RUNNING/STOPPING STATE | SWITCHABLE | | | |
| INPUT VARIABLE | VARIABLE NAME | | | |
| | u1 | | | |
| OUTPUT VARIABLE | y1 | | | |
| STATE VARIABLE | VARIABLE NAME | | | |
| | x1 | | | |
| CONDITIONAL EXPRESSION OF STOPPING STATE | VALID/INVALID | LEFT SIDE | | RIGHT SIDE |
| CONDITIONAL EXPRESSION | 1:VALID | 0 | = | x1 |
| CONDITIONAL EXPRESSION | 1:VALID | 0 | = | u1 |
| CONDITIONAL EXPRESSION | 1:VALID | 0 | = | y1 |
| CONDITIONAL EXPRESSION OF RUNNING STATE | VALID/INVALID | LEFT SIDE | | RIGHT SIDE |
| CONDITIONAL EXPRESSION | 1:VALID | 0 | >= | x1-8 |
| CONDITIONAL EXPRESSION | 1:VALID | 0 | <= | x1-2 |
| CONDITIONAL EXPRESSION | 1:VALID | 0 | = | u1- 50*x1 |
| CONDITIONAL EXPRESSION | 1:VALID | 0 | = | y1-x1 |

| CONNECTION NUMBER | CONNECTION SOURCE DEVICE NAME | CONNECTION SOURCE TERMINAL | CONNECTION DESTINATION DEVICE NAME | CONNECTION DESTINATION TERMINAL |
|---|---|---|---|---|
| cnid1 | energy1 | y1 | supply3 | u1 |
| cnid2 | energy1 | y2 | supply2 | u1 |
| cnid3 | energy1 | y3 | supply1 | u1 |
| cnid4 | supply3 | y1 | trans1 | u1 |
| cnid5 | supply2 | y1 | trans1 | u2 |
| cnid6 | supply1 | y1 | trans1 | u3 |
| cnid7 | trans1 | y1 | demand1 | u1 |

| | EVALUATION AXIS 1 | VARIABLE 1 |
|---|---|---|
| CONDITION 1 | EVALUATION AXIS 2 | VARIABLE 2 |
| | ... | |
| | EVALUATION AXIS 1 | VARIABLE 1 |
| CONDITION 2 | EVALUATION AXIS 2 | VARIABLE 2 |
| | ... | |

F I G. 2 8

| CONDITION 1 | x AXIS | VARIABLE 1 |
| | y AXIS | VARIABLE 2 |
| | ... | |
| CONDITION 2 | x AXIS | VARIABLE 1 |
| | y AXIS | VARIABLE 2 |
| | ... | |

FIG. 30

| CONDITION 1 | x AXIS VARIABLE | demand1_x1 |
| | y AXIS VARIABLE | energy1_x1 |

Ψ_1 :=
∃ energy1_y1( ∃ energy1_y2( ∃ energy1_y3(
∃ supply3_y1( ∃ supply3_u1( ∃ supply3_x1          ← (5) INFORMATION Q1 FOR ASSIGNING QUANTIFIER
...
(
  ( 0 = energy1_y1+energy1_y2+energy1_y3-energy1_x1 )    ← (6) CONDITIONAL EXPRESSION M1,1 FOR DEVICE energy1
) And
(
  ((SW_supply3 = 0) And (
    ( 0 = supply3_x1) ) And
    ( 0 = supply3_u1) And
    ( 0 = supply3_y1)
  )
  Or
  ((SW_supply3 = 1) And (
    (0 >= supply3_x1-8) And
    (0 <= supply3_x1-2) And
    ( 0 = supply3_u1- 50*supply3_x1) And
    ( 0 = supply3_y1-supply3_x1)
  )
)                                                         ← (7) CONDITIONAL EXPRESSIONS M1,2 FOR DEVICE supply3
And
( energy1_y1 = supply3_u1) And
( energy1_y2 = supply2_u1) And
( energy1_y3 = supply1_u1) And                            ← (8) CONDITIONAL EXPRESSION FOR CONNECTION INFORMATION
...

FIG. 34

Φ_1:=QE(Ψ_1)
=50*demand1_x1 - energy1_x1 - 190 >= 0 and 50*demand1_x1 - energy1_x1 - 250 <= 0 and 40*demand1_x1 - energy1_x1 - 60 <= 0 and 40*demand1_x1 - energy1_x1 >= 0 and demand1_x1 - 30 <= 0 and demand1_x1 >= 0 or 50*demand1_x1 - energy1_x1 - 50 >= 0 and 50*demand1_x1 - energy1_x1 - 190 <= 0 and 30*demand1_x1 - energy1_x1 + 190 >= 0 and 30*demand1_x1 - energy1_x1 + 70 <= 0 and demand1_x1 - 30 <= 0 and demand1_x1 >= 0 or 40*demand1_x1 - energy1_x1 + 70 >= 0 and 40*demand1_x1 - energy1_x1 <= 0 and 30*demand1_x1 - energy1_x1 + 250 >= 0 and 30*demand1_x1 - energy1_x1 + 190 <= 0 and demand1_x1 - 30 <= 0 and demand1_x1 >= 0 or 40*demand1_x1 - energy1_x1 - 10 >= 0 and 40*demand1_x1 - energy1_x1 - 80 <= 0 and 30*demand1_x1 - energy1_x1 + 90 >= 0 and 30*demand1_x1 - energy1_x1 + 30 <= 0 and demand1_x1 - 30 <= 0 and demand1_x1 >= 0 or 50*demand1_x1 - energy1_x1 - 20 >= 0 and 50*demand1_x1 - energy1_x1 - 160 <= 0 and 30*demand1_x1 - energy1_x1 + 160 >= 0 and 30*demand1_x1 - energy1_x1 + 40 <= 0 and demand1_x1 - 30 <= 0 and demand1_x1 >= 0 or 30*demand1_x1 - energy1_x1 = 0 and demand1_x1 - 30 <= 0 and demand1_x1 - 240 <= 0 or 50*demand1_x1 - energy1_x1 - 30 >= 0 and 50*demand1_x1 - energy1_x1 - 90 <= 0 and 40*demand1_x1 - energy1_x1 + 80 >= 0 and 40*demand1_x1 - energy1_x1 + 20 <= 0 and demand1_x1 - 30 <= 0 and demand1_x1 >= 0 or 40*demand1_x1 - energy1_x1 >= 0 and energy1_x1 = 0 and demand1_x1 - 30 <= 0 and demand1_x1 - 120 >= 0 and energy1_x1 - 360 <= 0 or 50*demand1_x1 - energy1_x1 = 0 and demand1_x1 - 30 <= 0 and demand1_x1 >= 0 and energy1_x1 - 100 >= 0 and energy1_x1 - 400 <= 0 or demand1_x1 = 0 and energy1_x1 = 0

| | DEVICE 1 | RUNNING/STOPPING |
|---|---|---|
| CONDITION 1 | DEVICE 2 | RUNNING/STOPPING |
| | . . . | |
| | DEVICE 1 | RUNNING/STOPPING |
| CONDITION 2 | DEVICE 2 | RUNNING/STOPPING |
| | . . . | |

F I G. 3 6

| CONDITION 2 | x AXIS VARIABLE | demand1_x1 |
|---|---|---|
| | y AXIS VARIABLE | energy1_x1 |
| | supply3 | RUNNING |
| | supply2 | STOPPING |
| | supply1 | RUNNING OR STOPPING |

FIG. 37

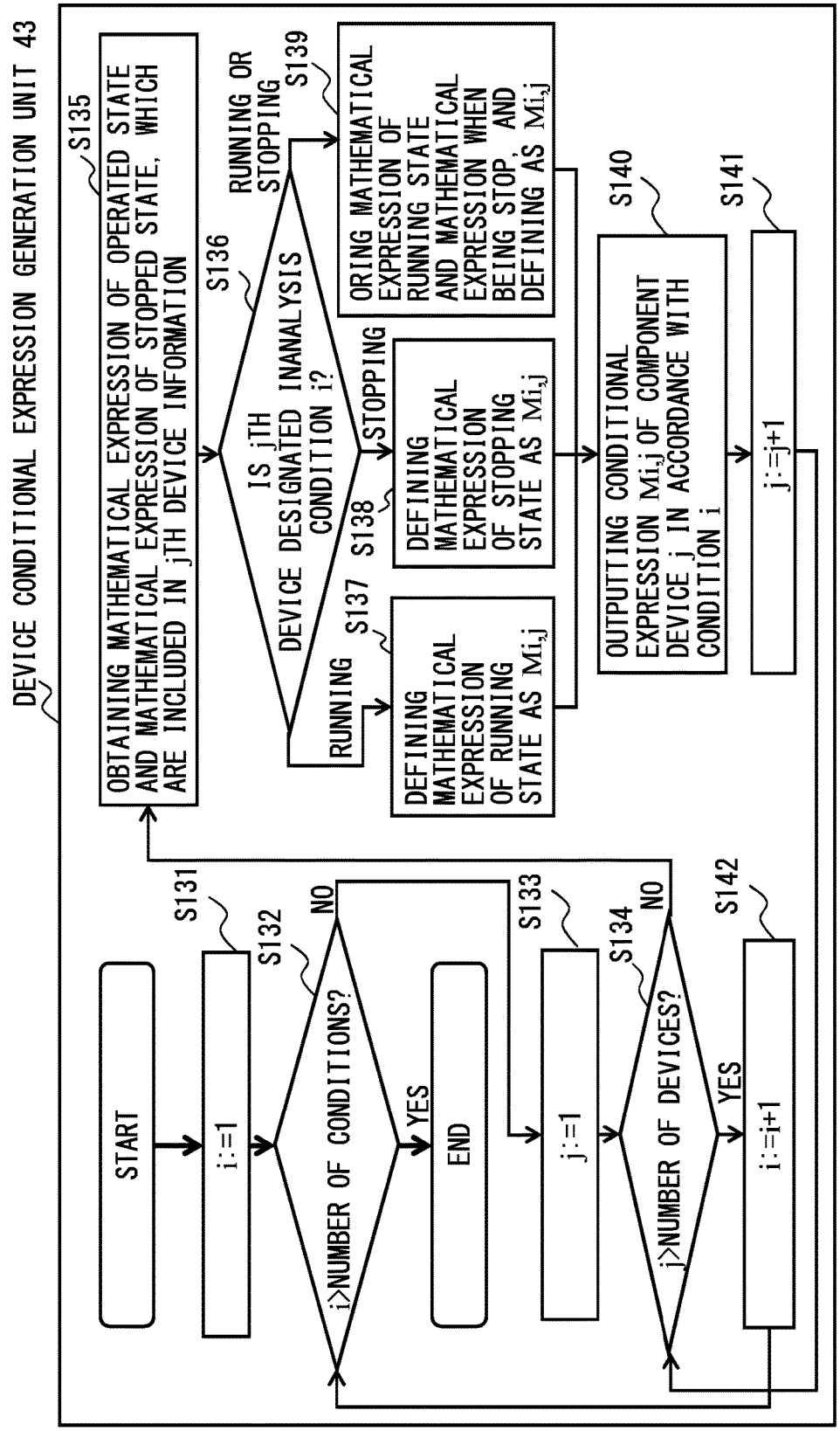
F I G. 3 8

FIG. 40

$\Phi\_2 := QE(\Psi\_2)$
$= 50*\text{demand1\_x1} - \text{energy1\_x1} - 20 >= 0$ and $50*\text{demand1\_x1} - \text{energy1\_x1} - 160 <= 0$ and $30*\text{demand1\_x1} - \text{energy1\_x1} + 160 >= 0$ and $30*\text{demand1\_x1} - \text{energy1\_x1} + 40 <= 0$ and $\text{demand1\_x1} - 30 <= 0$ and $\text{demand1\_x1} >= 0$ or $50*\text{demand1\_x1} - \text{energy1\_x1} = 0$ and $\text{demand1\_x1} - 30 <= 0$ and $\text{demand1\_x1} >= 0$ and $\text{energy1\_x1} - 100 >= 0$ and $\text{energy1\_x1} - 400 <= 0$

| CONDITION 1 | VARIABLE 1 | VALUE 1 |
| | VARIABLE 2 | VALUE 2 |
| | ... | |
| CONDITION 2 | VARIABLE 1 | VALUE 1 |
| | VARIABLE 2 | VALUE 2 |
| | ... | |

FIG. 42

| CONDITION 3 | x AXIS VARIABLE | demand1_x1 |
| | y AXIS VARIABLE | energy1_x1 |
| | VARIABLE 1 | VALUE |
| | supply3_y1 | 8 |

F I G. 4 3

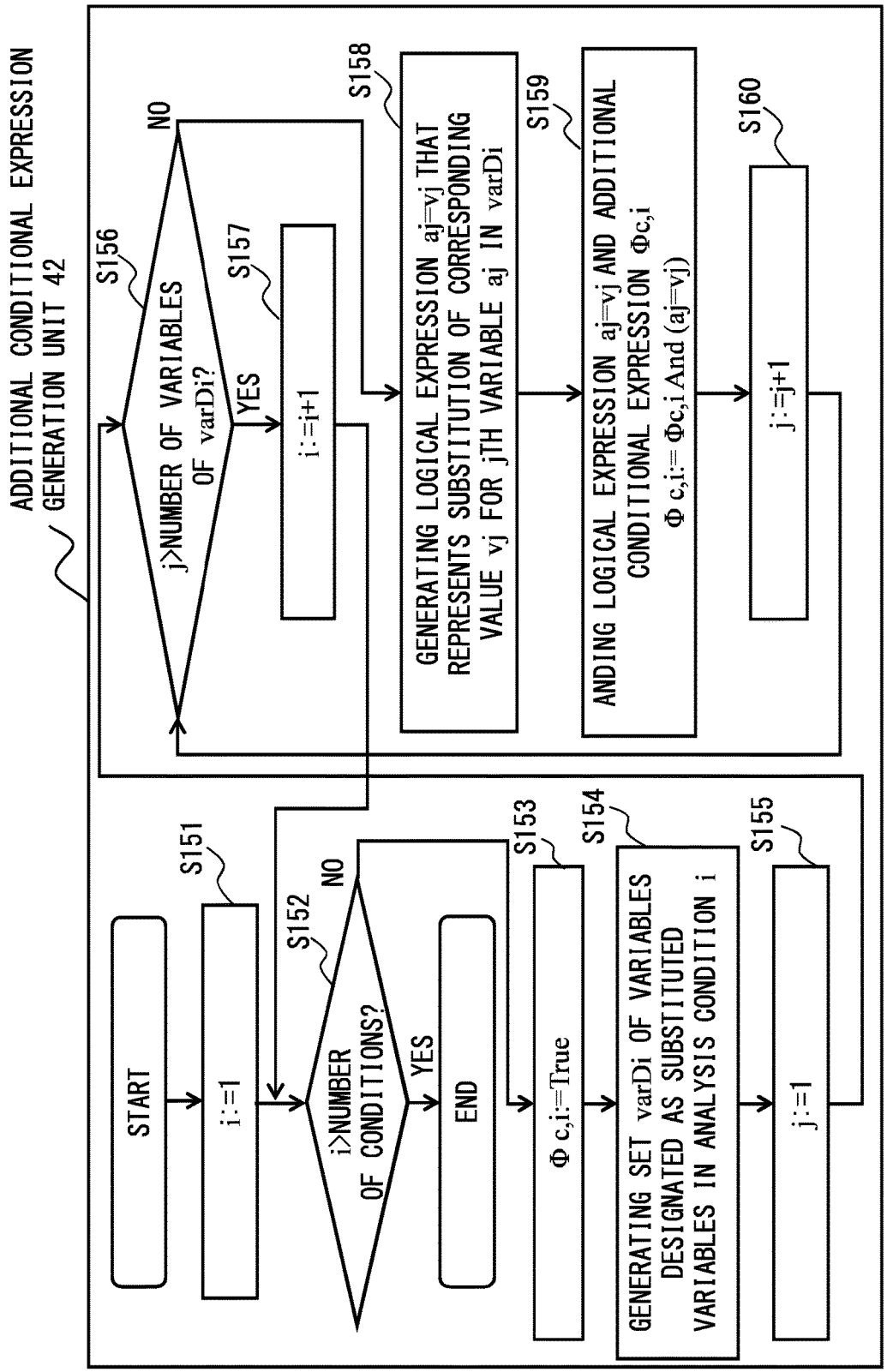
F I G. 44

$\Psi\_3 :=$
$\exists$energy1_y1($\exists$ energy1_y2($\exists$ energy1_y3(
$\exists$supply3_u1($\exists$supply3_y1($\exists$supply3_x1
... ⎫
(                                    ⎬ (14) INFORMATION Q3 FOR ASSIGNING QUANTIFIER
(                                    ⎭
( 0 == energy1_y1+energy1_y2+energy1_y3-energy1_x1)  ⎱ (15) CONDITIONAL EXPRESSION M3,1 FOR DEVICE energy1
)
And
(
((SW_supply3 == 1) And (
  (0 >= supply3_x1-8) And
  (0 <= supply3_x1-2) And
  (0 == supply3_u1 - 50*supply3_x1) And
  (0 == supply3_y1-supply3_x1)
)                                   ⎱ (16) CONDITIONAL EXPRESSION M3,2 FOR DEVICE supply3
)
...
And
( energy1_y1 == supply3_u1) And
( energy1_y2 == supply2_u1) And     ⎱ (17) CONDITIONAL EXPRESSION FOR CONNECTION INFORMATION
( energy1_y3 == supply1_u1) And
...
And (supply3_y1 == 8)     ⎱ (18) ADDITIONAL CONDITIONAL EXPRESSION Φc,3

F I G. 4 5

$\Phi\_3 := QE(\Psi\_3)$
$= -40*demand1\_x1 - energy1\_x1 - energy1\_x1 + 70 >= 0$ and $40*demand1\_x1 - energy1\_x1 <= 0$ and $30*demand1\_x1 - energy1\_x1 + 250 >= 0$ and $30*demand1\_x1 - energy1\_x1 + 190 <= 0$ and $demand1\_x1 - 30 <= 0$ and $demand1\_x1 >= 0$ or $30*demand1\_x1 - energy1\_x1 + 160 = 0$ and $demand1\_x1 - 30 <= 0$ and $demand1\_x1 >= 0$ and $energy1\_x1 - 430 >= 0$ and $energy1\_x1 - 640 <= 0$ or $40*demand1\_x1 - energy1\_x1 + 80 = 0$ and $demand1\_x1 - 30 <= 0$ and $demand1\_x1 >= 0$ and $energy1\_x1 - 520 >= 0$ and $energy1\_x1 - 760 <= 0$ or $demand1\_x1 - 8 = 0$ and $energy1\_x1 - 400 = 0$

F I G. 4 6

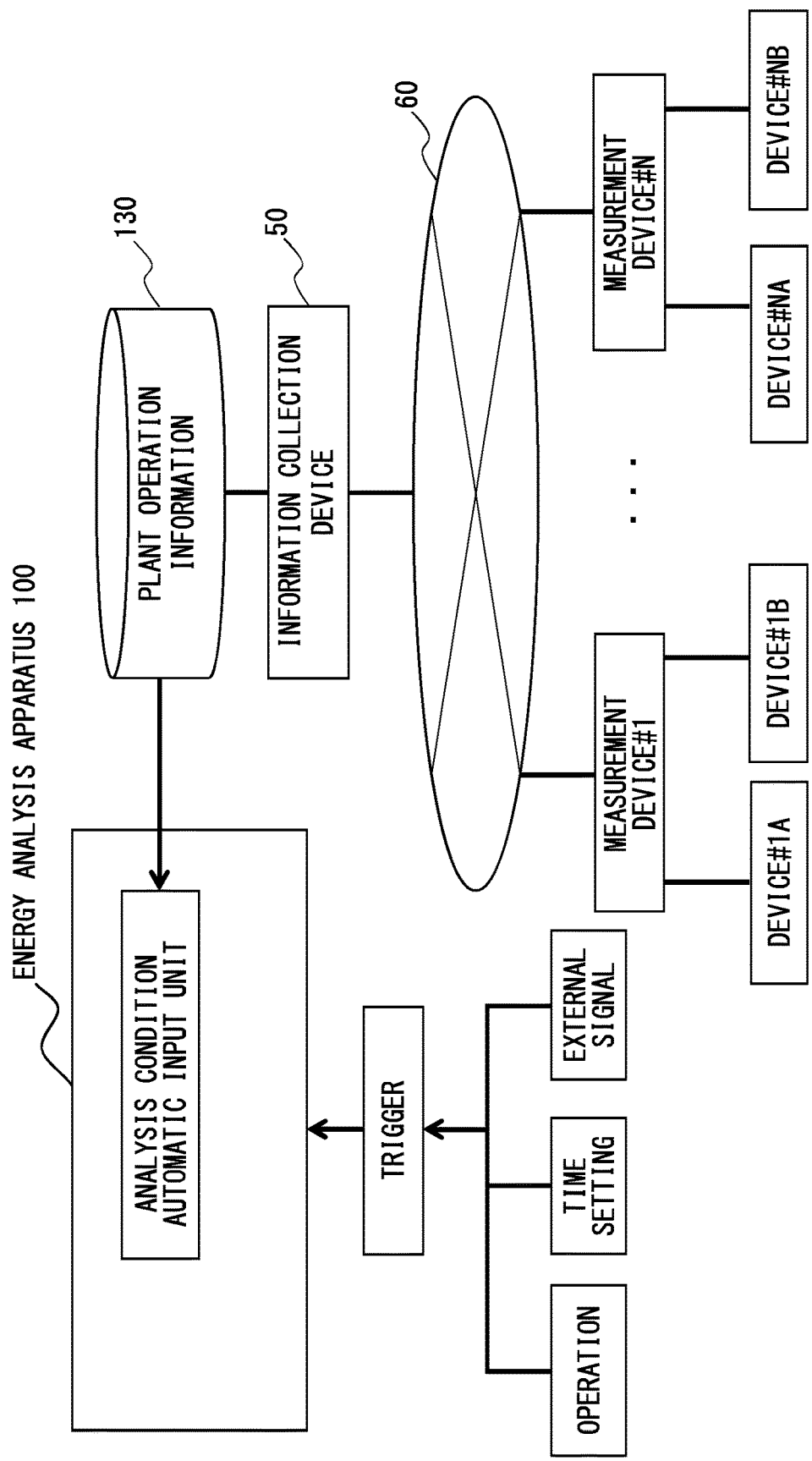
F I G. 5 0

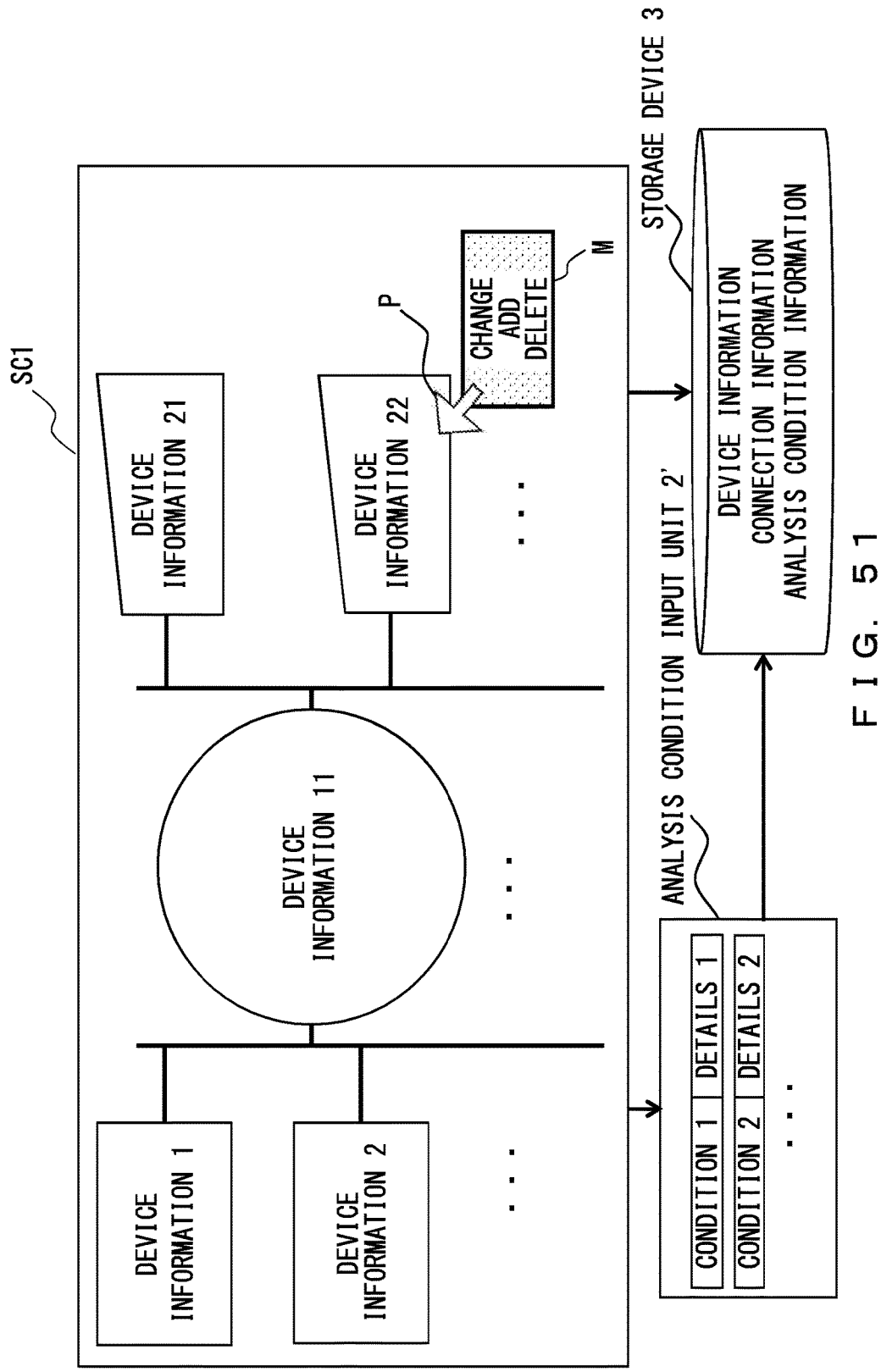
F I G. 5 1

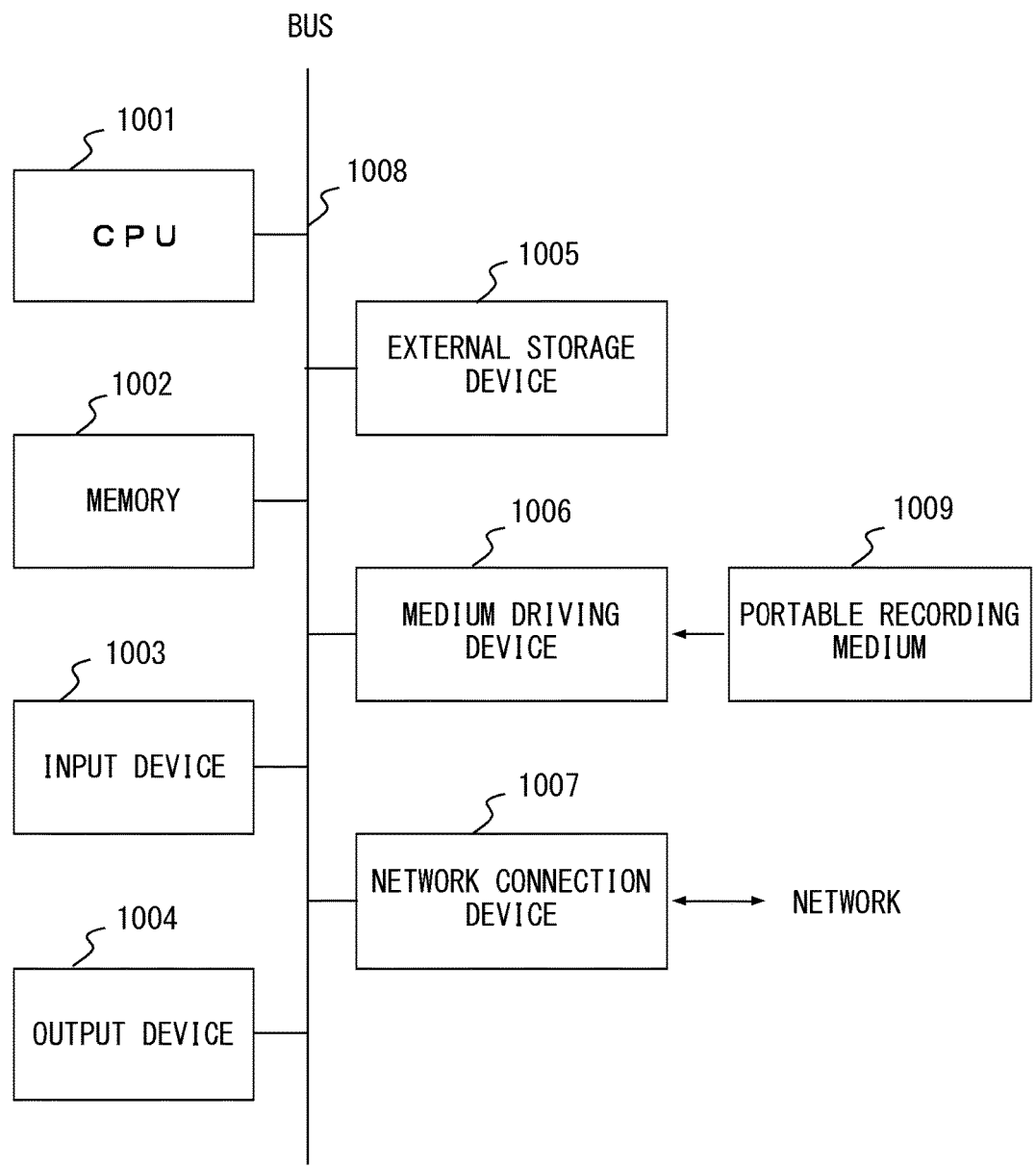
F I G. 5 2

ENERGY ANALYSIS APPARATUS AND RECORDING MEDIUM

CROSS REFERENCE TO RELATED APPLICATIONS

This application is based upon and claims the benefit of priority of the prior Japanese Patent Application No. 2014-016170, filed on Jan. 30, 2014, the entire contents of which are incorporated herein by reference.

This is a Continuation application of PCT Application No. PCT/JP2015/051767, filed on Jan. 23, 2015, which was not published under PCT Article 21(2) in English.

BACKGROUND OF THE INVENTION

Field of the Invention

The present invention relates to a technique for assisting an analysis of behaviors of an energy plant including supply facilities that supply energy such as electricity, gas, heat or the like, and a consumption facility that performs air-conditioning, uses steam, and drains or delivers water, or the like by consuming the energy.

Description of the Related Art

For example, as disclosed by Japanese Laid-open Patent Publication No. 2001-273006, a technique for simulating behaviors of a plant on the basis of characteristics and a system diagram of component devices of the plant, and for performing an energy analysis in the use of the plant that consumes energy when being operated is conventionally known.

According to the technique disclosed by Japanese Laid-open Patent Publication No. 2001-273006, device objects that define basic setting values of component devices of an energy plant are accumulated for an operation evaluation system of the energy plant the operations of which are evaluated. Then, plant system diagram using the device objects are drawn, and setting values of component devices of the plant, and a connection relationship between the devices are extracted from the drawn plant system diagram, and are converted into a plant model. The plant model is used as an indicator with which the plant is evaluated and optimally operated.

Additionally, for example, as disclosed by "Algorithms of Quantifier Elimination and their Applications-Optimization by Symbolic and Algebraic Methods", H. Anai, K. Yokoyama, University of Tokyo Press, 2011, pp. 214-221, a technique for expressing a problem such as a system control, a circuit analysis or the like by using a first-order predicate logical expression, and for optimizing the system by solving the first-order predicate logical expression is also known.

Specifically, a first-order predicate logical expression is obtained with a combination of a quantifier represented as a universal quantifier ($\forall$) or an existential quantifier ($\exists$), and a logical expression obtained by merging multi-variable polynomial equations and inequalities with the use of a logic symbol represented as a product ($\wedge$) or a sum ($\vee$). A variable bound with a quantifier among variables that appear in a logical expression is called a bound variable, while a variable that is not bound with a quantifier is called a free variable. A logical expression to be satisfied by free variables is derived by eliminating bound variables in a first-order predicate logical expression, so that the system is optimized.

For example, Japanese laid-open Patent Publication No. HEI11-328239 also discloses, as a known technique, a technique for performing a control system design and a control system analysis with the use of a quantifier elimination method. With this technique, a control system analysis/design apparatus formulates constraints of an input control problem into a linear matrix inequality (LMI) or a bilinear matrix inequality (BMI). Then, constraints, represented as an LMI or a BMI, of design specifications or the like are transformed into a constraint formed by ORing inequalities, so that a control system is converted into a first-order predicate logical expression. Then, the control system is analyzed on the basis of the expression from which variables assigned a quantifier are eliminated.

For example, as disclosed by "Visualization of Optimal Supply and Demand Balance by Quantifer Elimination Approach", Y. Tange, S. Kiryu, T. Matsui, Y. Fukuyama, Society of Instrument and Control Engineers, Symposium on Measurement Automated Control Society Control Department, 13th ROMBUN No. 8C2-5, a technique for analyzing the energy of a plant is also known. With this technique, a first-order predicate logical expression is generated, and an energy analysis can be performed by solving the first-order predicate logical expression.

As described above, the technique for analyzing behaviors of a plant by generating a first-order predicate logical expression and by solving the expression with a quantifier elimination method is a known technique. However, operations for setting a first-order predicate logical expression are not easy in general unless a user is an expert. Namely, with this conventional technique, a user needs to write a target problem by using a first-order predicate logical expression, and to determine how to assign a quantifier to each variable. Accordingly, it is difficult for a user who has no expertise to use the method of analyzing behaviors of a plant by generating a first-order predicate logical expression and solving the expression, although this is helpful means for an analysis.

Additionally, there is a demand for evaluating a plant in each of various cases assumed when the plant is evaluated. Examples of such cases are where a comparison is made between a case where a facility is operated and a case where the facility is stopped, a comparison is made between a case where an operation state of a facility is fixed and a case where the operation state is varied, a comparison is made between a case where the capability of a facility is not changed and a case where the capability is changed, and a comparison is made between a case of the current operation state of a plant and a case of a predicted future state.

SUMMARY OF THE INVENTION

The present invention provides a technique for supporting various cases of plant evaluations of a user, and for easily performing an energy analysis based on a first-order predicate logical expression that is normally regarded as being difficult.

An energy analysis apparatus in one aspect of the present invention is an energy analysis apparatus that analyzes behaviors of a plant by using, as inputs, device models configuring the plant, and information indicating connection between the device models of the plant. The apparatus includes a processor coupled with a memory device and configured to execute instructions to provide:

a plant information input unit for accepting inputs of device information indicating the device models, and connection information indicating connection between the device models;

a plant analysis condition input unit for accepting an input of a plant analysis condition; and a first-order predicate logical expression generation unit for generating a first-order predicate logical expression on the basis of the device information, the connection information and the plant analysis condition.

A recording medium in another aspect of the present invention is a non-transitory recording medium on which a program is stored for causing an information processing device to execute an energy analysis process for analyzing behaviors of a plant by using, as inputs, device models configuring the plant, and connection between the device models of the plant. The program including:

instructions to accept inputs of device information indicating the device models, and connection information indicating connection between the device models;

instructions to accept an input of a plant analysis condition; and instructions to generate a first-order predicate logical expression on the basis of the device information, the connection information and the plant analysis condition.

An energy analysis apparatus in a further aspect of the present invention is an energy analysis apparatus for analyzing behaviors of a plant by using, as inputs, device models configuring the plant, and connection between the device models of the plant. The apparatus includes a processor coupled with a memory device and configured to execute instructions to provide:

a plant information input unit for accepting inputs of device information indicating the device models, and connection information indicating connection between the device models, the device information including at least one variable;

a quantifier information input unit for accepting an input of quantifier information associated with a type of a quantifier, for each variable included in the device information;

a storage unit for storing the device information, the accepted connection information and the accepted quantifier information, which are inputs via the plant information input unit and the quantifier information input unit; and a first-order predicate logical expression generation unit for generating a first-order predicate logical expression on the basis of the device information, the connection information and the quantifier information, which are read from the storage unit.

A recording medium in a still further aspect of the present invention is a non-transitory recording medium on which a program is stored for causing an information processing device to execute an energy analysis process for analyzing behaviors of a plant by using, as inputs, device models configuring the plant, and connection between the device models of the plant. The program includes:

instructions to accept inputs of device information indicating the device models, and connection information indicating connection between the device models;

instructions to accept an input of quantifier information associated with a type of a quantifier to be assigned, for each variable included in the device information, the device information including at least one variable;

instructions to store the input device information, the connection information and the quantifier information; and instructions to generate a first-order predicate logical expression on the basis of the stored device information, connection information and quantifier information.

BRIEF DESCRIPTION OF THE DRAWINGS

The present invention will be more apparent from the following detailed description when the accompanying drawings are referenced.

FIG. 2 illustrates a configuration example of a plant to be analyzed in the first embodiment.

FIG. 4 is an explanatory diagram of a method for performing a registration or the like of device information by a device information input unit of the plant information input unit in the first embodiment.

FIG. 5 is an explanatory diagram of a method for registering variables and conditional expressions of device information by a device information input unit of the plant information input unit in the first embodiment.

FIG. 6 is an explanatory diagram of a method for performing a registration or the like of connection information by connection information input unit of the plant information input unit in the first embodiment.

FIG. 11 is an explanatory diagram (No. 1) of a method for registering variables and conditional expressions of device information by the device information input unit of the plant information input unit in the second embodiment.

FIG. 12 is an explanatory diagram (No. 2) of the method for registering variables and conditional expressions of device information by the device information input unit of the plant information input unit in the second embodiment.

FIG. 14 illustrates a first-order predicate logical expression generated by the first-order predicate logical expression generation unit.

FIG. 16 is an explanatory diagram of a method for registering quantifier information by a quantifier information input unit in the third embodiment.

FIG. 17 illustrates an example of a logical expression that represents behaviors of a plant.

FIG. 20 illustrates an example of a screen created on the basis of information registered in a storage device via the screen of FIG. 19.

FIG. 23 illustrates a relationship between the steam generation and the gas consumption when steam generation facilities included in the plant configuration of FIG. 22 respectively generate steam.

FIG. 25 is an explanatory diagram of a method for registering variables and conditional expressions of device information by the plant information input unit in the fifth embodiment.

FIG. 26 is an explanatory diagram of a method for registering variables and conditional expressions of the device information by the plant information input unit in the fifth embodiment.

FIG. 27 is an explanatory diagram of a method for registering connection information by the plant information input unit in the fifth embodiment.

FIG. 28 is an explanatory diagram of a method for registering analysis condition information by an analysis condition input unit in the fifth embodiment.

FIG. 30 illustrates an example of analysis condition information in the fifth embodiment.

FIG. 31 illustrates a specific example of an analysis condition i (i=1).

FIG. 33 illustrates a first-order predicate logical expression generated by the first-order predicate logical expression generation unit.

FIG. 34 illustrates a logical expression obtained by applying a quantifier elimination algorithm to the first-order predicate logical expression of FIG. 33.

FIG. 36 illustrates an example of analysis condition information in a sixth embodiment.

FIG. 37 illustrates a specific example of an analysis condition i (i=2).

FIG. 38 illustrates a flow of operations of a device conditional expression generation unit.

FIG. 40 illustrates a logical expression obtained by applying the quantifier elimination algorithm to the first-order predicate logical expression of FIG. 39.

FIG. 42 illustrates an example of analysis condition information in a seventh embodiment.

FIG. 43 illustrates a specific example of an analysis condition i (i=3).

FIG. 44 illustrates a flow of operations of an additional conditional expression generation unit.

FIG. 45 illustrates a first-order predicate logical expression generated by the first-order predicate logical expression generation unit.

FIG. 46 illustrates a logical expression obtained by applying the quantifier elimination algorithm to the first-order predicate logical expression of FIG. 45.

FIG. 50 is an explanatory diagram of an energy analysis method according to a ninth embodiment.

FIG. 51 illustrates an example of a screen displayed on a monitor or the like displayed by a plant configuration display unit in an energy analysis apparatus according to a tenth embodiment.

FIG. 52 illustrates a configuration of an information processing device.

DESCRIPTION OF THE EMBODIMENTS

Embodiments according to the present invention are described in detail below with reference to the drawings.

First Embodiment

Figure 1:
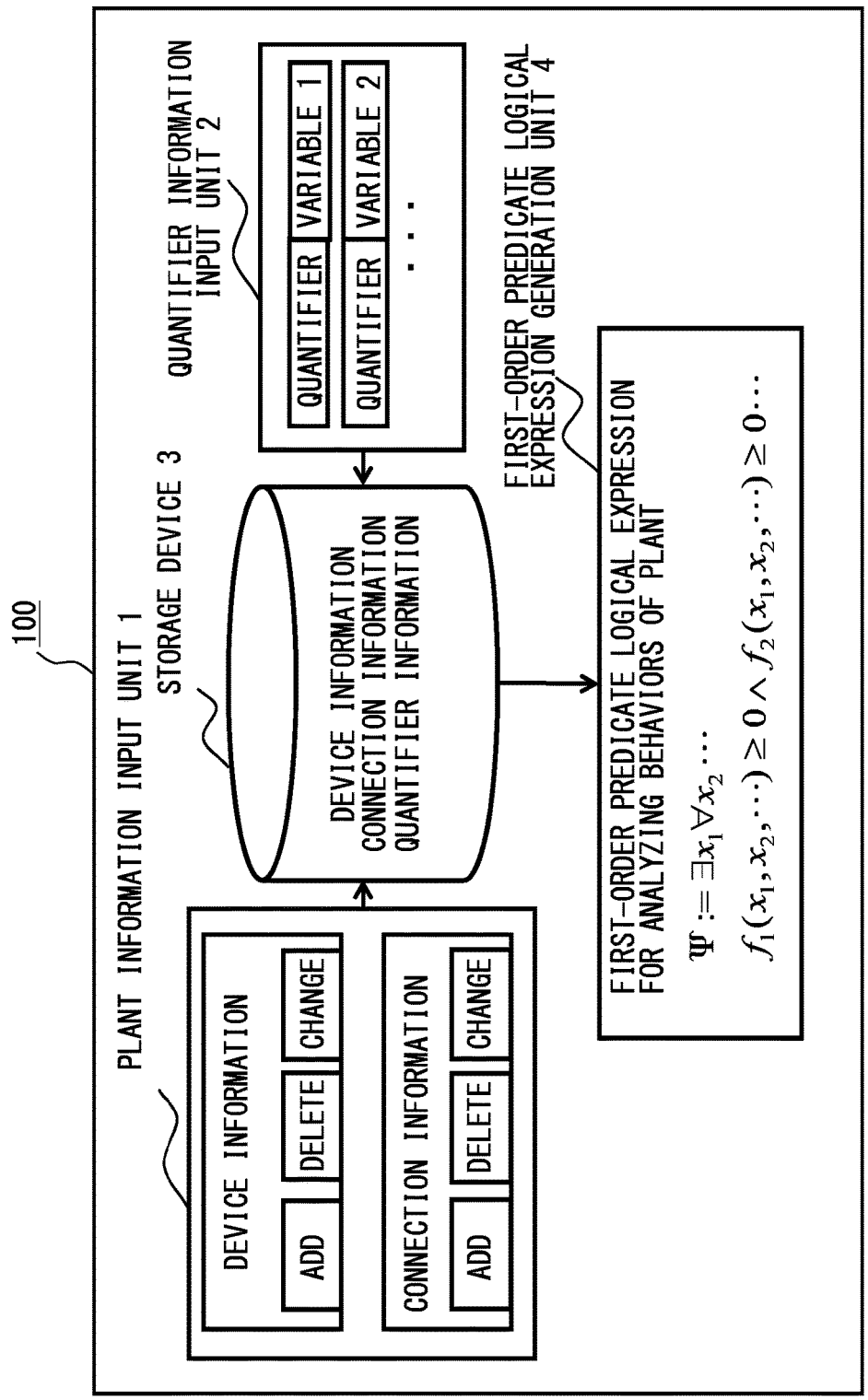
FIG. 1 illustrates a configuration of an energy analysis apparatus according to a first embodiment.

FIG. 1 illustrates a configuration of an energy analysis apparatus according to a first embodiment. The energy analysis apparatus illustrated in FIG. 1 includes a plant information input unit 1, a quantifier information input unit 2, a storage device 3 and a first-order predicate logical expression generation unit 4.

The energy analysis apparatus of FIG. 1 is an apparatus for assisting a user in analyzing behaviors of an energy plant including a supply facility that supplies energy such as electricity, gas, heat or the like, and a consumption facility that performs air-conditioning, uses steam, and drains or delivers water by using the energy. The energy analysis apparatus 100 may be configured with a general-purpose information processing device, or as a general-purpose information processing system where general-purpose information processing devices are interconnected.

The plant information input unit 1 accepts an input of information indicating device models that configure a plant, and an input of information indicating connection between the device models. In the following description, the information indicating device models that configure a plant and the information indicating connection between the device models are respectively referred to as "device information" and "connection information". Details of the device information and the connection information will be described in detail with reference to FIGS. 4 to 6.

The quantifier information input unit 2 accepts inputs of quantifiers to be respectively assigned to variables included in the device information and the connection information, and inputs of information of various items of information about the quantifiers. In the following description, quantifiers and the information about the quantifiers, which are accepted by the quantifier information input unit 2, are referred to as "quantifier information".

The storage device 3 stores the information accepted by the plant information input unit 1 and the quantifier information input unit 2.

The first-order predicate logical expression generation unit 4 generates a first-order predicate logical expression that represents behaviors of a plant on the basis of the device information, the connection information and the quantifier information, which are stored in the storage device 3. For explanatory purposes, how to specifically generate a first-order predicate logical expression will be described in detail later with reference to FIG. 8.

On the basis of a configuration of a plant to be analyzed, a user inputs device information and connection information to the energy analysis apparatus 100 of FIG. 1 via the plant information input unit 1, and also inputs quantifier information to the energy analysis apparatus 100 of FIG. 1 via the quantifier information input unit 2. The energy analysis apparatus 100 accepts the device information, the connection information and the quantifier information, which have been input by the user via the plant information input unit 1 and the quantifier information input unit 2, and registers the information in the storage device 3. Then, the energy analysis apparatus 100 generates a first-order predicate logical expression that represents the behaviors of the plant in the first-order predicate logical expression generation unit 4 by using the registered information. The generated first-order predicate logical expression is solved with a known quantifier elimination algorithm or the like, and the user analyzes energy consumption and the like of the plant on the basis of the obtained expression.

A configuration example of the plant to be analyzed is described with reference to FIG. 2 prior to an explanation of operations of components that configure the energy analysis apparatus 100 according to this embodiment.

FIG. 2 illustrates a configuration example of the plant to be analyzed used to explain the operations of the components of the energy analysis apparatus in this embodiment.

In the configuration example illustrated in FIG. 2, gas is supplied from one gas supply facility to three steam generation facilities. The steam generation facilities respectively generate steam by using the gas. The steam generated by the steam generation facilities is supplied to a steam using facility via one steam transport facility, and is used by the steam using facility.

A method for accepting inputs of the above described device information, connection information and quantifier information of the plant having the configuration illustrated in FIG. 2 is described with reference to FIGS. 3 to 7.

Figure 3:
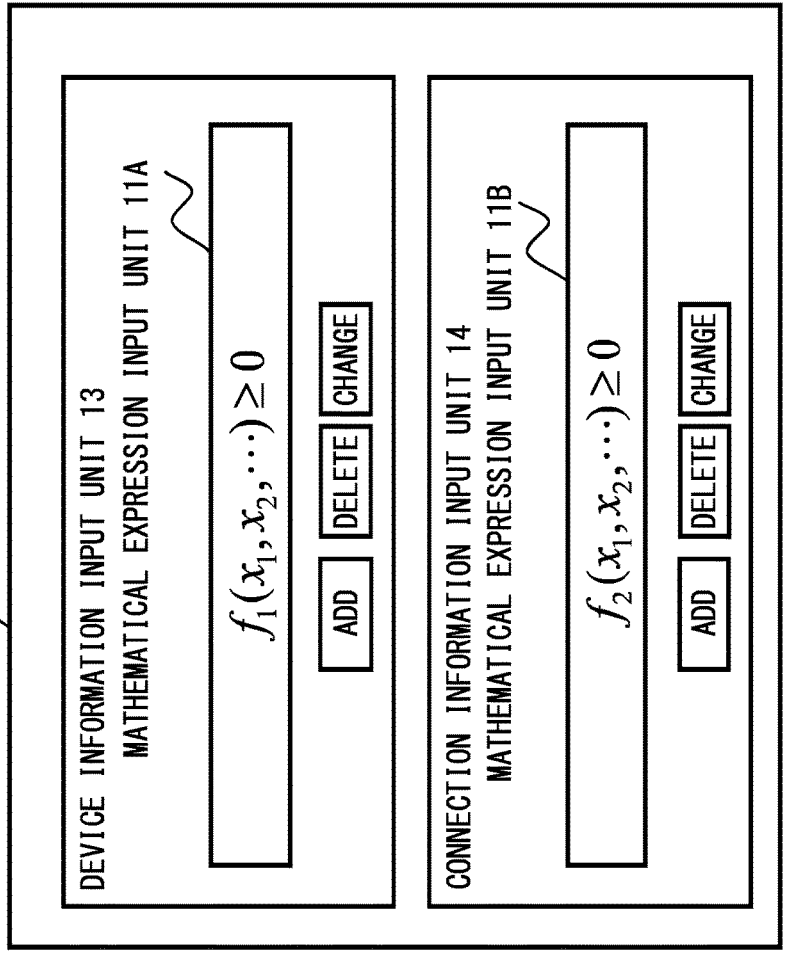
FIG. 3 illustrates an example of a configuration of a plant information input unit in the first embodiment.

FIG. 3 illustrates an example of the configuration of the plant information input unit 1 in this embodiment. In this embodiment, the plant information input unit 1 includes a device information input unit 13 and connection information input unit 14 as illustrated in FIG. 3. The device information input unit 13 and the connection information input unit 14 respectively include a mathematical expression input unit 11 (11A, 11B).

The device information input unit 13 and the connection information input unit 14 are provided so that a user can add, delete or change a device model and connection relationship to, from or in the storage device 3. The user registers device models illustrated in the configuration example of the plant illustrated in FIG. 2 by adding six facilities via the device information input unit 13. Moreover, the user registers seven connection relationships between the facilities to the storage device 3 via the connection information input unit 14.

The mathematical expression input unit 11 includes a mathematical expression input unit 11a for device information, and a mathematical expression input unit 11B for connection information. When the device information input unit 13 and the connection information input unit 14 have registered the device information and the connection information, the mathematical expression input unit 11A and the mathematical expression input unit 11B accept inputs of conditional expressions respectively included in the device information and the connection information.

How to accept an input of device information by means of the plant information input unit 1 is further described with reference to FIG. 4 and the like.

FIG. 4 is an explanatory diagram of a method for performing a registration or the like of device information by the device information input unit 13 of the plant information input unit 1 according to this embodiment. FIG. 4 illustrates an example of a screen displayed on display means such as a monitor or the like of the energy analysis apparatus when a registration or the like of the device information is performed.

FIG. 4 illustrates an example of the screen displayed when a gas supply facility (energy1) in the plant configuration illustrated in FIG. 2 is newly added to the storage device 3. A user inputs, to the device information input unit 13, a device name, the number of input terminals, the number of output terminals, the number of state variables and the number of conditional expressions so as to newly add device information of a device model, and presses an "add" button B1.

This example is configured so that an addition of new device information can be accepted when the add button B1 is pressed after the number of input terminals "0", the number of output terminals "3", the number of state variables "1" and the number of conditional expressions "2" have been input in addition to the device name "energy1", as illustrated in FIG. 4. However, the configuration is not limited to this one. For example, this embodiment can be configured so that the addition of device information can be accepted only with a device name, and other entries such as the number of input terminals and the like can then be input.

Additionally, when device information that is already registered in the storage device 3 is deleted, a user inputs a device name desired to be deleted, and presses a "delete" button B2. The example of FIG. 4 illustrates a case where the user desires to delete the device information of the steam transport facility among the device information already registered in the storage device 3. In this case, the user inputs a device name "trans1" of the steam transport facility to the device information input unit 13, and presses the "delete" button B2, so that the energy analysis apparatus 100 deletes the corresponding device information in the storage device 3.

For device information newly registered in the storage device 3 via the screen illustrated in FIG. 4, it is necessary to further register information such as variables, conditional expressions and the like in the storage device 3. Moreover, even if variables and conditional expressions of device information have been completely registered, the need for changing a variable or a conditional expression can arise. This case is described with reference to FIG. 5.

FIG. 5 is an explanatory diagram of a method for registering variables and a conditional expression of device information by the device information input unit 13 of the plant information input unit 1 in this embodiment. FIG. 5 illustrates an example of a screen on which variables and a conditional expression are further input for the gas supply facility (the gas supply facility having a device name "energy1") of FIG. 4, which is registered via the device information input unit 13. The screen of FIG. 5 is displayed, for example, when a "complete" button (not illustrated) is pressed after the plant information input unit 1 recognizes that needed information has been input on the screen of FIG. 4, or when the plant information input unit 1 recognizes that a "change" button (see FIGS. 1 and 3) has been pressed.

As illustrated in FIG. 5, a user individually inputs the variables and the conditional expression of the device information in accordance with information set in the registration illustrated in FIG. 4. Namely, the user specifically inputs the variables and the conditional expression in accordance with the number of input terminals, the number of output terminals, the number of state variables and the number of conditional expressions, which are designated on the screen illustrated in FIG. 4.

In the example illustrated in FIG. 4, the number of input terminals is "0", and the gas supply facility of FIG. 2 has no input terminals. Therefore, variables are not set. Since the gas supply facility outputs (supplies) gas respectively to the three steam generation facilities (supply1 to supply3), "y1", "y2" and "y3" are set for the number of output terminals "3". For the number of state variables "1", "x1" is set.

For the conditional expression, an expression "0=y1+y2+y3−x1" that represents a relationship among the variables y1 to y3 and x1, which have been set as described above, is accepted via the mathematical expression input unit 11A of FIG. 3, and is stored in the storage device 3.

To improve operability, a user may be caused to input only a right side of a conditional expression, and to select a left side in a pull-down menu. When such a configuration is employed, "0≥" "0>", "0=", "0<", "0≤" and "0≠" are prepared for the pull-down menu of the left side.

How to accept an input of connection information by means of the plant information input unit 1 is further described with reference to FIG. 6.

FIG. 6 is an explanatory diagram of a method for performing a registration or the like of connection information by the connection information input unit 14 of the plant information input unit 1 in this embodiment. FIG. 6 illustrates an example of a screen displayed on the display means such as a monitor or the like of the energy analysis apparatus 100 when a registration or the like of the connection information is performed.

FIG. 6 illustrates an example of the screen in a stage where all the pieces of information that indicate connection relationship between devices of the plant configuration illustrated in FIG. 2 have been input. The connection information includes a connection number, a connection source device name, a connection source terminal, a connection destination device name and a connection destination terminal.

The connection number is information for uniquely identifying connection information. As the connection source device name and the connection source terminal, a name of a device at a supply source of energy, and a variable indicating an output terminal are set. As the connection destination device name and the connection destination terminal, a name of a device at a supply destination of energy, and a variable indicating an input terminal are set.

For example, the output y1 of the gas supply facility (energy1) is connected to an input u1 of each of the three steam generation facilities (supply1 to supply3). The information of connection with the steam generation facility supply1 in a topmost stage is identified with a connection number "cnid1", and "energy1" and "y1" are respectively set as the connection source device name and the connection source terminal. As the connection destination device name and the connection destination terminal, "supply1" and "u1" are set. As connection between other devices, a device name and (a variable indicating) a terminal of the plant configuration illustrated in FIG. 2 are similarly set.

How to accept an input of quantifier information in the quantifier information input unit 2 illustrated in FIG. 1 is described next with reference to FIG. 7.

Figure 7:
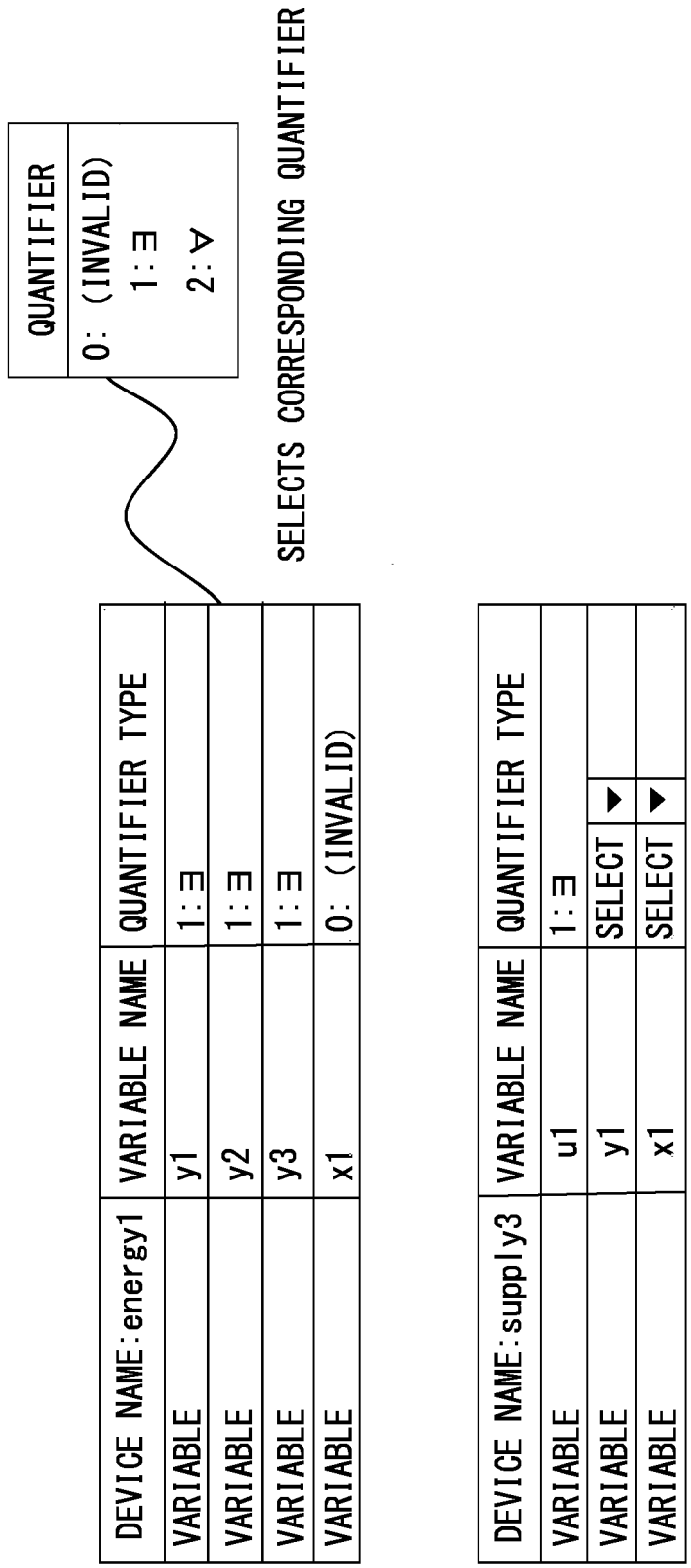
FIG. 7 is an explanatory diagram of a method for registering quantifier information by a quantifier information input unit in the first embodiment.

FIG. 7 is an explanatory diagram of a method for registering quantifier information by the quantifier information input unit 2 in this embodiment. FIG. 7 illustrates an example of a screen displayed on the display means such as a monitor or the like of the energy analysis apparatus 100 when quantifier information is registered.

As illustrated in FIG. 7, the quantifier information includes a variable name and a quantifier type, which are included in device information or connection information, in association with a device name. As the device name, a device name registered as device information is set. As the variable name, a variable name set, for example, via the screen illustrated in FIG. 5 is set. As the quantifier type, any of an existential quantifier (∃) a universal quantifier (∀) and "not set" selected by a user is set. A user selects a quantifier suitable for each variable, for example, via a pull-down menu illustrated in FIG. 7.

When the device information, the connection information and the quantifier information have been registered in the storage device 3 as described above, the first-order predicate logical expression generation unit 4 of the energy analysis apparatus 100 according to this embodiment generates a first-order predicate logical expression that represents behaviors of a plant by using information registered in the storage device 3. Operations of the first-order predicate logical expression generation unit 4 are described with reference to FIG. 8.

Figure 8:
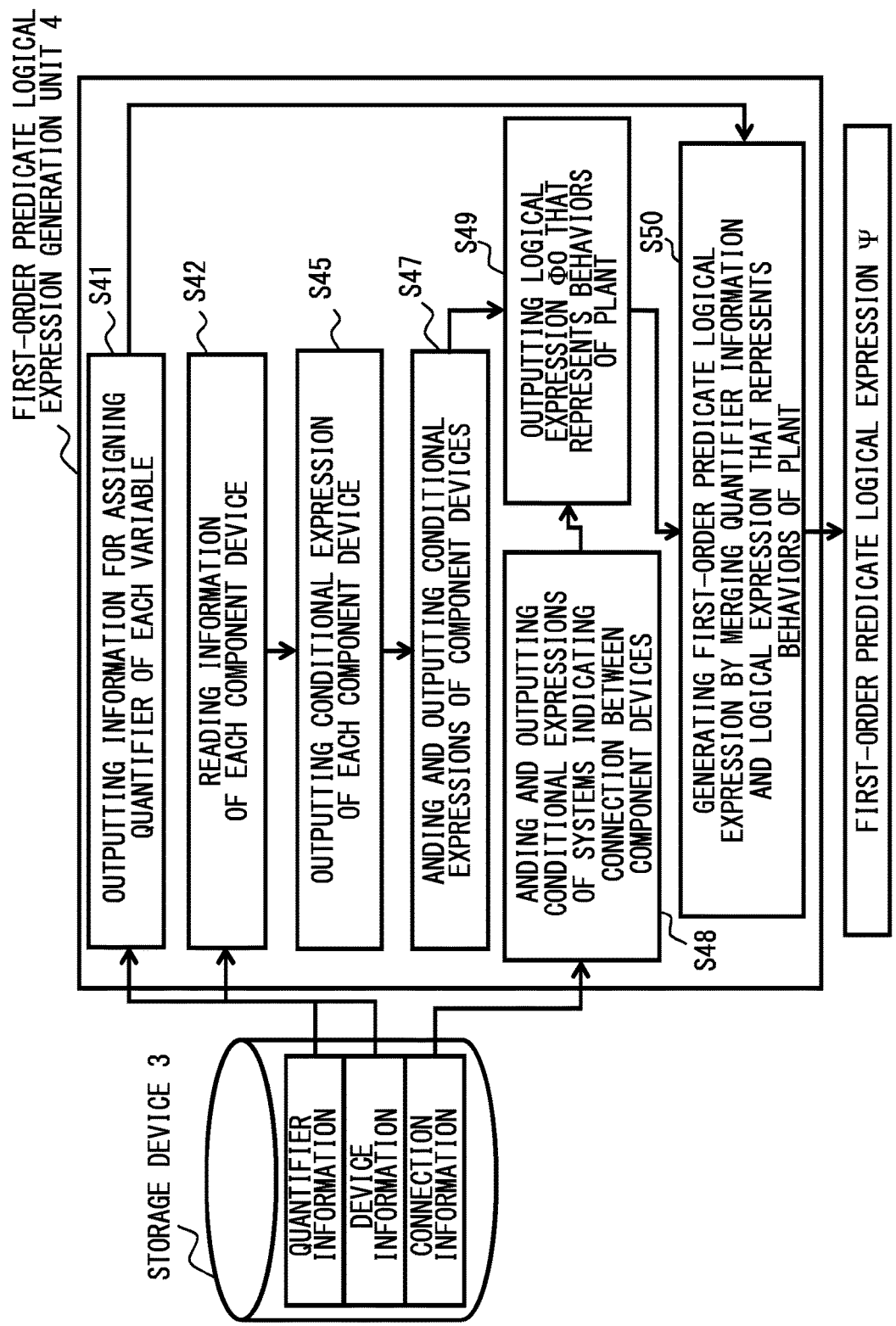
FIG. 8 illustrates a flow of operations of a first-order predicate logical expression generation unit in the first embodiment.

FIG. 8 illustrates a flow of operations of the first-order predicate logical expression generation unit 4 in this embodiment. The operations of a process of the first-order predicate logical expression generation unit 4 illustrated in FIG. 8 are performed, for example, at the timing when a user makes, to the energy analysis apparatus 100, an input such that device information, connection information and quantifier information have been registered in the storage device 3, or at the timing when the user inputs, to the energy analysis apparatus 100, an instruction for generating a first-order predicate logical expression.

Initially, in step S41, the first-order predicate logical expression generation unit 4 reads quantifier information from the storage device 3, and outputs an expression to which a selected quantifier is assigned. The output expression is used in step S50 to be described later.

Next, in step S42, the first-order predicate logical expression generation unit 4 reads device information from the storage device 3, and outputs a conditional expression of each component device from among the device information in step S45. In step S47, the first-order predicate logical expression generation unit 4 ANDs and outputs conditional expressions of component devices output in step S44.

In step S48, the first-order predicate logical expression generation unit 4 reads connection information from the storage device 3. Then, the first-order predicate logical expression generation unit 4 ANDs and outputs conditional expressions of connection information, which indicate connection between component devices.

In step S49, the first-order predicate logical expression generation unit 4 generates a logical expression Φ0 that represents the behaviors of the plant from the expression obtained in step S47 by ANDing the conditional expressions of the component devices, and the expression obtained in step S48 by ANDing the conditional expressions of the connection information indicating the connection between component devices.

Lastly, in step S50, the first-order predicate logical expression generation unit 4 generates and outputs a first-order predicate logical expression $\Psi$ by merging the information about the quantifier, which is obtained in step S41, and the logical expression $\Phi 0$ obtained in step S49. Then, the process is terminated.

A known quantifier elimination algorithm is applied to a first-order predicate logical expression obtained in this way, so that quantifiers are eliminated, and a desired relational expression is obtained. The user uses this expression to perform an energy analysis.

For explanatory purposes, a specific example of the first-order predicate logical expression $\Psi$ will be described in an explanation of a second embodiment with reference to FIG. 13.

The flow of FIG. 8 represents the flow of the case of a configuration in which needed information is read from the storage device 3 each time it is needed. However, the configuration is not limited to this one. Needed information may be prestored in storage means such as memory or the like within the first-order predicate logical expression generation unit 4, and may be used when part of information that is used earlier when a first-order predicate logical expression $\Psi$ is generated can be applied.

As described above, with the energy analysis apparatus 100 according to this embodiment, a user sequentially inputs device information and connection information in accordance with a configuration of a plant, such as the configuration of the plant illustrated in FIG. 2, and registers the information in the storage device 3. Moreover, it is only necessary for the user to set a quantifier type suitable for each variable. Even if the user does not fully possess the knowledge required to create a first-order predicate logical expression $\Psi$, he or she only inputs needed information in accordance with a plant configuration, so that a first-order predicate logical expression helpful in an energy analysis can be obtained. Accordingly, the user can easily use the method for performing an energy analysis on the basis of a relational expression obtained by eliminating quantifiers from a first-order predicate logical expression $\Psi$ with the use of a quantifier elimination algorithm even if he or she does not fully possess the required expertise.

Second Embodiment

In the above described first embodiment, a state where the devices that configure the plant are continuously running or stopping is assumed, and a first-order predicate logical expression is generated by setting conditional expressions of device information in that state. An energy analysis apparatus according to a second embodiment differs from the above described first embodiment in that a first-order predicate logical expression can be generated by incorporating an operation state of each type of devices that configure a plant in a conditional expression.

A method with which the energy analysis apparatus according to this embodiment generates a first-order predicate logical expression is described in detail below by mainly referring to differences from the first embodiment. Configurations of the energy analysis apparatus 100 according to this embodiment and a plant to be analyzed are similar to those of the first embodiment, and are as illustrated in FIGS. 1 and 2. Therefore, explanations of the configurations are omitted here.

Figure 9:
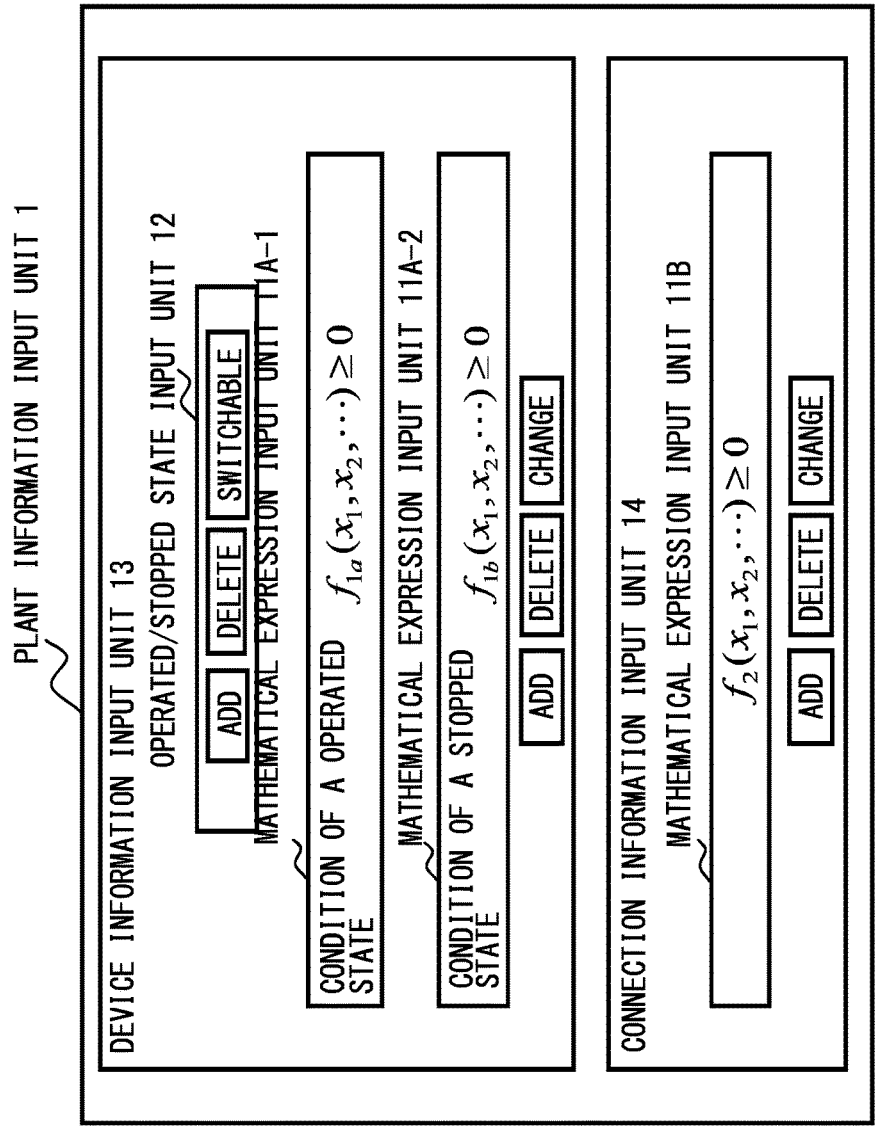
FIG. 9 illustrates an example of a configuration of a plant information input unit in a second embodiment.

FIG. 9 illustrates an example of a configuration of the plant information input unit 1 in this embodiment. As illustrated in FIG. 9, the device information input unit 13 further includes a running d/stopping state input unit 12, and the mathematical expression input unit 11A is configured so that a numerical expression for each operation condition can be input.

Specifically, the running/stopping state input unit 12 of the device information input unit 13 accepts an input of a running/stopping state indicating how to operate each device. This example assumes that any of a continuously running state, a continuously stopping state, and a switchable state between the running state and the stopping state (hereinafter abbreviated to a switchable state) is set as a running/stopping state. The running/stopping state will be specifically described later with reference to FIGS. 10 to 12.

Also, the mathematical expression input unit 11A of the device information input unit 13 includes a mathematical expression input unit 11A-1 that accepts an input of a conditional expression in the running state, and a mathematical expression input unit 11A-2 that accepts an input of a conditional expression in the stopping state.

Other components are similar to those of the above described first embodiment, and are as described above with reference to FIG. 3.

How to accept the above described running/stopping state in device information by means of the device information input unit 13 of the plant information input unit 1 is described in detail with reference to FIG. 10.

Figure 10:
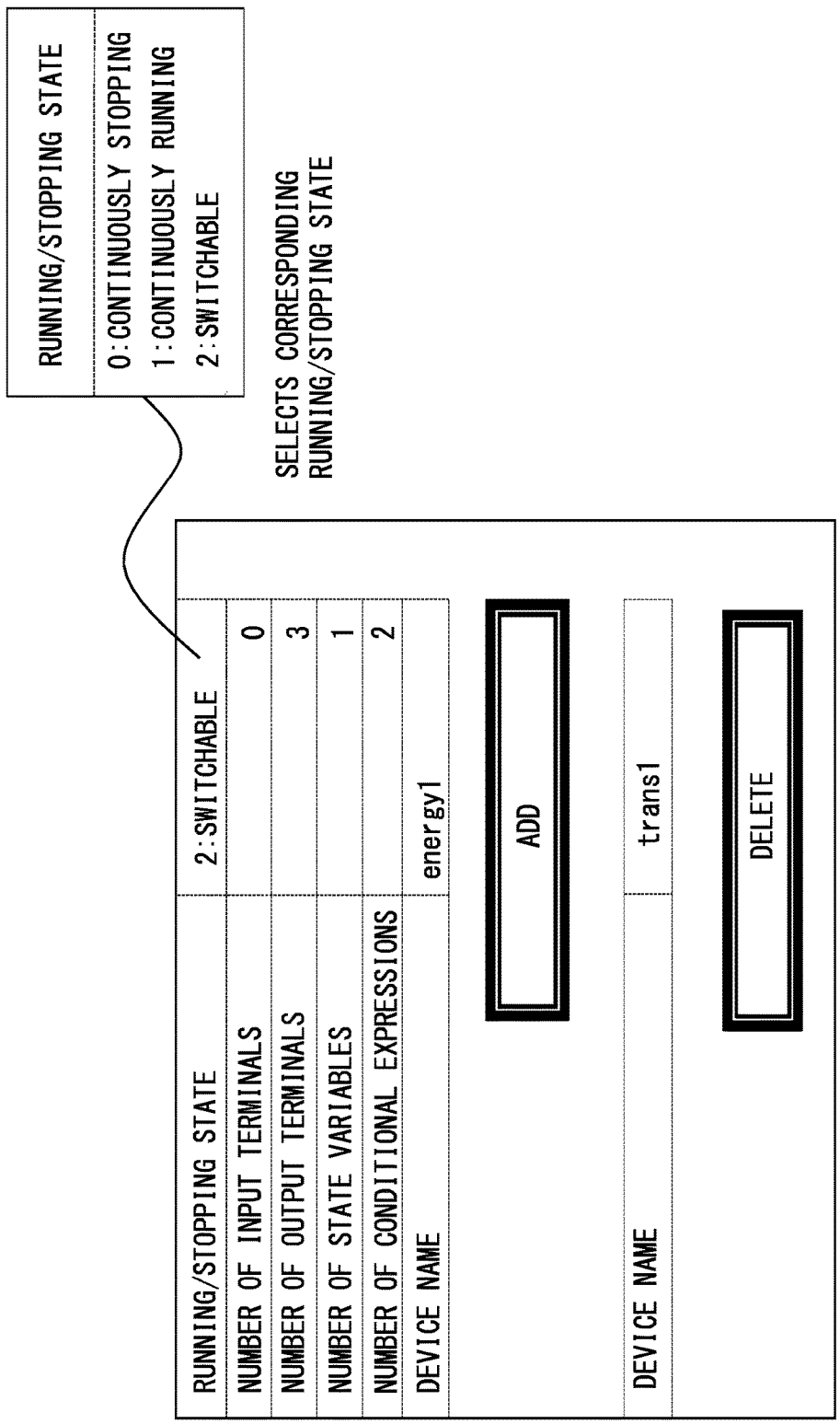
FIG. 10 is an explanatory diagram of a method for performing a registration or the like of device information by a device information input unit of the plant information input unit in the second embodiment.

FIG. 10 is an explanatory diagram of the method for performing a registration or the like of device information by the device information input unit 13 of the plant information input unit 1 in this embodiment. FIG. 10 illustrates an example of a screen displayed on the display means such as a monitor or the like when a registration of the device information is performed.

The screen, illustrated in FIG. 10, for inputting device information differs from that according to the first embodiment illustrated in FIG. 4 in that the above described running/stopping state is made selectable at a topmost stage.

A user selects "0: continuously stopping" on the screen when the stopping state is set for a device energy1. To set the running state and the switchable state, "1: continuously running" and "2: switchable" are selected respectively. In the example illustrated in FIG. 10, an entry corresponding to any of the stopping state, the running state and the switchable state is made selectable via the pull-down menu.

The second embodiment is similar to the above described first embodiment, except that the running/stopping state is made selectable, and is as described with reference to FIG. 4.

FIGS. 11 and 12 are explanatory diagrams of the method for registering variables and conditional expressions of device information by the device information input unit 13 of the plant information input unit 1 in this embodiment. FIGS. 11 and 12 are displayed when the plant information input unit 1 recognizes that a "complete" button (not illustrated) has been pressed after needed information is input on the screen of FIG. 10, or when the plant information input unit 1 recognizes that a "change" button has been pressed (see FIGS. 1 and 9).

FIG. 11 is equivalent to a case where "1: continuously running" is set as a state in the device information of FIG.

5 referenced to describe the first embodiment. Accordingly, the "running/stopping state" is set to the continuously running state.

Additionally, the screen illustrated in FIG. 11 is configured so that both a conditional expression in a stopping state and a conditional expression in an running state can be input. Here, since the state is set to the continuously running state, only the conditional expression of a running state is set to "1: valid", and a specific conditional expression is set. Since the conditional expression of a stopping state is set to "0: invalid", it is not used in a first-order predicate logical expression generation process.

FIG. 12 illustrates a case where "2: switchable" is set as the running/stopping state of the steam generation facility supply3 of FIG. 2.

When "2: switchable" is set as the running/stopping state, both the conditional expression of a running state and the conditional expression of a stopping state are set to "1: valid". As illustrated in FIG. 12, for example, three specific conditional expressions are input as the conditional expression of a stopping state, and all of these expressions are set to "1: valid". Also, four conditional expressions set as the conditional expression of a running state are similar.

The conditional expression set to "1: valid" in the device information is used to generate a first-order predicate logical expression, while a conditional expression set to "0: invalid" is not used. Accordingly, when an energy analysis is desired to be performed for various types of patterns (respectively for a pattern in which a device is continuously running, and a pattern in which the device is switchable), the need for registering device information respectively for the patterns becomes unnecessary. Namely, the validity/invalidity of a conditional expression is suitably changed in accordance with each pattern, so that a first-order predicate logical expression can be generated without newly registering device information, and an energy analysis can be performed.

In this embodiment, a method for inputting connection information and quantifier information is similar to that of the first embodiment, and is as described above with reference to FIGS. 6 and 7.

A first-order predicate logical expression generation method of the energy analysis apparatus 100 according to this embodiment is described next with reference to FIG. 13.

Figure 13:
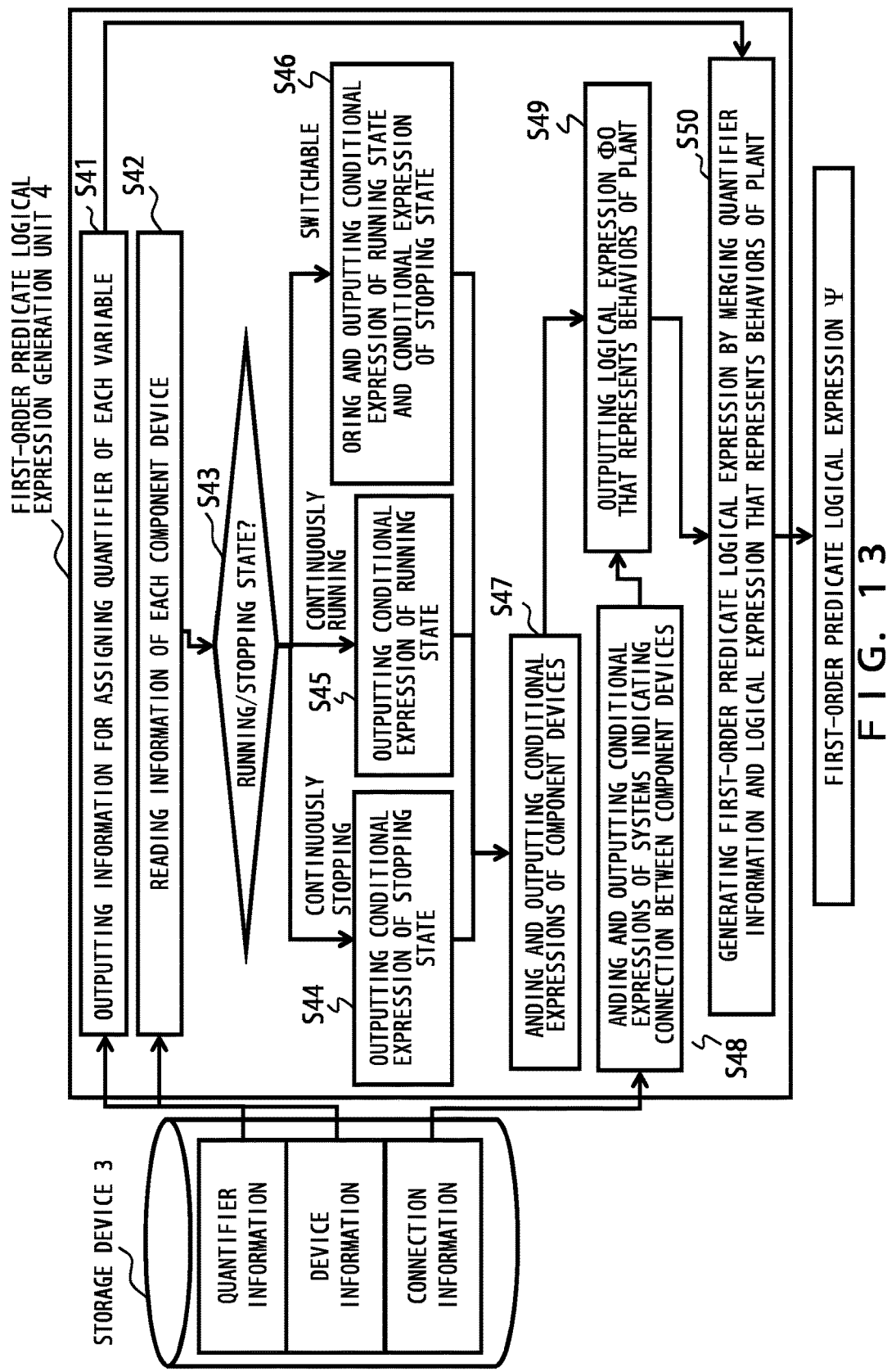
FIG. 13 illustrates a flow of operations of a first-order predicate logical expression generation unit in the second embodiment.

FIG. 13 illustrates a flow of operations of the first-order predicate logical expression generation unit 4 in this embodiment. Operations of a process of the first-order predicate logical expression generation unit 4 illustrated in FIG. 13 are executed at a timing similar to that of the first embodiment. The operations are performed, for example, at the timing when a user has made an input such that needed information of device information, connection information and quantifier information is registered in the storage device 3, or at the timing when the user inputs, to the energy analysis apparatus 100, an instruction for generating a first-order predicate logical expression.

The flow of operations according to the second embodiment differs from that of operations according to the first embodiment illustrated in FIG. 8 in that the first-order predicate logical expression generation unit 4 determines a set running/stopping state in step S43 after device information has been read from the storage device 3 in step S42.

As described earlier with reference to FIG. 10 and the like, the running/stopping state is any of the stopping state (continuously stopping), the running state (continuously running) and the switchable state. The first-order predicate logical expression generation unit 4 references to which of the states the running/stopping state is set in the device information read in step S42. Then, the process is moved to any of steps S44 to step S46 in accordance with the running/stopping state set from among the three states.

When the running/stopping state is set to "continuously stopping (stopping state)", the process proceeds to step S44, in which the first-order predicate logical expression generation unit 4 outputs a "conditional expression of a stopping state" among the device information illustrated in FIGS. 11 and 12. Then, the process proceeds to step S47.

When the running/stopping state is set to "continuously running (running state)", the process proceeds to step S45, in which the first-order predicate logical expression generation unit 4 outputs the "conditional expression of a running state" among the device information illustrated in FIGS. 11 and 12. Then, the process proceeds to step S47.

When the running/stopping state is set to "switchable (switchable state)", the process proceeds to step S46, in which the first-order predicate logical expression generation unit 4 ORs the conditional expression of a stopping state and the conditional expression of a running state in the device information illustrated in FIGS. 11 and 12, and outputs the ORed expression. Then, the process proceeds to step S47.

Process steps in and after step S47 are similar to those of FIG. 8.

FIG. 14 illustrates a first-order predicate logical expression $\Psi$ generated with the above described series of process steps by the first-order predicate logical expression generation unit 4.

An expression (1) in the first-order predicate logical expression $\Psi$ is based on the information output in step S41 of FIG. 13. In FIG. 14, a quantifier that merges variables is based on a quantifier type in the quantifier information of FIG. 7.

Here, "energy1_y1", "energy1_y2" and "energy1_y3" within the expression of FIG. 14 respectively indicate output variables of the gas supply facility (energy1), "energy1_x1" indicates a state variable of the gas supply facility, and "supply3_u1", "supply3_y1" and "supply3_x1" within the expression respectively indicate an input variable, an output variable and a state variable of the steam generation facility (supply3).

Expressions (2) and (3) are conditional expressions of the device information based on the information output in any of steps S44 to S46 of FIG. 13. Among these expressions, the expression (2) is a conditional expression of the gas supply facility energy1 of FIG. 2, and the expression (3) is a conditional expression of the steam generation facility supply3 of FIG. 2.

Note that the running/stopping state of the gas supply facility energy1 is "continuously running" in both the first and the second embodiments. Accordingly, the conditional expression (2) only includes a conditional expression of a running state. Therefore, the conditional expression for the gas supply facility energy1 is similar to the expression (2) also in the first-order predicate logical expression $\Psi$ generated in the above described first embodiment.

A running/stopping state in the device information of the steam generation facility supply3, which is represented by the conditional expression (3), is "switchable" as illustrated in FIG. 12. Accordingly, the conditional expression of a stopping state (a) and the conditional expression of a running state (b) are ORed in step S46 of FIG. 13.

In FIG. 14, conditional expressions for other devices are omitted due to space restrictions.

An expression (4) is a conditional expression for connection information based on the information output in step S48 of FIG. 13. The conditional expression illustrated in FIG. 14 represents that the output y1 from the gas supply facility energy1 is equal to the input u1 to the steam generation facility supply3, the output y2 from the gas supply facility energy1 is equal to the input u1 to the steam generation facility supply2, and the output y3 from the gas supply facility energy1 is equal to the input u1 to the steam generation facility supply1. Conditional expressions for other connection information in the plant configuration of FIG. 2 are omitted due to space restrictions.

The second embodiment is similar to the first embodiment in that an energy analysis can be performed on the basis of a relational expression obtained by applying a known quantifier elimination algorithm to an obtained first-order predicate logical expression $\Psi$.

As described above, with the energy analysis apparatus 100 according to this embodiment, a first-order predicate logical expression $\Psi$ that includes, for example, both a case where a device is continuously running and a case where the device is continuously stopping for a plant in which the device can be running or stopping as represented by the expression (3) of FIG. 14. An energy analysis is performed by using the first-order predicate logical expression $\Psi$ generated in this way, whereby a change in the behaviors of a plant can be analyzed in a case where a device is switchable between "continuously running" and "continuously stopping" in addition to effects achieved by the energy analysis apparatus according to the above described first embodiment.

Third Embodiment

In the above described first and second embodiments, quantifier types that are set respectively for variables are equally handled to obtain a first-order predicate logical expression $\Psi$. This embodiment differs in that an elimination priority level is set for each quantifier, and quantifiers are eliminated in stages in accordance with elimination priority levels when the quantifiers are eliminated by using a known quantifier elimination algorithm.

A method with which an energy analysis apparatus according to this embodiment generates a first-order predicate logical expression is described in detail below by mainly referring to differences from the first and the second embodiments. Note that configurations of the energy analysis apparatus according to this embodiment and a plant to be analyzed are similar to those of the first embodiment, and are as illustrated in FIGS. 1 and 2.

Additionally, configurations of device information and connection information, and a method for inputting and setting the device information and the connection information are similar to those of the first and the second embodiments. Here, the third embodiment is described by taking, as an example, a case where device information including a running/stopping state can be set according to the second embodiment.

Figure 15:
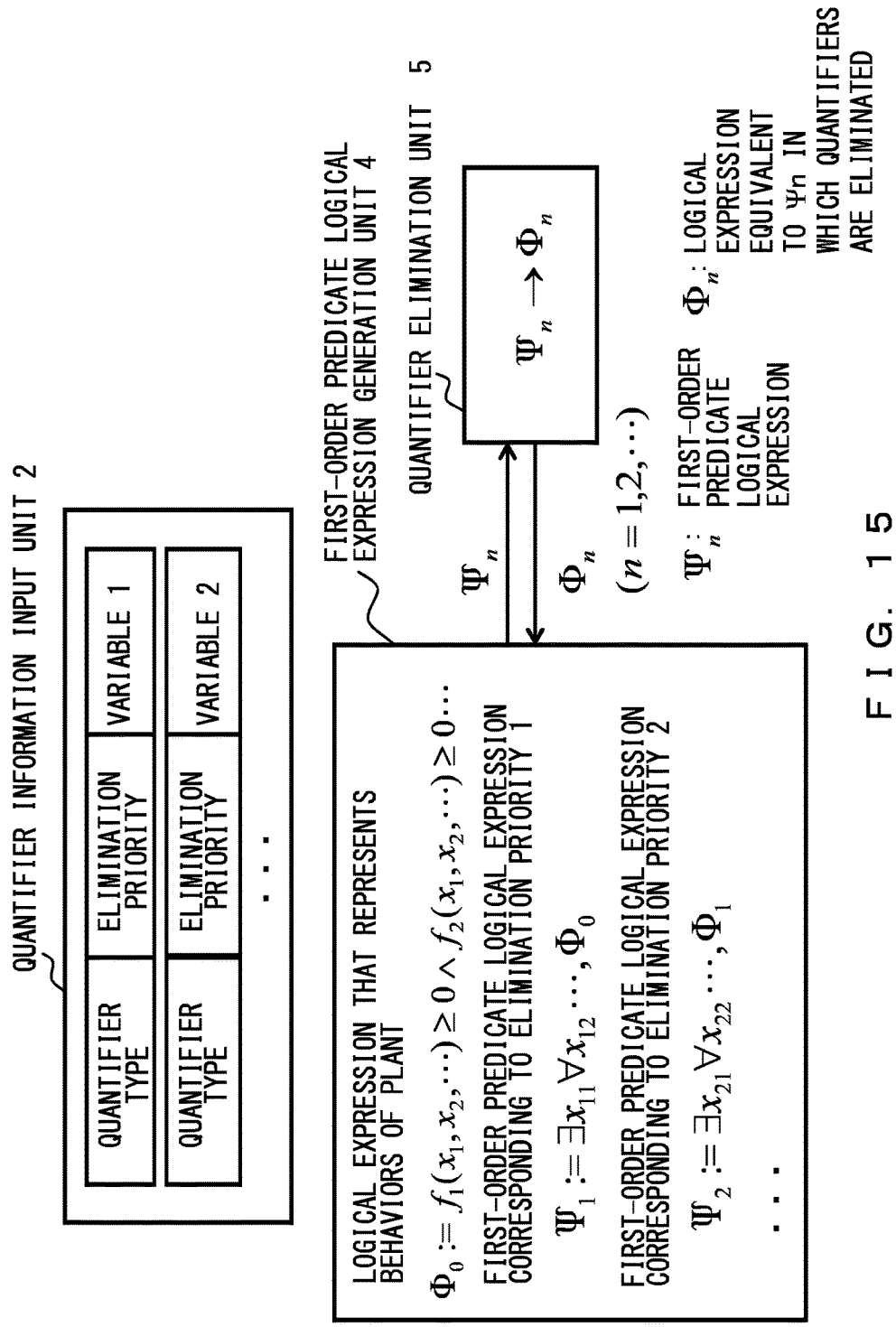
FIG. 15 is an explanatory diagram of an outline of a first-order predicate logical expression generation process and a quantifier elimination process, which are executed by an energy analysis apparatus according to a third embodiment.

FIG. 15 is an explanatory diagram of an outline of a first-order predicate logical expression generation process and a quantifier elimination process, which are executed by the energy analysis apparatus 100 according to this embodiment. As illustrated in FIG. 15, the energy analysis apparatus 100 according to this embodiment further includes a quantifier elimination unit 5. In this figure, the plant information input unit 1 and the storage device 3 are omitted.

The first and the second embodiments are similar in that quantifiers are eliminated from a first-order predicate logical expression $\Psi$ by using a known quantifier elimination algorithm. Accordingly, it is evident that the energy analysis apparatuses 100 according to the first and the second embodiments also include a quantifier elimination unit. However, this embodiment is characterized by a method for eliminating a quantifier. Therefore, the quantifier elimination unit is illustrated in FIG. 15 so as to describe a process specific to this embodiment.

The quantifier information input unit 2 accepts an input of an elimination priority for each quantifier (a quantifier type in the quantifier type information illustrated in FIG. 7) set for each variable, and registers the priority in the storage device 3 (not illustrated in FIG. 15). The first-order predicate logical expression generation unit 4 generates a mathematical expression (the expression (1) of FIG. 13) that represents information about a quantifier on the basis of a quantifier having a higher priority in accordance with elimination priorities set for the quantifiers.

The quantifier elimination unit 5 solves the first-order predicate logical expression by using the quantifier elimination algorithm. Specifically, the quantifier elimination unit 5 obtains a logical expression $\Phi n$ by eliminating quantifiers from the first-order predicate logical expression $\Psi n$ generated by the first-order predicate logical expression generation unit 4, and gives the obtained logical expression $\Phi n$ to the first-order predicate logical expression generation unit 4.

Upon receipt of the logical expression $\Phi n$ from the quantifier elimination unit 5, the first-order predicate logical expression generation unit 4 generates a mathematical expression that represents information about a quantifier having the second highest priority next to the quantifier having the highest priority used to generate the expression $\Psi n$, and generates a first-order predicate logical expression $\Psi n+1$ on the basis of the generated expression. The quantifier elimination unit 5 solves the first-order predicate logical expression $\Psi n+1$, and gives the obtained $\Phi n+1$ to the first-order predicate logical expression generation unit 4. Thereafter, the first-order predicate logical expression generation unit 4 and the quantifier elimination unit 5 repeat the similar process steps until all the quantifiers are eliminated.

A method for assigning a quantifier to a first-order predicate logical expression and a method for eliminating a quantifier, which are executed by the energy analysis apparatus 100 according to this embodiment, are specifically described with reference to examples illustrated in FIGS. 16 to 18.

FIG. 16 is an explanatory diagram of the method with which the quantifier information input unit 2 registers quantifier information. Similarly to FIG. 7, FIG. 16 illustrates an example of a screen displayed on the display means such as a monitor or the like of the energy analysis apparatus 100 when quantifier information is registered.

As illustrated in FIG. 16, quantifier information includes an elimination priority in addition to a device name, a variable name and a quantifier type. The elimination priority represents an elimination priority level to be eliminated preferentially when a logical expression $\Phi n$ equivalent to an expression $\Psi n$ is obtained by eliminating quantifiers in stages from the first-order predicate logical expression $\Psi n$ as described earlier. In this example, five elimination priorities such as "1: highest", "2: second highest", "3: middle", "4: second lowest" and "5: lowest" in descending order are provided.

A user sets an elimination priority of a quantifier for each variable by selecting a desired elimination priority, for example, in a pull-down menu on a screen illustrated in FIG. 16.

FIG. 17 illustrates an example of the logical expression $\Phi 0$ that represents behaviors of a plant. The first-order predicate logical expression generation unit 4 generates a logical expression $\Phi 0$ illustrated in FIG. 17 in step S49 of FIGS. 8 and 13. The logical expression $\Phi 0$ of FIG. 17 is equivalent to expressions (2) to (4), namely, portions other than the mathematical expression (1) that represents the information for assigning a quantifier in FIG. 14 referenced to explain the above described embodiment.

The first-order predicate logical expression generation unit 4 according to this embodiment references the elimination priorities of quantifier information illustrated in FIG. 16 for the logical expression $\Phi 0$ of FIG. 17. Then, in step S50, the first-order predicate logical expression generation unit 4 generates a mathematical expression that represents information for assigning a quantifier for a variable having the highest elimination priority, and generates a first-order predicate logical expression $\Phi 1$ by merging the generated mathematical expression and the logical expression $\Phi 0$.

Figure 18:
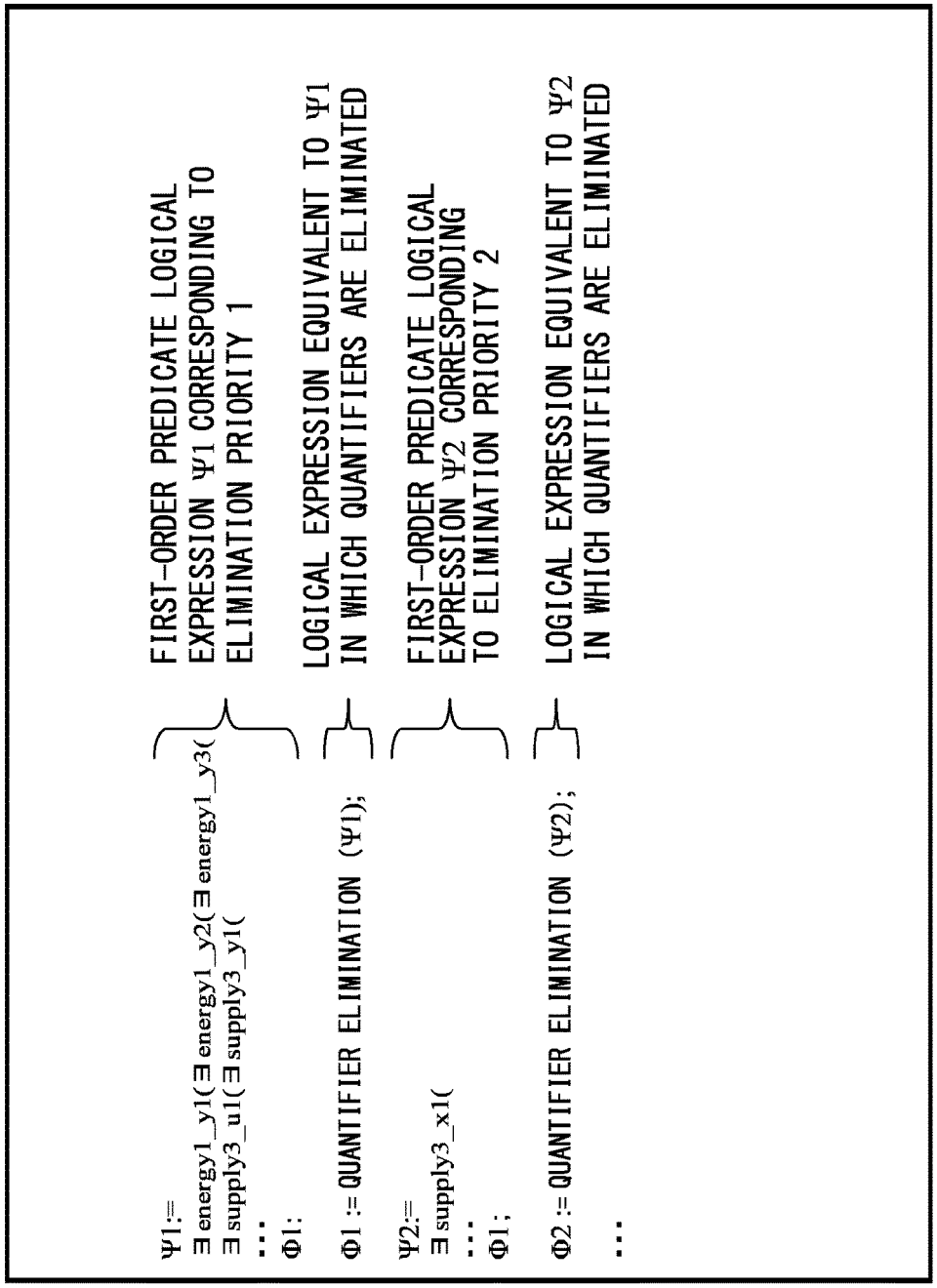
FIG. 18 is an explanatory diagram of a method for eliminating quantifiers from a first-order predicate logical expression in stages in accordance with elimination priorities.

FIG. 18 is an explanatory diagram of the method for eliminating quantifiers from the first-order predicate logical expression $\Phi n$ (n=1, 2, . . . ) in stages in accordance with elimination priorities. FIG. 18 illustrates an example of the method for generating a first-order predicate logical expression by using the elimination priorities of the quantifier information of FIG. 16, and solving the first-order predicate logical expression.

As illustrated in FIG. 18, the first-order predicate logical expression generation unit 4 initially generates and outputs information for assigning a quantifier for a variable having an elimination priority set to "1: highest" in the quantifier information of FIG. 16. Then, the first-order predicate logical expression generation unit 4 generates a first-order predicate logical expression $\Psi 1$ that corresponds to the elimination priority 1 (highest) by merging the generated information for assigning a quantifier "∃ energy1_y1 (∃ energy1_y2 (∃ energy1_y3 (∃ supply3_u1 (∃ supply3_y1 ( . . . " and the logical expression $\Phi 0$ of FIG. 17.

The quantifier elimination unit 5 obtains a logical expression $\Phi 1$ equivalent to $\Psi 1$ by eliminating the quantifier having the highest elimination priority 1 (highest) from the first-order predicate logical expression $\Psi 1$. In the logical expression $\Phi 1$, only the quantifier having the highest elimination priority (highest) is eliminated.

Next, the first-order predicate logical expression generation unit 4 generates and outputs information for assigning a quantifier for a variable having an elimination priority set to "2: second highest" in the quantifier information of FIG. 16. Then, the first-order predicate logical expression generation unit 4 generates a first-order predicate logical expression $\Psi 2$ that corresponds to the elimination priority 2 (second highest) by merging the generated information for assigning a quantifier "∃ supply3_x1 ( . . . ", and the logical expression $\Phi 1$ obtained by the quantifier elimination unit 5.

The quantifier elimination unit 5 obtains a logical expression $\Phi 2$ equivalent to $\Psi 2$ by eliminating the quantifier having the elimination priority 2 (second highest) from the first-order predicate logical expression $\Psi 2$ given by the first-order predicate logical expression generation unit 4. In the logical expression $\Phi 2$, the quantifiers having the elimination priority 1 (highest) and the elimination priority 2 (second highest) are eliminated.

Thereafter, the first-order predicate logical expression generation unit 4 similarly generates information (see FIG. 14 and the like) for assigning a quantifier in descending order of elimination priorities, and generates a first-order predicate logical expression $\Psi n+1$ by merging the generated information and the logical expression $\Phi n$ obtained by the quantifier elimination unit 5. The first-order predicate logical expression generation unit 4 repeats this process until all the quantifiers are eliminated.

As described above, with the energy analysis apparatus 100 according to this embodiment, elimination priorities of quantifiers are set when quantifier information is input, and quantifiers are eliminated in stages in accordance with the elimination priorities. When the quantifier elimination unit 5 performs a computation for eliminating quantifiers by using a quantifier elimination algorithm, the total amount of time needed for the computation is normally expected to be reduced if the number of quantifiers to be eliminated is smaller. Moreover, used memory space can be reduced if the number of quantifiers to be eliminated in one computation is smaller when the quantifiers are eliminated from a first-order predicate logical expression $\Psi$.

Furthermore, when the energy analysis apparatus 100 is configured so that a user can verify mathematical expressions by outputting expressions $\Psi n$ and $\Phi n$, which are results of the computation performed by the first-order predicate logical expression generation unit 4 and the quantifier elimination unit 5, to the display means such as a monitor or the like, it is also expected to improve visibility for the user. Namely, by employing the method for eliminating quantifiers in stages in accordance with elimination priorities, the number of variables included in an expression in each stage becomes smaller than in a case where all the quantifiers are eliminated at one time. This enables a user to easily grasp content of the first-order predicate logical expression $\Psi n$ and the like.

As for the method for deciding elimination priorities of respective quantifiers, it is expected that the total amount of time needed for a computation can be reduced by relatively setting, to a higher level, a priority of a variable related to an output, and by relatively setting, to a lower level, a priority of a state variable.

Fourth Embodiment

In the above described first to third embodiments, a user inputs device information and connection information while referencing a drawing or the like in which the plant configuration of FIG. 2 is written. This embodiment differs from the first to the third embodiments in that an energy analysis apparatus includes a plant configuration display unit for displaying a diagram or the like that represents a plant configuration registered in the storage device 3 on display means such as a monitor or the like. A user can input device information and connection information while visually grasping a plant configuration with reference to a diagram or the like on a screen displayed by the plant configuration display unit.

How to accept inputs of device information and connection information in the energy analysis apparatus according to this embodiment is described in detail by mainly referring to differences from the above described first to third embodiments. Configurations of the energy analysis apparatus 100 according to this embodiment and a plant to be analyzed are similar to those of the first to the third embodiments, and are as illustrated in FIGS. 1 and 2.

Figure 19:
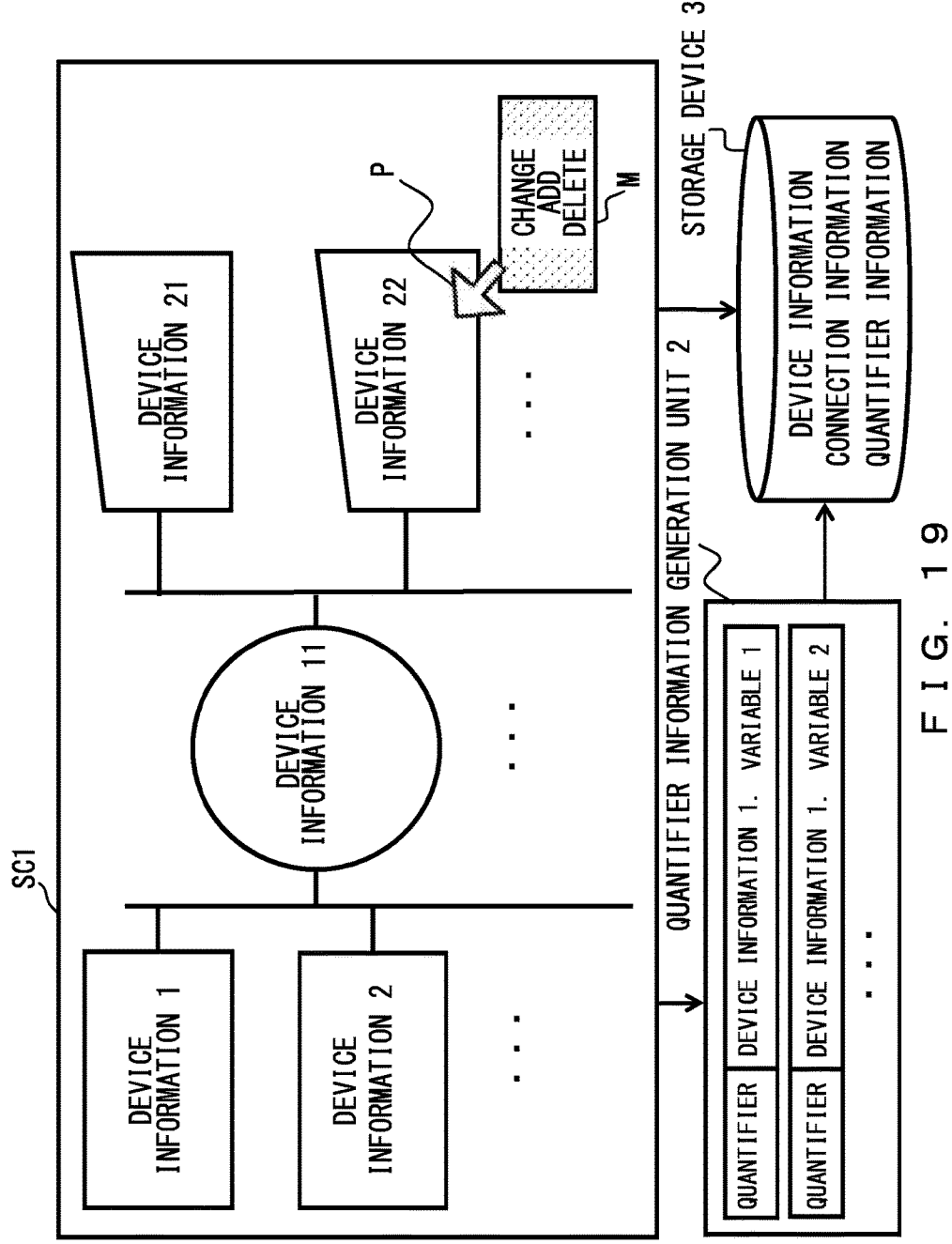
FIG. 19 illustrates an example of a screen displayed on a monitor or the like by a plant configuration display unit in an energy analysis apparatus according to a fourth embodiment.

FIG. 19 illustrates an example of a screen SC1 displayed on a monitor or the like by the plant configuration display unit in the energy analysis apparatus 100 according to this embodiment.

Here, as represented by the screen SC1 of FIG. 19, a case in which devices indicated by device information 1, 2, 11 and 21 are already added as devices that configure the plant and "device information 22" is to be newly added to the configuration is assumed. Here, "device information n" (where n is an integer equal to 1, 2, 11 or the like in FIG. 19) on the screen SC1 is information for identifying each piece of the device information in FIG. 19.

A user operates a pointing device such as a mouse or the like to arrange an icon or the like that indicates a facility equivalent to the device information 21 at a position where the user desires to add the device information 22 on the screen SC1 of FIG. 19, for example, by dragging an icon or the like. The position at which the user desires to add the device information 22 on the screen SC1 is a position that is connected to the device of the device information 11 and is present in the same hierarchy as the device equivalent to the device information 21. Upon recognizing that a user has performed an operation—for example, has right-clicked the pointing device—the plant information input unit 1 displays a menu M on the screen, and causes the user to select any of "change", "add" and "delete" the "device information 22". Here, assume that the user has selected the menu option "add". Upon recognizing that the menu option "add" has been selected, the plant information input unit 2 newly adds the "device information 22" to the storage device 3.

Similarly, upon recognizing that the user has moved the pointer P to the position of certain device information on the screen SC1 and has selected the menu option "delete" in the menu M displayed, for example, by right-clicking the pointing device, the plant information input unit 1 deletes the corresponding device information from the storage device 3.

Upon recognizing that the user has moved the pointer P to the position of certain device information on the screen SC1 and has selected the menu option "change" in the displayed menu M, the plant information input unit 1 displays, for example, the screen illustrated in FIG. 4. When the user has changed a device name, a connection variable such as an input variable, an output variable or the like, the number of state variables, or the number of conditional expressions, the plant information input unit 1 stores the changed information in the storage device 3.

According to this embodiment, details of device information (such as variable names and a conditional expression), and connection information can be set while grasping a plant configuration. This is described with reference to FIG. 20.

FIG. 20 illustrates an example of a screen created on the basis of information registered in the storage device 3 via the screen SC1 of FIG. 19. The plant configuration illustrated in FIG. 20 does not correspond to that displayed on the screen SC1 of FIG. 19.

On a screen SC2 illustrated in FIG. 20, a hierarchical structure of the plant is displayed, and devices G1 to G3, T1, T2 and D1 are respectively represented with a square. Moreover, a running/stopping state of each of the devices can be set with a pull-down menu (m3, m2 or the like in FIG. 20) in the vicinity of each of the squares that indicate the devices G1 to G3, T1 and T2. Furthermore, buttons (b3, b2 and the like of FIG. 20) corresponding to the devices (G1 and the like) that configure the plant are displayed at the bottom of the screen.

A user sets variables and a conditional expression of device information by pressing a button corresponding to a desired device. For example, when the user desires to set details of device information of a generator G3 (Generator3), he or she presses the button b3. Then, a screen, illustrated in FIG. 11 or 12, for causing the user to input details of the device information is displayed on the monitor or the like, so that the user can input the variable and the conditional expression on the screen.

Additionally, when the user selects a running/stopping state via the pull-down menu, the running/stopping state is set in the device information. For example, a state selected from among "continuously running", "continuously stopping" and "switchable" is set as the running/stopping state via the pull-down menu m3 in the vicinity of the square that represents the generator G3 (Generator3).

Note that a connection state can also be input, for example, via the screen illustrated in FIG. 19 or 20. For example, a user moves the pointer P to a position corresponding to a solid line that indicates connection between devices, or a position corresponding to an input terminal or output terminal of a square that indicates a device, and selects the solid line or the input or output terminal, so that corresponding connection information can be set.

Note that a method for inputting quantifier information is similar to that of the above described first to third embodiments.

As described above, with the energy analysis apparatus 100 according to this embodiment, a diagram that represents a plant configuration is displayed on the screen of display means such as a monitor or the like. A user can input device information and the like while visually grasping the plant configuration. This can effectively prevent input errors, and a user can more easily and simply use the method for eliminating quantifiers from a first-order predicate logical expression $\Psi$ by using a quantifier elimination algorithm, and for performing an energy analysis on the basis of an obtained relational expression.

Fifth Embodiment

This embodiment differs from the above described first to fourth embodiments in that an analysis condition can also be input as information that a user inputs to the energy analysis apparatus in addition to information items referred to in the first to fourth embodiments. The energy analysis apparatus executes a first-order predicate logical expression generation process in accordance with an analysis condition, and a logical expression obtainment process by applying a quantifier elimination algorithm to a first-order predicate logical expression.

The energy analysis apparatus according to this embodiment is described in detail below with reference to the drawings.

Figure 21:
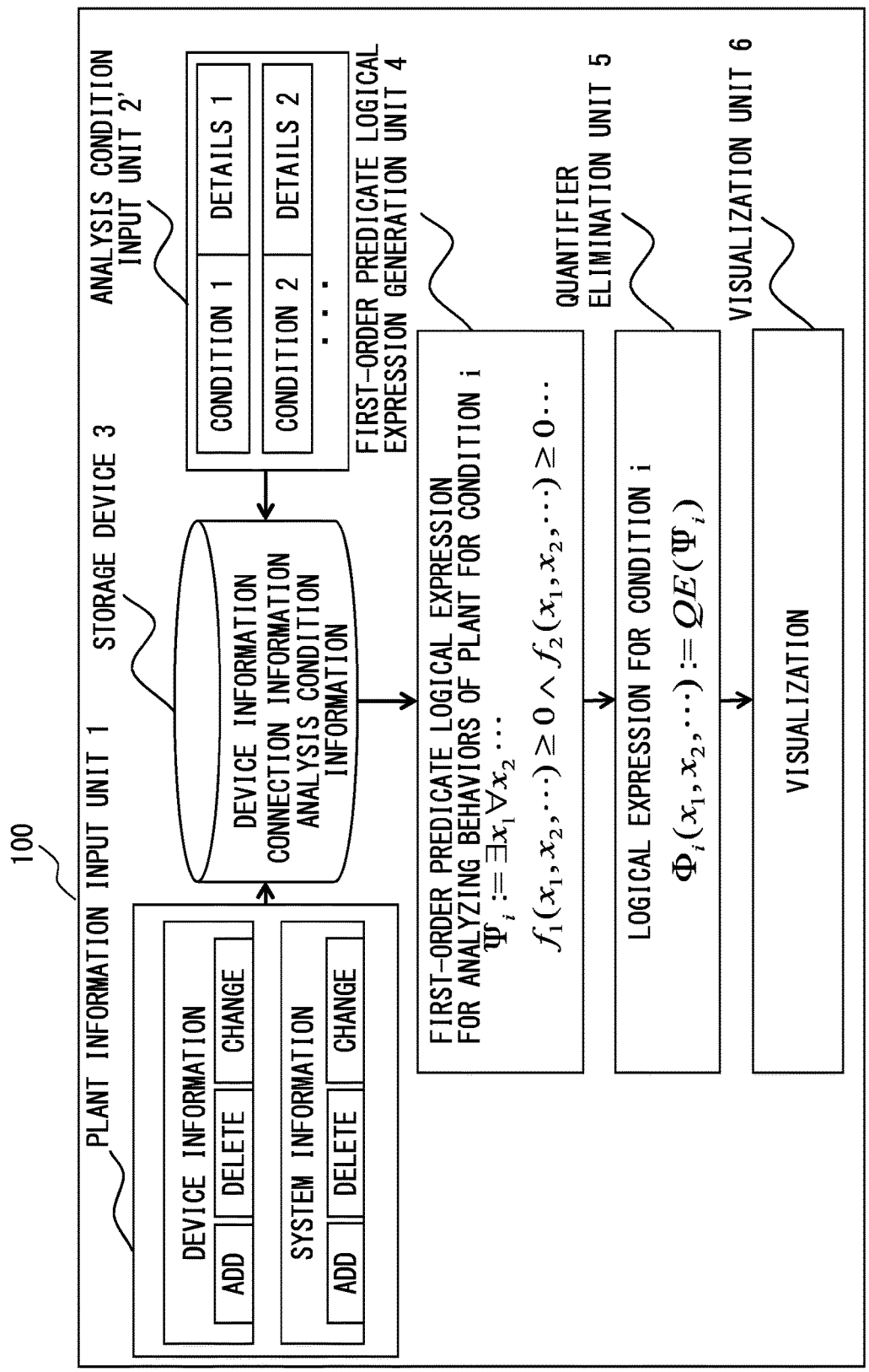
FIG. 21 illustrates a configuration of an energy analysis apparatus according to a fifth embodiment.

FIG. 21 illustrates a configuration of the energy analysis apparatus 100 according to this embodiment. The energy analysis apparatus 100 illustrated in FIG. 21 includes the plant information input unit 1, an analysis condition input unit 2', the storage device 3, the first-order predicate logical expression generation unit 4, the quantifier elimination unit 5 and a visualization unit 6.

The energy analysis apparatus 100 illustrated in FIG. 21 is an apparatus similar to the energy analysis apparatus 100 illustrated in FIG. 1. Namely, the energy analysis apparatus 100 of FIG. 21 assists a user in analyzing the behaviors of an energy plant including a supply facility that supplies energy such as electricity, gas, heat or the like, and a consumption facility that performs air-conditioning, uses steam, and drains or discharges water by using the energy. The energy analysis apparatus 100 may be configured with a general-purpose information processing device, or may be configured as a general-purpose information processing system in which general-purpose information processing devices are interconnected.

The plant information input unit 1 accepts an input of information indicating device models that configure the plant, and an input of connection between the device models. Similarly to the first to the fourth embodiments, the information indicating the device models that configure the plant, and the information indicating the connection between the device models are respectively referred to as "device information" and "connection information" in the following description.

The analysis condition input unit 2' accepts an input of analysis condition information indicating in which condition the plant is to be analyzed. The analysis condition information of the plant is a condition assigned when the energy analysis apparatus 100 processes a first-order predicate logical expression. Namely, with the analysis condition information, a first-order predicate logical expression generated by the energy analysis apparatus 100, a variable to be eliminated from a first-order predicate logical expression, and for which variable a logical expression is to be obtained by applying quantifier elimination to a first-order predicate logical expression are decided. Specific analysis condition information will be described later.

The storage device 3 stores information accepted by the plant information input unit 1 and the analysis condition input unit 2'.

The first-order predicate logical expression generation unit 4 generates a first-order predicate logical expression that represents behaviors of a plant on the basis of device information, connection information and analysis condition information, which are stored in the storage device 3. For explanatory purposes, how to generate a first-order predicate logical expression will be described in detail later with reference to FIG. 29 and the like.

The quantifier elimination unit 5 generates an equivalent logical expression that does not include quantifiers by applying a quantifier elimination algorithm to the first-order predicate logical expression generated by the first-order predicate logical expression generation unit 4.

The visualization unit 6 generates an image including a graph generated from the logical expression generated by the quantifier elimination unit 5.

A configuration example of the plant to be analyzed is described with reference to FIG. 22 prior to an explanation of operations of the components that configure the energy analysis apparatus 100 according to this embodiment.

Figure 22:
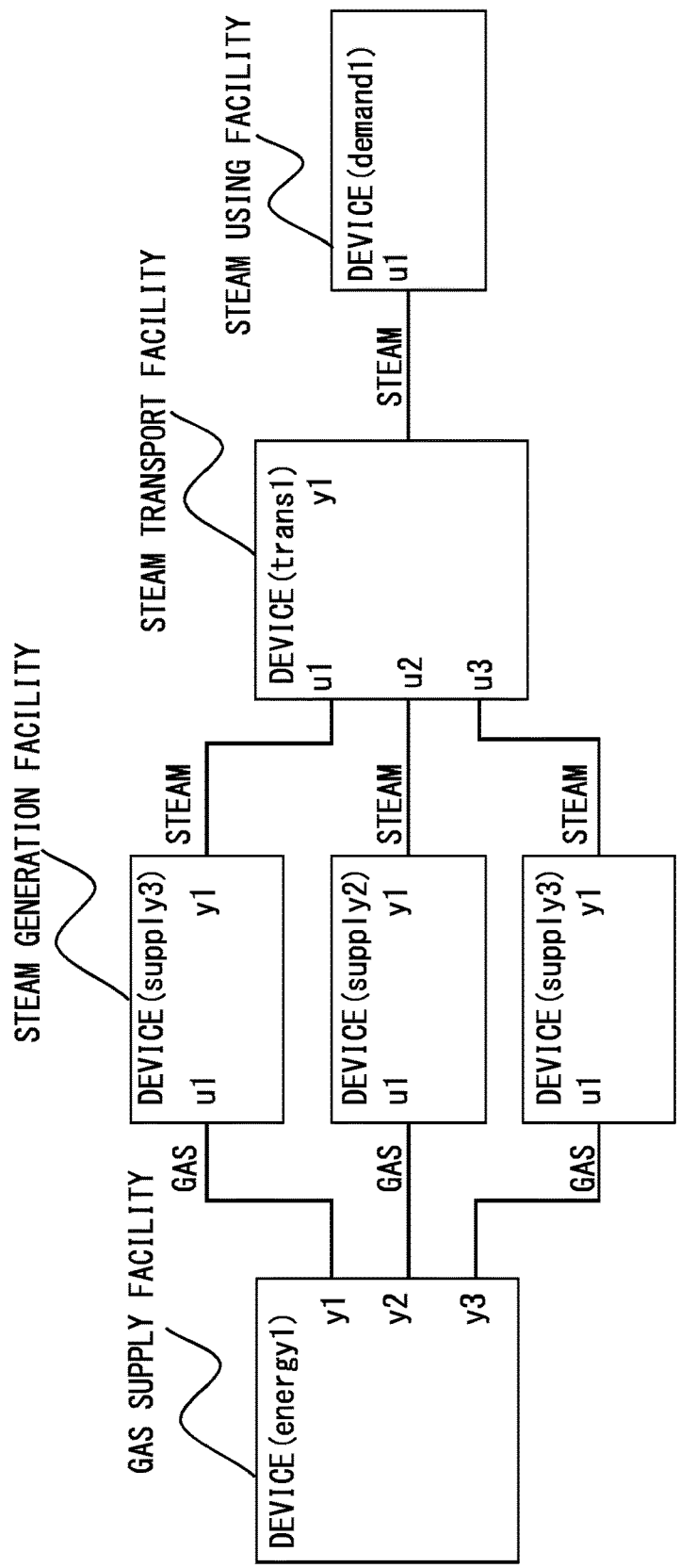
FIG. 22 illustrates a configuration example of a plant to be analyzed by the energy analysis apparatus according to the fifth embodiment.

FIG. 22 illustrates a configuration example of the plant to be analyzed by the energy analysis apparatus 100 according to this embodiment. The plant configuration illustrated in FIG. 22 is similar to that illustrated in FIG. 2.

Namely, in the configuration example illustrated in FIG. 22, gas is supplied from one gas supply facility (energy1) to three steam generation facilities (supply1 to supply3). The steam generation facilities respectively generate steam by using the gas. The steam respectively generated by the steam generation facilities are unified by one steam transport facility (trans1), and supplied to a steam using facility (demand1) via the steam transport facility. In this way, the steam using facility uses the supplied steam.

Each of the component devices includes any of input terminals (u1 to u3) and/or any of output terminals (y1 to y3).

FIG. 23 illustrates a relationship between the steam generation generated by each of the steam generation facilities (supply1 to supply3) included in the plant configuration of FIG. 22 and the gas consumption.

As illustrated in FIG. 23, each of the steam generation facilities has an operating range, and the steam generation has upper and lower limits. For example, the operating range of supply3 is equal to or higher than 2 [t/h] and equal to or lower than 8[t/h].

Additionally, efficiencies of the steam generation facilities, namely, gradients of straight lines that respectively indicate a relationship between the steam generation and the gas consumption are different in FIG. 23.

Inputs of device information, connection information and analysis condition information, which are accepted by the energy analysis apparatus 100 illustrated in FIG. 21, when an analysis is performed for the plant of the configuration example illustrated in FIGS. 22 and 23 are specifically described with reference to FIGS. 24 to 28.

Figure 24:
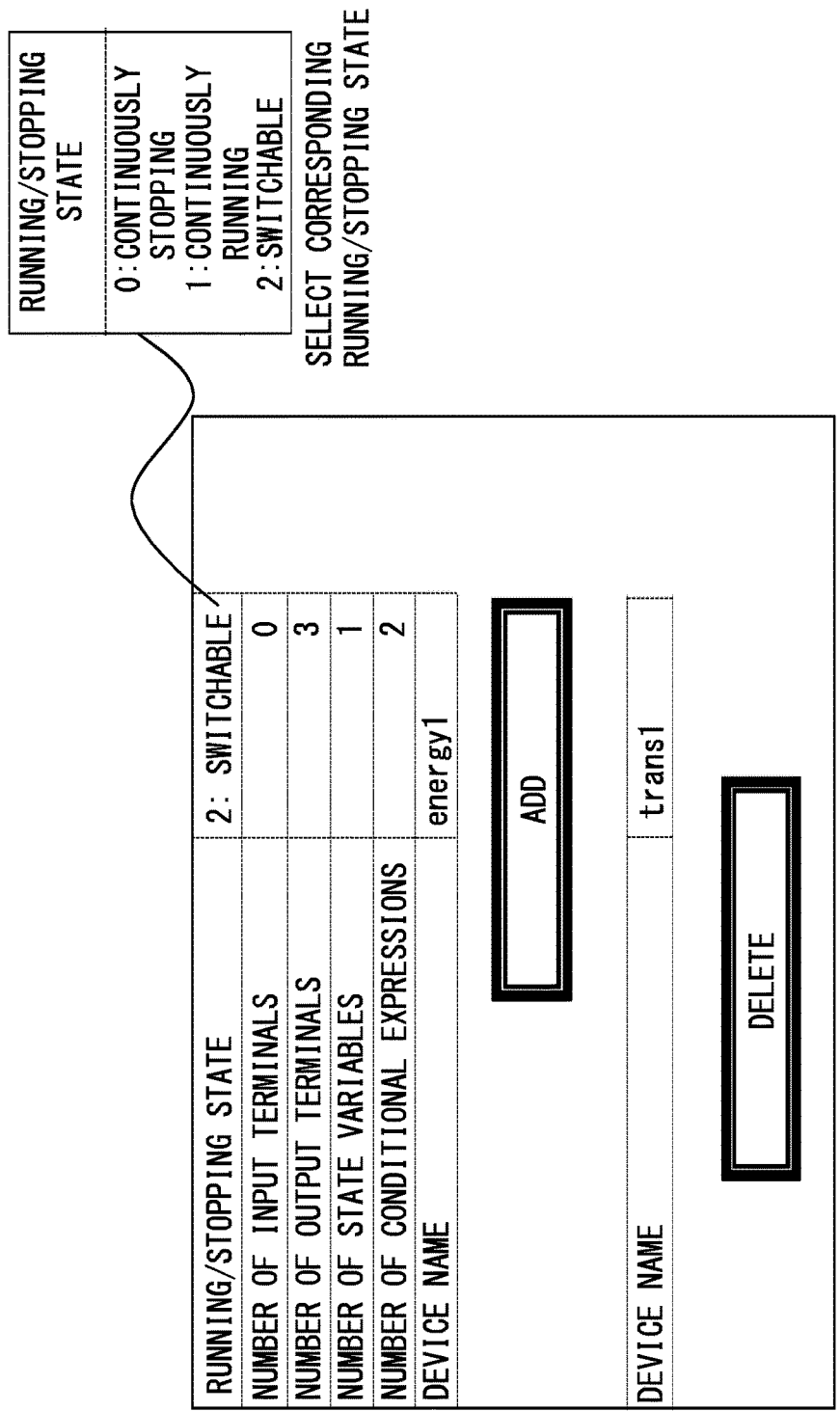
FIG. 24 is an explanatory diagram of a method for performing a registration or the like of device information by a plant information input unit in the fifth embodiment.

FIG. 24 is an explanatory diagram of a method for performing a registration or the like of the device information by the plant information input unit 1 according to this embodiment. A configuration of the plant information input unit 1 according to this embodiment is similar to that of the above described first embodiment, and is as illustrated in FIG. 3.

As illustrated in FIG. 24, the plant information input unit 1 adds a device by designating a running/stopping state, the number of input terminals, the number of output terminals, the number of state variables, the number of conditional expressions and a device name when device information of one device is newly added. An input screen illustrated in FIG. 24 is similar to that of FIG. 10 used to describe the second embodiment, and also a method for adding or deleting a device is similar.

FIGS. 25 and 26 are explanatory diagrams of a method for registering variables and conditional expressions of device information by the plant information input unit 1 according to this embodiment. As illustrated in FIGS. 25 and 26, the plant information input unit 1 adds variables and conditional expressions for each device registered via the input screen of FIG. 24.

Specifically, the plant information input unit 1 accepts inputs of three output variables "y1", "y2" and "y3", and a state variable "x1" for the gas supply facility (having the device name "energy1") via the input screen of FIG. 25. At the same time, the plant information input unit 1 accepts an input of a conditional expression of a running state "0=y1+y2+y3−x1". The input screen, and the input variables and the conditional expression, which are illustrated in FIG. 25, are similar to those used to describe the first embodiment.

The steam supply facility (having the device name "supply3") of FIG. 22 accepts the inputs of the variables and the conditional expressions via an input screen of FIG. 26. Here, the running/stopping state of the steam supply facility supply3 is set to "switchable". When the running/stopping state is "switchable", a conditional expression of a stopping state and a conditional expression of a running state are respectively set as conditional expressions.

In the example illustrated in FIG. 26, inputs of an input variable "u1", an output variable "y1" and a state variable "x1" are accepted. At the same time, conditional expressions in a stopping state "0=x1", "0=u1" and "0=y1", and conditional expressions in a running state "0≥x1−8", "0≤x1−2", "0=u1−50*x1" and "0=y1−x1" are accepted. The four conditional expressions in a running state among the information that are input and set here are different from those of FIG. 12 used to describe the second embodiment. Other items of information, namely, variables and conditional expressions in a stopping state, are similar to those of FIG. 12.

As the conditional expressions in a running state of FIG. 26, information indicating that the steam generation x1 is equal to or larger than 2[t/h] and equal to or smaller than 8[t/h], that the gas consumption of 50 [Nm$^3$/h] is needed to generate the steam 1[t/h], and that the steam generation x1 is equal to the steam output y1 is input.

FIG. 27 is an explanatory diagram of a method for registering connection information by the plant information input unit 1 according to this embodiment.

The plant information input unit 1 accepts an input of information indicating connection relationships between devices that configure the plant. FIG. 27 illustrates an example of a screen in a stage where all pieces of information about connections between the devices of the plant configuration illustrated in FIG. 22 have been input. The connection information includes a connection number, a connection source device name, a connection source terminal, a connection destination device name and a connection destination terminal.

The connection information illustrated in FIG. 27 is similar to that illustrated in FIG. 6 used to describe the first embodiment.

FIG. 28 is an explanatory diagram of a method for registering analysis condition information by the analysis condition input unit 2' according to this embodiment.

As illustrated in FIG. 28, for example, evaluation axes used when a plant is evaluated are registered as analysis condition information. An evaluation axis indicates which variable among variables registered as device information the resulting logical expression must be included when the logical expression is generated by applying a quantifier elimination algorithm to a first-order predicate logical expression that the first-order predicate logical expression generation unit 4 generates on the basis of various items of information stored in the storage device 3. In other words, the evaluation axis indicates which variable is to be taken as an axis when a graph is generated by the visualization unit 6.

In this embodiment, a plurality of pieces of analysis condition information can be also preregistered. In the example illustrated in FIG. 28, condition 1 and condition 2 are registered as two analysis conditions.

How to generate a first-order predicate logical expression by means of the first-order predicate logical expression generation unit 4 of FIG. 21 with the use of the device information, the connection information and the analysis condition information, which are illustrated in FIGS. 24 to 28, is described with reference to FIG. 29.

Figure 29:
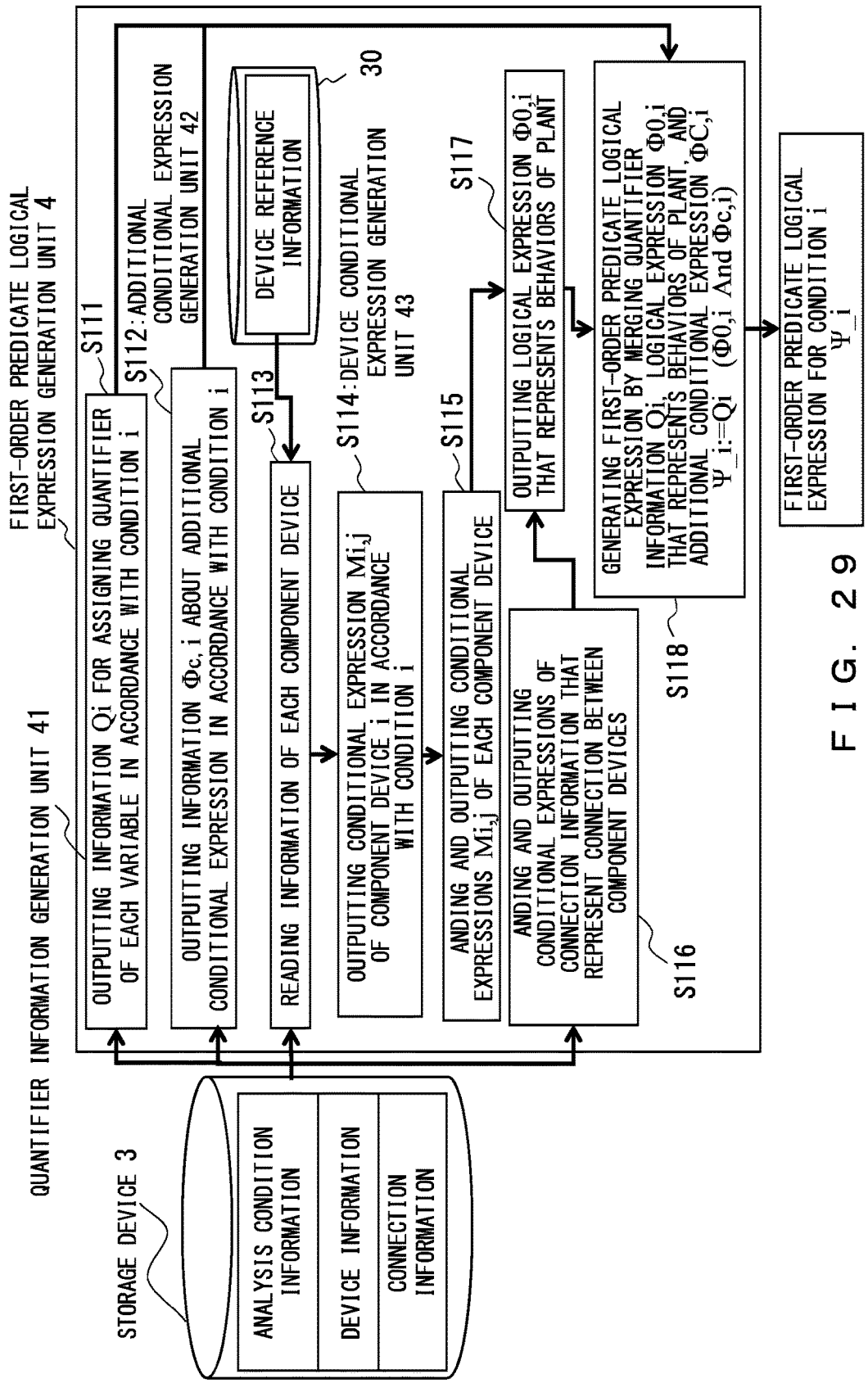
FIG. 29 illustrates a flow of operations of a first-order predicate logical expression generation unit in the fifth embodiment.

FIG. 29 illustrates a flow of operations of the first-order predicate logical expression generation unit 4 in this embodiment. The operations of a process of the first-order predicate logical expression generation unit 4 illustrated in FIG. 29 are executed at timing similar to that of the operations of the process illustrated in FIGS. 8 and 13. The operations are performed, for example, at the timing when a user has made, to the energy analysis device 100, an input such that needed information has been registered in the storage device 3, or at the timing when a user has input, to the energy analysis apparatus 100, an instruction for generating a first-order predicate logical expression.

The flow of operations of the first-order predicate logical expression generation unit 4 in this embodiment is described by comparing it with the flow of operations according to the first embodiment illustrated in FIG. 8. In the flow of operations illustrated in FIG. 29, the quantifier information generation unit 41 of the first-order predicate logical expression generation unit 4 generates information Qi from the analysis condition information, the device information and the connection information, which are stored in the storage device 3 in step S111. The information Qi is configured with a mathematical expression that represents a quantifier to be assigned to each variable included in the device information and the connection information, and the quantifier information generation unit 41 generates the information Qi in accordance with an analysis condition i. The following description assumes that the information Qi is "information Qi for assigning a quantifier", and the information Qi is distinguished from "quantifier information" an input of which is accepted by the quantifier information input unit 2 in the first to the fourth embodiments.

As described above in the explanation of FIG. 28, the energy analysis apparatus 100 can register a plurality of analysis conditions in the storage device 3 as analysis condition information. When a plurality of analysis conditions are registered, the quantifier information generation unit 41 generates and outputs information Qi for assigning a quantifier, which corresponds to each analysis condition i. Operations of the quantifier information generation unit 41 will be described in detail later with reference to FIG. 32.

In step S112, an additional conditional expression generation unit 42 of the first-order predicate logical expression generation unit 4 generates and outputs information Φc,i. The information Φc,i is configured with a conditional expression to be added to a first-order predicate logical expression in accordance with an analysis condition i, and the additional conditional expression generation unit 42 generates information Φc,i in accordance with the analysis condition i. Operations of the additional conditional expression generation unit 42 will be described in detail later with reference to FIG. 44 in an explanation of another embodiment to be described later.

In step S113, the first-order predicate logical expression generation unit 4 executes a process similar to step S42 of FIG. 8. Namely, the first-order predicate logical expression generation unit 4 reads device information from the storage device 3. At this time, in a case where the device information read from the storage device 3 is accumulated, for example, in a storage unit 30 within the first-predicate logical expression generation unit 4 when the series of process steps illustrated in FIG. 29 is executed, the first-order predicate logical expression generation unit 4 may obtain the device information from the storage unit 30.

Then, in step S114, a device conditional expression generation unit 43 of the first-order predicate logical expression generation unit 4 generates and outputs a conditional expression Mi,j of a device j in accordance with the analysis condition i. In step S115, the first-order predicate logical expression generation unit 4 ANDs and outputs conditional expressions Mi,j generated in step S114. Operations of the device conditional expression generation unit 43 will be described in detail with reference to FIG. 38 in an explanation of another embodiment to be described later.

In step S116, the first-order predicate logical expression generation unit 4 executes a process similar to step S48 of FIG. 8. Namely, the first-order predicate logical expression generation unit 4 reads the connection information from the storage device 3, and ANDs and outputs conditional expressions of connection information that represents connection information between component devices on the basis of the read connection information.

In step S117, the first-order predicate logical expression generation unit 4 executes a process similar to step S49 of FIG. 8. Here, the first-order predicate logical expression generation unit 4 generates a logical expression Φ0,i, which represents the behaviors of a plant, by merging the conditional expression Mi,j for each component device, which has been generated in step S115, and the conditional expression of the connection information, which has been generated in step S116.

In step S118, the first-order predicate logical expression generation unit 4 generates and outputs a first-order predicate logical expression Ψ_i by merging the information Qi for assigning a quantifier, which is generated in step S111, the logical expression Φ0,i generated in step S117, and the additional conditional expression Φc,i generated in step S112. In this way, the first-order predicate logical expression Ψ_i corresponding to an analysis condition i is obtained.

As evaluation axes set as analysis condition information, two axes such as x and y axes are set in this embodiment. Operations of the energy analysis apparatus 100 when the two axes such as x and y axes are set as evaluation axes are specifically described below.

FIG. 30 illustrates an example of analysis condition information in this embodiment.

As illustrated in FIG. 30, when the two axes such as the x and the y axes are set as evaluation axes, variables to be displayed for the x and the y axes in a graph generated by the visualization unit 6 among variables registered as device information are set.

FIG. 31 illustrates a specific example of the analysis condition i (i=1). In a "condition 1", which is the analysis condition i=1 in FIG. 31, a variable x1 (demand1_x1) of the steam using facility demand1 and a variable x1 (energy1_x1) of the gas supply facility energy1 of FIG. 22 are respectively set for the x and the y axes.

Figure 32:
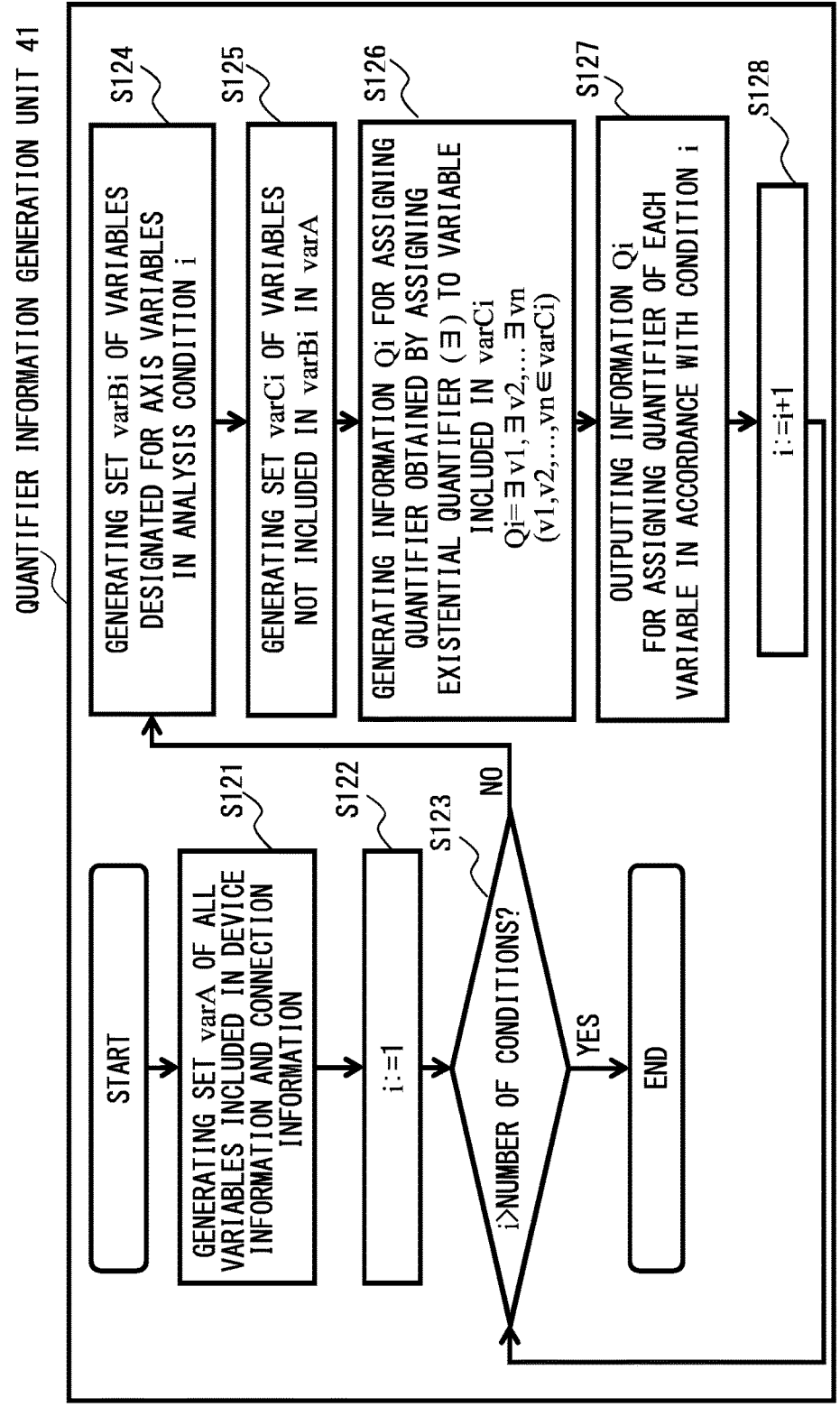
FIG. 32 illustrates a flow of operations of a quantifier information generation unit.

FIG. 32 illustrates a flow of operations of the quantifier information generation unit 41. This gives the details of the flow of step S111 illustrated in FIG. 29. When evaluation axes are set as an analysis condition as in the "condition 1" illustrated in FIG. 31, information Qi for assigning a quantifier is generated by executing a series of process steps illustrated in FIG. 32 by means of the quantifier information generation unit 41 of FIG. 29.

Initially, in step S121, the quantifier information generation unit 41 generates a set varA of all the variables included in device information and connection information. Then, in step S122, the quantifier information generation unit 41 initializes an index i used to identify an analysis condition registered in the storage device 3, and sets the value of the index i to "1".

In step S123, the quantifier information generation unit 41 determines whether the value of the index i is larger than the number of analysis conditions registered in the storage device 3. When the value of the index i is equal to or smaller than the number of registered analysis conditions, the process is moved to step S124. When the value of the index i is larger than the number of registered analysis conditions, the process is terminated.

In step S124, the quantifier information generation unit 41 generates a set varBi of variables designated as variables of the x and the y axes, which are evaluation axes in the analysis condition i corresponding to the index i. In the example illustrated in FIG. 31, the variables demand1_x1 and energy1_x1 are included in the set varBi (i=1).

In step S125, the quantifier information generation unit 41 generates a set varCi of variables, which are not included in the set varBi generated in step S124, within the set varA generated in step S121.

Then, in step S126, the quantifier information generation unit 41 generates information Qi for assigning a quantifier, which is obtained by assigning an existential quantifier) to a variable included in the set varCi generated in step S125.

The information Qi for assigning a quantifier, which is generated here, is represented as follows.

$$Qi = \exists v1, \exists v2, \ldots \exists vn(v1, v2, \ldots vn \in varCi)$$

In step S127, the quantifier information generation unit 41 outputs the information generated in step S126, namely, the information Qi for assigning a quantifier for each variable in accordance with the analysis condition i.

In step S128, the quantifier information generation unit 41 increments the index i by 1, and the process returns to step S123. Thereafter, the quantifier information generation unit 41 repeats process steps similar to the above described ones. When the quantifier information generation unit 41 determines that the value of the index i has become larger than the number of registered analysis conditions in step S123, the process is terminated by recognizing that the information Qi for assigning a quantifier for all the registered analysis conditions i has been generated and output.

FIG. 33 illustrates a first-order predicate logical expression Ψ_1 that the first-order predicate logical expression generation unit 4 generates by executing the above described series of process steps.

An expression (5) in the first-order predicate logical expression Ψ_1 illustrated in FIG. 33 is based on the information Q1 that the quantifier information generation unit 41 outputs in step S111 of FIG. 29, namely, that the quantifier information generation unit 41 outputs as results of the execution of the series of process steps illustrated in FIG. 32. When n analysis conditions are registered in the storage device 3, the quantifier information generation unit 41 outputs n pieces of information Qi (i=1, . . . , n) for assigning a quantifier. A first-order predicate logical expression is generated by using desired information Qi (i=1 in the example of FIG. 33). The information Q1 for assigning a quantifier differs from that of the first to the fourth embodiments in that a quantifier merging variables is also assigned with the series of process steps of FIG. 33.

Expressions (6) and (7) are conditional expressions M1,1 and M1,2 of devices, which are output in step S115 of FIG. 29. The expression (6) among these expressions is a conditional expression of the gas supply facility energy1 of FIG. 22, while the expression (7) is a conditional expression of the steam generation facility supply3 of FIG. 22. Both of the expressions (6) and (7) are conditional expressions set in accordance with the "condition 1". However, the condition 1 is an analysis condition for designating only the x and the y axes, which are evaluation axes, as illustrated in FIG. 30. Accordingly, in the two conditional expressions M1,1 and M1,2, conditional expressions are written in accordance with content registered as device information in the storage device 3. A method for generating a conditional expression of each device from device information registered in the storage device 3 is described earlier with reference to the expressions (2) and (3) of FIG. 14 in the explanation of the above described embodiment.

In FIG. 33, conditional expressions M1,j for other devices are omitted due to space restrictions.

An expression (8) is a conditional expression for connection information based on information output in step S116 of FIG. 29. The conditional expression (8) for connection information represents that the output y1 from the gas supply facility energy1 is equal to the input u1 to the steam generation facility supply3, the output y2 from the gas supply facility energy1 is equal to the input u1 to the steam generation facility supply2, and the output y3 from the gas supply facility energy1 is equal to the input u1 to the steam generation facility supply1 Conditional expressions for other connection information in the plant configuration of FIG. 22 are omitted due to space restrictions.

In the analysis conditions of FIG. 30, information $\Phi c,i$ about an additional conditional expression is not present in step S112 of FIG. 29. This will be specifically explained later in an explanation of a seventh embodiment.

FIG. 34 illustrates a logical expression $\Phi\_1$ obtained by applying a known quantifier elimination algorithm to the first-order predicate logical expression $\Psi\_1$ of FIG. 33.

Here, an explanation of details of the logical expression $\Phi\_1$ is omitted. The logical expression $\Phi\_1$ obtained by applying a known quantifier elimination algorithm to the first-order predicate logical expression $\Psi\_1$ represents a logical expression to be satisfied by the variables demand1_x1 and energy1_x1. The two variables demand1_x1 and energy1_x1 are variables respectively set for the x axis and the y axis, which are evaluation axes, in the analysis condition i=1 as described earlier with reference to FIG. 30.

As described above, the energy analysis apparatus 100 according to this embodiment generates first-order predicate logical expressions of a number equal to that of analysis conditions by executing the above described process steps for all the pieces of analysis condition information registered in the storage device 3. By applying a quantifier elimination algorithm respectively to the generated first-order predicate logical expressions $\Psi$, logical expressions $\Phi$ of a number equal to that of analysis conditions can be obtained. When a user identifies a specified analysis condition, the visualization unit 6 of the energy analysis apparatus 100 displays, on the display means such as a monitor or the like, a graph obtained by visualizing a logical expression $\Phi$ that corresponds to the analysis condition.

Figure 35:
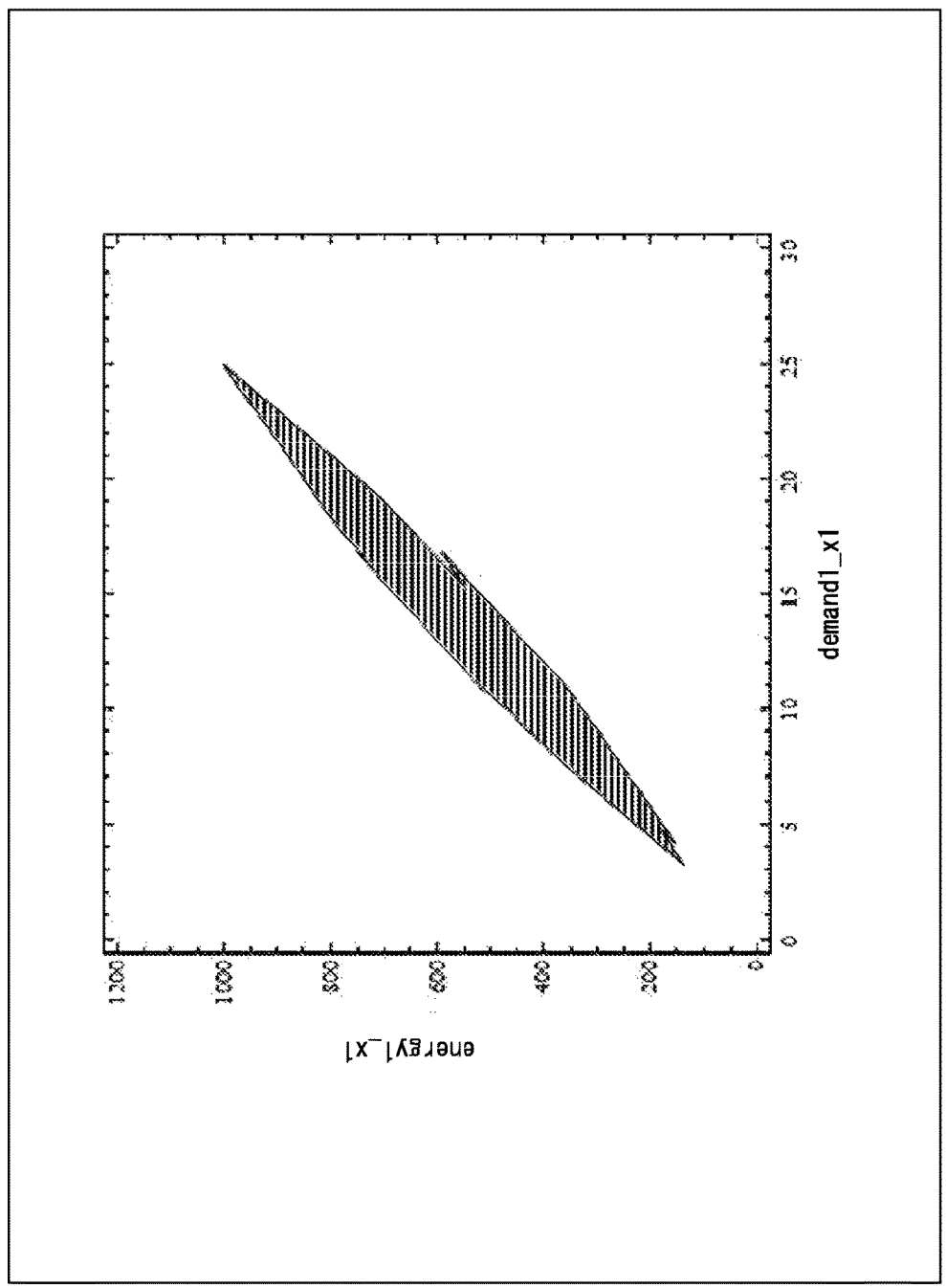
FIG. 35 illustrates an example of an image including a graph obtained by visualizing the logical expression of FIG. 34.

FIG. 35 illustrates an example of an image including the graph obtained by visualizing the logical expression $\Phi\_1$ of FIG. 34.

In the graph within the image illustrated in FIG. 35, the variables demand1_x1 and energy1_x1 are taken respectively for the x axis, which is a horizontal axis, and the y axis, which is a vertical axis, and an area satisfied by the logical expression $\Phi\_1$ of FIG. 34 is displayed as a two-dimensional graph. A user performs various types of analyses by referencing the image including the graph of FIG. 35.

As described above, with the energy analysis apparatus 100 according to this embodiment, two axes, which are evaluation axes, are preset as an analysis condition. At this time, two variables among variables included in device information are set respectively for the two axes. A first-order predicate logical expression $\Psi$ is generated in accordance with this analysis condition and a quantifier elimination algorithm is applied to the logical expression $\Psi$, so that a logical expression $\Phi$ satisfied by the two variables that are respectively set for the evaluation axes as an analysis condition is obtained. As described above, the energy analysis apparatus 100 according to this embodiment can support various cases of plant evaluations of a user by setting a suitable analysis condition, and can easily perform an energy analysis based on a first-order predicate logical expression that is normally regarded as being difficult.

Additionally, the energy analysis apparatus 100 can obtain a logical expression $\Phi$ by applying a quantifier elimination algorithm to a generated first-order predicate logical expression $\Psi$, and can also generate, output and display a graph on the basis of the logical expression $\Phi$. Thus, results obtained by analyzing a plant can be visualized in accordance with a plant evaluation case set by a user, and a generated image can also be provided to the user.

Sixth Embodiment

In the above described fifth embodiment, evaluation axes are set as an analysis condition. Then, a logical expression $\Phi$ for variables set for the evaluation axes is obtained by applying a quantifier elimination algorithm to a first-order predicate logical expression in accordance with the analysis condition. In this embodiment, a running/stopping state of a device is further registered as an analysis condition in addition to the evaluation axes. A first-order predicate logical expression is generated in accordance with the running/stopping state of a device included in the analysis condition, and a logical expression $\Phi$ is obtained by applying a quantifier elimination algorithm to the first-order predicate logical expression, so that a logical expression $\Phi$ according to the running/stopping state of the device is obtained.

An energy analysis apparatus 100 according to this embodiment is described below by mainly referring to differences from the above described fifth embodiment. Configurations of the energy analysis apparatus 100 and a plant to be analyzed are similar to those of the fifth embodiment, and are as described above with reference to FIGS. 21 and 22. Therefore, explanations of the configurations are omitted here.

FIG. 36 illustrates an example of analysis condition information in this embodiment.

As illustrated in FIG. 36, analysis condition information further includes a running/stopping state of each device in this embodiment. Similarly to the fifth embodiment, the analysis condition information also includes evaluation axes although these are not illustrated in FIG. 36.

FIG. 37 illustrates a specific example of an analysis condition i (i=2). Here, x and y axes, which are evaluation axes, in the condition 2, which is the analysis condition of i=2, are similar to those of FIG. 31.

As running/stopping states of devices, those of the steam generation facilities supply1 to supply3 among the devices that configure the plant are set. Specifically, the running/stopping states of supply3, supply2 and supply1 are respectively set to "running", "stopping", and "running or stopping (switchable between running and stopping)". Accordingly, an analysis using the condition 2 is equivalent to an analysis of the state of the plant when any of "running", "stopping" and "running or stopping" is selectable as running/stopping states of particular devices, the devices supply1 to supply3 of FIG. 22 in this embodiment, regardless of running/stopping states set in device information.

The example illustrated in FIG. 37 represents the case where the "running/stopping" state of each device is set as analysis condition information. However, the analysis condition information is not limited to this. For example, a "used/unused" state of each device can be set.

FIG. 38 illustrates a flow of operations of the device conditional expression generation unit 43 illustrated in FIG. 29. This is a detailed flow of step S114 illustrated in FIG. 29 referenced to explain the above described fifth embodiment. When evaluation axes and running/stopping states of devices are set as an analysis condition as in the "condition 2" of FIG. 37, the device conditional expression generation unit 43 of the first-order predicate logical expression generation unit 4 generates a conditional expression Mi,j for each of the devices by executing the series of process steps illustrated in FIG. 38.

Initially, in step S131, the device conditional expression generation unit 43 initializes the index i. This process is similar to step S122 of FIG. 32. In step S132, the device conditional expression generation unit 43 determines whether the value of the index i is larger than the number of analysis conditions registered in the storage device 3. This process is similar to the process of step S123 illustrated in FIG. 32. When the value of the index i is equal to or smaller than the number of analysis conditions, the process is moved to step S133.

In step S133, the device conditional expression generation unit 43 initializes an index j, and sets the value of the index j to "1". In this embodiment, the index j is used to identify a device registered as device information in the storage device 3.

In step S134, the device conditional expression generation unit 43 determines whether the value of the index j is larger than the number of devices registered as device information in the analysis condition i. When the value of the index j is equal to or smaller than the number of devices, the process is moved to step S135. Alternatively, when the value of the index j is larger than the number of devices, the process is moved to step S142.

In step S135, the device conditional expression generation unit 43 obtains a mathematical expression of a running state and a mathematical expression of a stopping state from among the device information of the jth device. Then, in step S136, the device conditional expression generation unit 43 determines a designated running/stopping state of the jth device in the analysis condition i. When the running/stopping state of the jth device is set to "running" in the analysis condition i, the process is moved to step S137. When the running/stopping state is set to "stopping", the process is moved to step S138. Alternatively, when the running/stopping state is set to "running or stopping", the process is moved to step S139.

When an analysis condition is not particularly set in the analysis condition i for the jth device in step S136, the process is moved to any of steps S137 to S139 in accordance with a setting of a running/stopping state included in the device information.

In step S137, the device conditional expression generation unit 43 recognizes the mathematical expression of a running state as an expression $M_{i,j}$ among mathematical expressions obtained in step S135, and the process proceeds to step S140. Here, "expression $M_{i,j}$" represents a conditional expression for the jth device in the analysis condition i.

In step S138, the device conditional expression generation unit 32 sets the mathematical expression of a stopping state as an expression $M_{i,j}$ among the mathematical expressions obtained in step S135, and the process proceeds to step S140. In step S139, the device conditional expression generation unit 43 ORs the mathematical expression of a running state and the mathematical expression of a stopping state, and defines an ORed result as an expression $M_{i,j}$. Then, the process proceeds to step S140.

In step S140, the device conditional expression generation unit 43 outputs the expression $M_{i,j}$ generated in any of steps S137 to S139 as a conditional expression for the jth device in the analysis condition i. In step S141, the device conditional expression generation unit 43 increments the index j by 1, and the process returns to step S134. Thereafter, the device conditional expression generation unit 43 repeats process steps similar to the above described ones. When the device conditional expression generation unit 43 has generated and output conditional expressions $M_{i,j}$ for all the devices (when the value of the index j becomes larger than the number of devices registered as device information), the process is moved from step S134 to step S142.

In step S142, the device conditional expression generation unit 43 increments the index i by 1, and the process returns to step S132. Process steps in and after step S132 are as described above. The device conditional expression generation unit 43 repeats process steps similar to the above described ones. When the device conditional expression generation unit 43 has generated and output conditional expressions $M_{i,j}$ for all the analysis conditions i registered in the storage device 3, namely, when the value of the index i becomes larger than the number of analysis conditions, the process is terminated.

Figure 39:
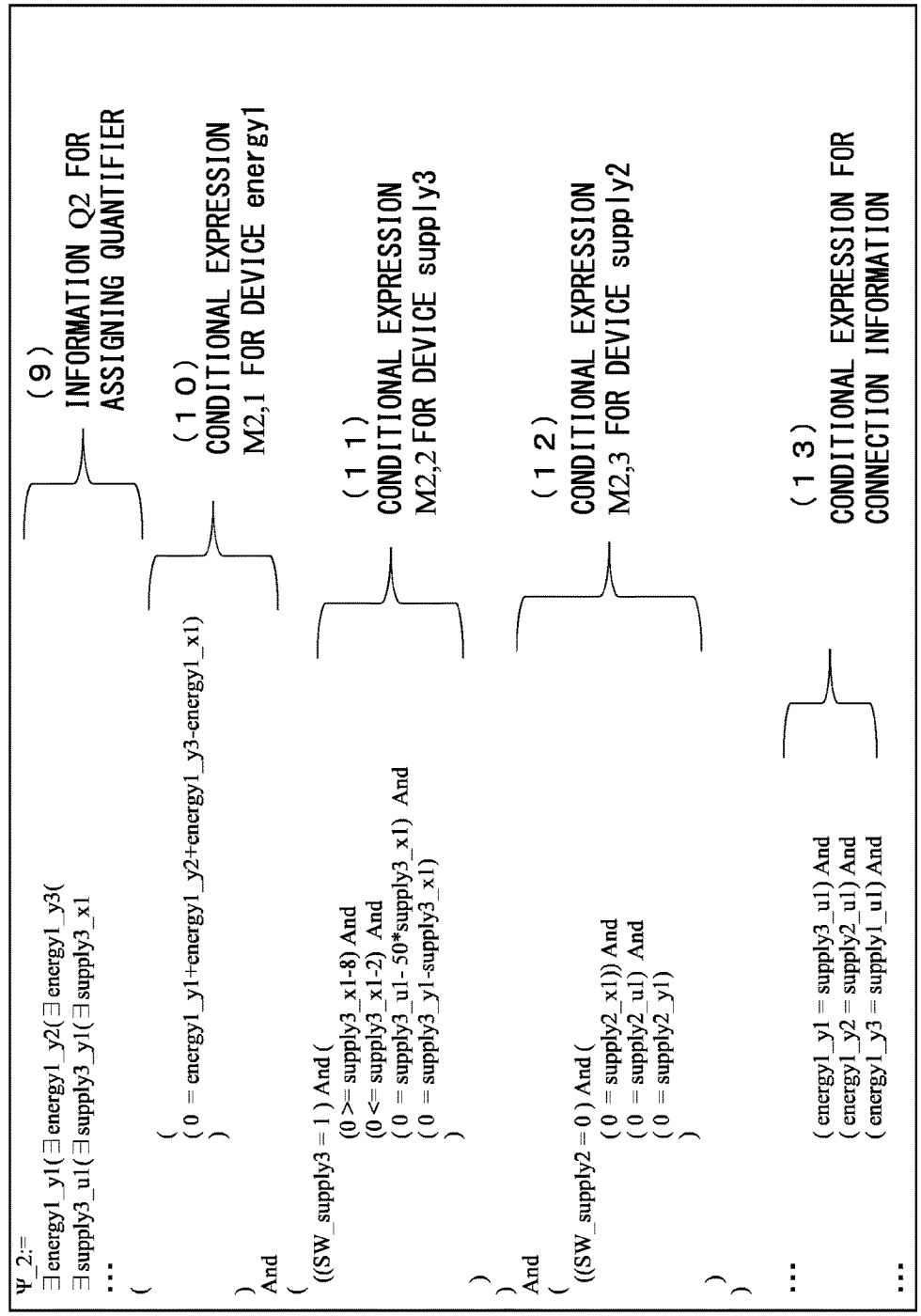
FIG. 39 illustrates a first-order predicate logical expression generated by the first-order predicate logical expression generation unit.

FIG. 39 illustrates a first-order predicate logical expression $\Psi\_2$ that the first-order predicate logical expression generation unit 4 generates by executing the above described series of process steps.

Expressions (10) to (12) in the first-order predicate logical expression $\Psi\_2$ illustrated in FIG. 39 are conditional expressions generated and output by the device conditional expression generation unit 43 illustrated in FIG. 38. FIG. 39 only illustrates the conditional expression $M_{2,j}$ for some of the devices due to space restrictions.

As described earlier with reference to FIG. 36 and the like, analysis condition information includes evaluation axes, and running/stopping states of devices in this embodiment. Information Q2 (9) for assigning a quantifier in the series of process steps executed by the first-order predicate logical expression generation unit 4 illustrated in FIG. 29 is generated with a method similar to that described in the aforementioned fifth embodiment by using analysis condition information.

Also, a conditional expression (13) for connection information is generated with a method similar to that for generating the expression (8) of FIG. 33 described in the above fifth embodiment.

FIG. 40 illustrates a logical expression $\Phi\_2$ obtained by applying a known quantifier elimination algorithm to the first-order predicate logical expression $\Psi\_2$ of FIG. 39. Also the logical expression $\Phi\_2$ illustrated in FIG. 40 represents a logical expression to be satisfied by the two variables demand1_x1 and enrgy1_x1 similarly to the logical expression $\Phi\_1$ of FIG. 34.

Figure 41:
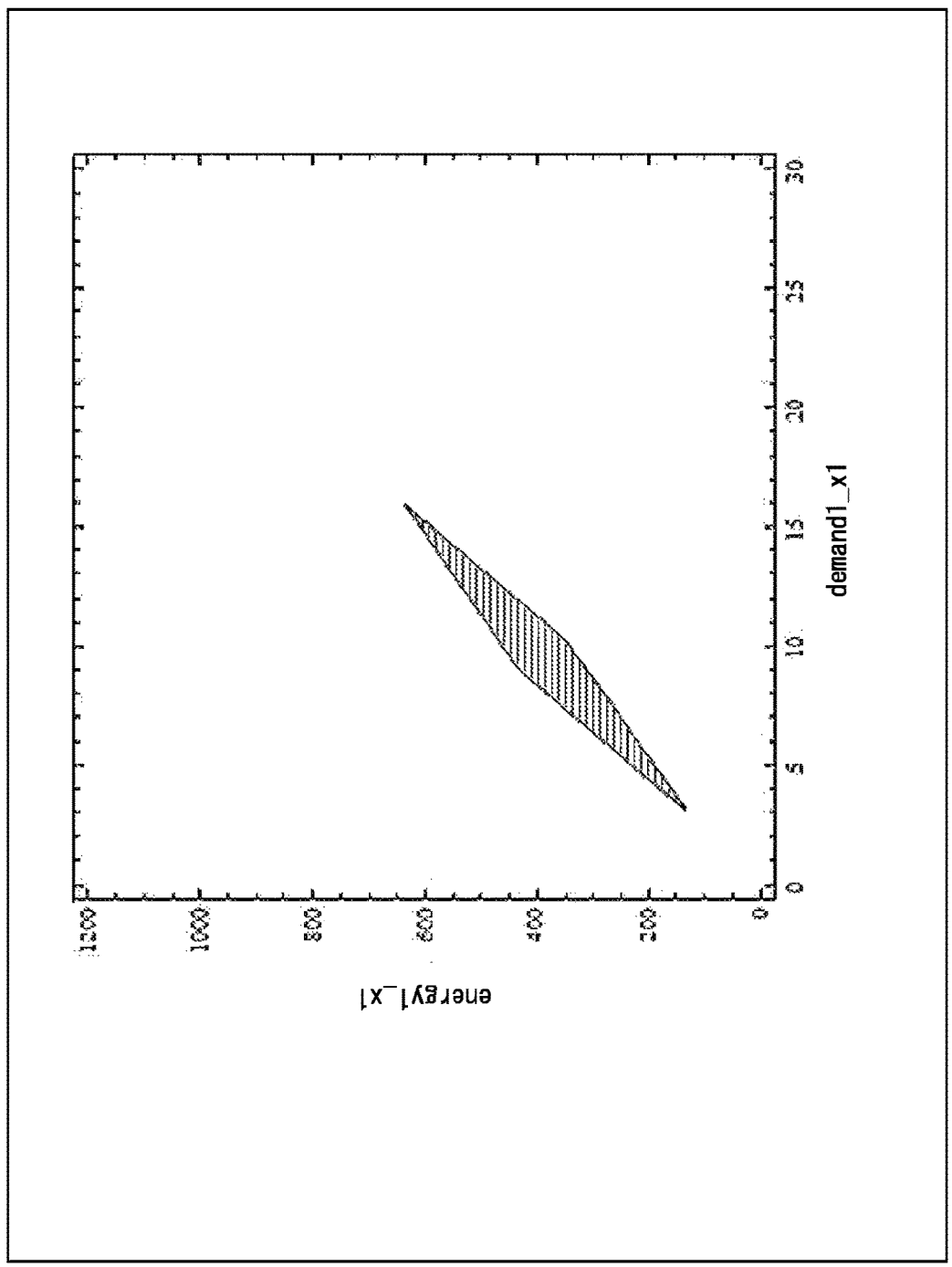
FIG. 41 illustrates an example of an image including a graph obtained by visualizing the logical expression of FIG. 40.

FIG. 41 illustrates an example of an image including a graph obtained by visualizing the logical expression $\Phi\_2$ of FIG. 40. Also, for the graph illustrated in FIG. 41, the variables demand1_x1 and energ1_x1 are taken respectively for a horizontal axis (x axis) and a vertical axis (y axis) similarly to the graph of FIG. 35. In FIG. 41, an area satisfied by the logical expression $\Phi\_2$ is displayed as a graph. The area satisfied by the logical expression $\Phi\_2$ is different from that satisfied by the logical expression $\Phi\_1$ of FIG. 35 because the running/stopping states of the devices are set in the analysis condition i=2.

As described above, with the energy analysis apparatus 100 according to this embodiment, effects similar to those of the fifth embodiment can be achieved. Moreover, in the energy analysis apparatus 100 according to this embodiment, running/stopping states of devices are included as an analysis condition in addition to evaluation axes. As a result, an energy analysis based on a first-order predicate logical expression $\Psi$ when a specified device that configures a plant is set to a particular operation state (running, stopping, or switchable between running and stopping), or set to a use state (used, unused, or switchable between used and unused) can be easily performed.

Seventh Embodiment

In the above described sixth embodiment, the running/stopping states of the devices are set as an analysis condition in addition to the evaluation axes. In this embodiment, a specified variable, and a specific numeric value to be substituted for the specified variable are set as an analysis condition in addition to the evaluation axes.

The energy analysis apparatus 100 according to this embodiment is described below by mainly referring to differences from the above described fifth embodiment. Configurations of the energy analysis apparatus 100 and a plant to be analyzed are similar to those of the fifth embodiment, and are as illustrated in FIGS. 21 and 22.

FIG. 42 illustrates an example of analysis condition information in this embodiment.

As illustrated in FIG. 42, a specific value is designated as analysis condition information for a specified variable among variables included in device information and connection information. Analysis condition information also includes evaluation axes although these are not illustrated in FIG. 42.

FIG. 43 illustrates a specific example of an analysis condition i (i=3). Here, x and y axes, which are evaluation axes, in a "condition 3", which is an analysis condition of i=3 illustrated in FIG. 43, are similar to those in FIGS. 31 and 37.

In the condition 3, a specified variable and a value of the variable are specifically designated among variables set as the device information. In FIG. 43, the variable supply3_y1 is set to a value "8". Accordingly, an analysis using the condition 3 is equivalent to an analysis of a state of the plant when the steam generation of a particular device, the device supply3 of FIG. 22 in this embodiment, is fixed at 8[t/h].

In the following description, a variable having a value designated in analysis condition information is referred to as a "substituted variable". FIG. 43 illustrates a case where the number of substituted variables is one. However, two or more substituted variables may be set.

FIG. 44 illustrates a flow of operations of the additional conditional expression generation unit 42 illustrated in FIG. 29. FIG. 44 illustrates details of a flow of step S112 illustrated in FIG. 29 referenced to describe the above fifth embodiment. When evaluation axes, a substituted variable and a value of the variable are set as an analysis condition as in the "condition 3" of FIG. 43, the additional conditional expression generation unit 42 of the first-order predicate logical expression generation unit 4 generates an additional conditional expression by executing the series of process steps of FIG. 44 below.

Initially, steps S151 and S152 are similar to steps S131 and S132 of FIG. 38. The additional conditional expression generation unit 42 initializes the index i, and determines whether the value of the index i is larger than the number of analysis conditions registered in the storage device 3. When the value of the index i is equal to or smaller than the number of analysis conditions, the process is moved to step S153.

In step S153, the additional conditional expression generation unit 42 sets an additional conditional expression Φc,i to "True". The "conditional expression Φc,i" is a conditional expression that is generated in accordance with an analysis condition i, and is added to a first-order predicate logical expression Ψ_i. The conditional expression Φc,i is added to the first-order predicate logical expression Ψ_i in addition to information Qi for assigning a quantifier, a conditional expression Mi,j for each device j, and a conditional expression for connection information.

In step S154, the additional conditional expression generation unit 42 generates a set varDi of variables designated as substituted variables in an analysis condition i. Then, in step S155, after the index j is initialized to 1, the process is moved to step S156. In this embodiment, the index j is used to identify a substituted variable set in the analysis condition i. Here, (the number of substituted variables)=(the number of variables included in the set varDi).

In step S156, the additional conditional expression generation unit 42 determines whether the value of index j is larger than the number of variables included in the set varDi. When the value of the index j is equal to or smaller than the number of variables included in the set varDi, the process is moved to step S158.

In step S158, the additional conditional expression generation unit 42 generates, for a value vj corresponding to a jth variable aj among the variables included in the set varDi, a logical expression "aj=vj" representing that the value vj is substituted for the variable aj. Then, in step S159, the additional conditional expression generation unit 42 ANDs the logical expression "aj=vj" generated in step S158 and the above described additional conditional expression Φc,i.

$$\Phi c,i := \Phi c,I \text{ And } (aj=vj)$$

In step S160, the additional conditional expression generation unit 42 increments the index j by 1, and the process returns to step S156. Thereafter, the additional conditional expression generation unit 42 repeats process steps similar to the above described ones, and ANDs the logical expression aj=vj, in which the value vj is substituted for the substituted variable aj, and the additional conditional expression Φc,i. When logical expressions for substituting values for all the substituted variables have been added, namely, when the value of the index j becomes larger than the number of variables included in the set varDi, the process is moved from step S156 to step S157.

In step S157, the additional conditional expression generation unit 42 increments the index i by 1, and the process returns to the determination of step S152. When the process for generating the additional conditional expression Φc,i has been completed for all the analysis conditions i (when the value of the index i becomes larger than the number of analysis conditions registered in the storage device 3), the process is terminated.

FIG. 45 illustrates a first-order predicate logical expression Ψ_3 that the first-order predicate logical expression generation unit 4 generates by executing the above described series of process steps.

An expression (18) in the first-order predicate logical expression Ψ_3 illustrated in FIG. 45 is a conditional expression Φc,3 that is generated and added by the additional conditional expression generation unit 42 illustrated in FIG. 44. Here, the number of substituted variables is one, and a logical expression "supply3_y1=8" that represents a value "8" is substituted for a variable supply3_y1 and is ANDed.

Also in this embodiment, similarly to the above described sixth embodiment, information Q3 (14) for assigning a quantifier, conditional expressions M3,j for devices (15) and (16), and a conditional expression for connection information (17) are generated with a method similar to that of the fifth embodiment. FIG. 45 only illustrates conditional expressions M3,j for some of the devices due to space restrictions, similarly to FIGS. 33 and 39.

FIG. 46 illustrates a logical expression Φ_3 obtained by applying a known quantifier elimination algorithm to the first-order predicate logical expression Ψ_3 of FIG. 45. Also, the logical expression Φ_3 illustrated in FIG. 46 represents a logical expression to be satisfied by the two variables demand1_x1 and energy1_x1 similarly to the logical expression $\Phi\_1$ illustrated in FIG. 34 and the logical expression $\Phi\_2$ illustrated in FIG. 40.

Figure 47:
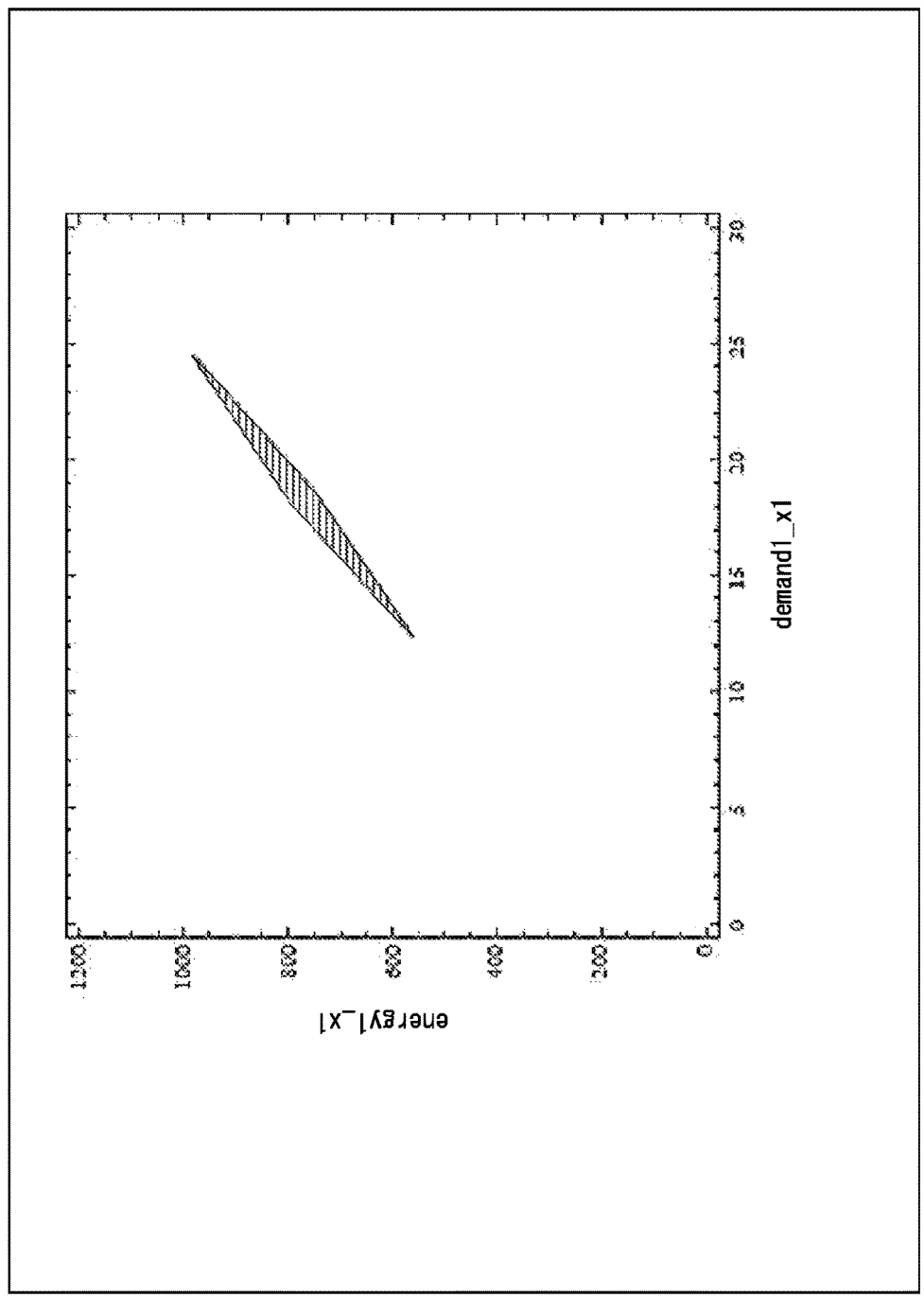
FIG. 47 illustrates an example of an image including a graph obtained by visualizing the logical expression of FIG. 46.

FIG. 47 illustrates an example of an image including a graph obtained by visualizing the logical expression $\Phi\_3$ illustrated in FIG. 46.

Similarly to the graphs illustrated in FIGS. 35 and 41, the variables demand1_x1 and energy1_x1 are taken respectively for a horizontal axis (x axis) and a vertical axis (y axis) also in the graph within the image illustrated in FIG. 47. In FIG. 47, an area satisfied by the logical expression $\Phi\_3$ is displayed as a graph.

The above description refers to the case where the analysis condition information includes the evaluation axes, the substituted variables and the values of the substituted variables. However, the analysis condition information is not limited to this. The analysis condition information may further include, for example, information that indicates operation states of devices and has been described in the sixth embodiment.

As described above, with the energy analysis apparatus 100 according to this embodiment, effects similar to those of the fifth and the sixth embodiments can be achieved. Moreover, in the energy analysis apparatus 100 according to this embodiment, analysis information includes, as an analysis condition, a specified variable and a value to be substituted for the specified variable in addition to evaluation axes. Thus, an energy analysis based on a first-order predicate logical expression $\Psi$, for example, when an input or an output of a specified device that configures a plant has a fixed value can be easily performed.

Eighth Embodiment

In the above described fifth to seventh embodiments, the visualization unit 6 of FIG. 21 generates a graph that corresponds to specified analysis condition information among analysis condition information registered in the storage device 3. In this embodiment, graphs that respectively correspond to a plurality of pieces of analysis condition information are generated.

Figure 48:
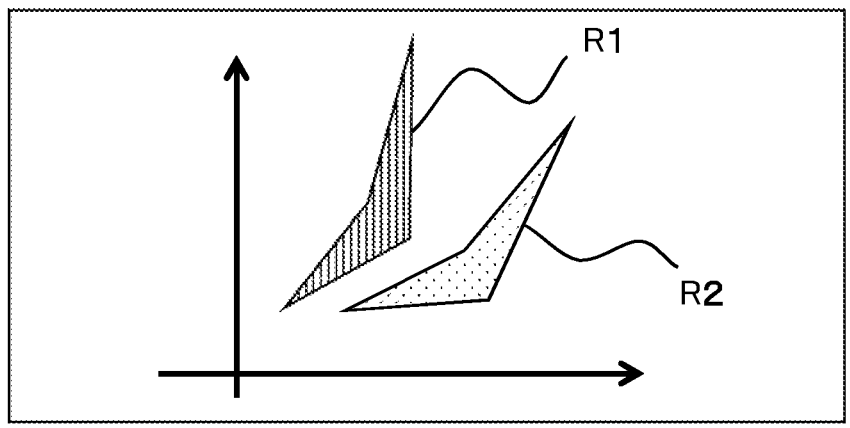
FIG. 48 is an explanatory diagram of a concept of a visualization process executed by a visualization unit of an energy analysis apparatus according to an eighth embodiment.

FIG. 48 is an explanatory diagram of a concept of a visualization process executed by the visualization unit 6 of an energy analysis apparatus 100 according to this embodiment.

According to this embodiment, when two analysis conditions are designated by a user or the like, logical expressions $\Phi$ that respectively correspond to the analysis conditions are obtained with the method described in the above fifth to seventh embodiments. Then, graphs that respectively represent areas satisfied by the logical expressions $\Phi$ are simultaneously displayed in one image. FIG. 48 schematically illustrates an image where corresponding areas R1 and R2 are drawn when the two analysis conditions 1 and 2 are designated.

Figure 49:
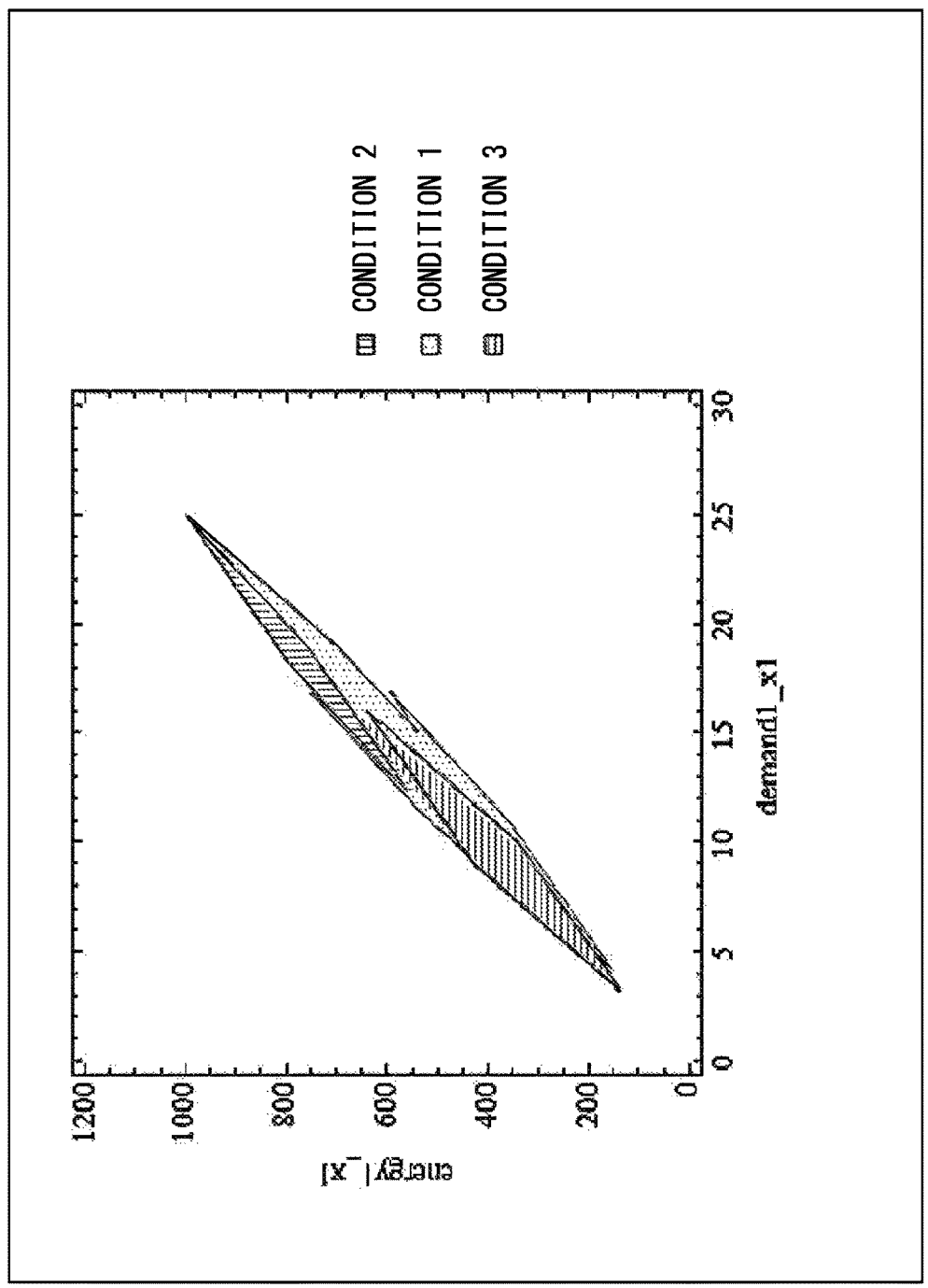
FIG. 49 illustrates an example of an image when graphs that correspond to analysis conditions of FIGS. 31, 37 and 43 are simultaneously displayed.

FIG. 49 illustrates an example of an image in a case where graphs that respectively correspond to the analysis conditions of FIGS. 31, 37 and 43 are simultaneously displayed.

As represented by the three graphs illustrated in FIG. 49, a range corresponding to the analysis condition 1 set in FIG. 31 is widest. Ranges respectively corresponding to the analysis condition 2 that designates a particular device as being running or stopping, and the analysis condition 3 that designates an output of a particular device as a fixed value are narrower than that of the analysis condition 1.

As described above, according to this embodiment, for example, graphs that respectively correspond to different analysis conditions i (i=1, 2, 3 in the example of FIG. 49) used to describe the above fifth to seventh embodiments can be simultaneously displayed in one image. A user can visually review and compare among different analysis conditions by designating the analysis conditions for a plant composed of the same systems (the plant configuration of FIG. 22 in this embodiment). For example, the energy analysis apparatus 100 according to this embodiment can be utilized to variously review, for example, operation conditions of a plant, facilities, and the like.

Additionally, FIG. 49 illustrates the case where the areas respectively satisfied by the three graphs are simultaneously displayed in one image. However, the display of graphs is not limited to this. For example, the display can be switched for each analysis condition in accordance with a user instruction or the like. In this case, an image displayed on display means such as a monitor or the like is switched from the image of FIG. 49 to that of FIG. 31, 37 or 43. As the image after being switched, three images may be simultaneously displayed, or images may be switched one by one in accordance with a user instruction or the like. The energy analysis apparatus 100 is configured so that switching can be performed between the form where three graphs are simultaneously displayed in one image and the form where different images are respectively displayed, thereby achieving effects, for example, in a case where a user desires to further review overlapping areas that are present in a graph in a plurality of analysis conditions.

Ninth Embodiment

In the above described fifth to eighth embodiments, a first-order predicate logical expression $\Psi$ is generated on the basis of an analysis condition preregistered in the storage device 3, a logical expression $\Phi$ is obtained by applying a quantifier elimination algorithm to the generated first-order predicate logical expression $\Psi$, and the obtained logical expression $\Phi$ is visualized. In this embodiment, an analysis condition according to an operation state of an actual plant is set, a first-order predicate logical expression is recalculated by using the analysis condition, quantifiers are eliminated, and an obtained logical expression is visualized.

FIG. 50 is an explanatory diagram of an energy analysis method according to this embodiment.

As illustrated in FIG. 50, the energy analysis apparatus 100 according to this embodiment is connected to a plant operation information storage device 130 and an information collection device 50. The information collection device 50 is connected to an actual plant via a network 60. However, devices (devices #1A, #1B, . . . , #NA, #NB) that configure the actual plant are connected to the network 60 via measurement devices #1, . . . , #N.

The measurement devices #1, . . . , #N obtain, from each device, information such as an operation state of the device that configures the plant, and an input value and an output value or the like of the device. The above described operation state indicates any of "running", "stopping" and "switchable between running and stopping". The information collection device 50 collects information obtained by the measurement devices #1, . . . , #N via the network 60, and stores the collected operation states and input and output values and the like of the devices in a plant operation information storage device 130. The information stored in the plant operation information storage device 130 is input to the energy analysis apparatus 100.

The energy analysis apparatus 100 illustrated in FIG. 50 further includes an analysis condition automatic input unit in addition to the configuration illustrated in FIG. 21. In FIG.

50, components other than the analysis condition automatic input unit are omitted for the sake of simplification.

Upon recognition of a specified trigger, the analysis condition automatic input unit sets analysis condition information on the basis of information input by the plant operation information storage device 130. Thus, an analysis using an analysis condition according to the operation state of an actual plant can be performed. Examples of the specified trigger include a specified operation performed by a user, a specified duration or time, or a signal from a specified outside and the like.

As described above in the fifth embodiment, in the energy analysis apparatus 100, analysis condition information is preregistered in the storage device 3, and a first-order predicate logical expression $\Psi$ is generated on the basis of the registered analysis condition information. Then, a logical expression $\Phi$ is obtained by applying a quantifier elimination algorithm to the generated first-order predicate logical expression $\Psi$, and the obtained expression is visualized.

When an analysis condition is newly set by the analysis condition automatic input unit, the energy analysis apparatus 100 according to this embodiment recalculates a first-order predicate logical expression $\Psi$ on the basis of the analysis condition, obtains a logical expression $\Phi$ by eliminating quantifiers from the first-order predicate logical expression $\Psi$, and visualizes the obtained expression. Specifically, the energy analysis apparatus 100 executes the flows of operations illustrated in FIGS. 29 and 32. When a running/stopping state of a device, and a substituted variable and a value of the substituted variable are set in the analysis condition information that is newly set by the analysis condition automatic input unit, the energy analysis apparatus 100 also executes the flows of operations illustrated in FIGS. 38 and/or 44.

As described above, the energy analysis apparatus 100 is configured so that a first-order predicate logical expression and quantifier elimination can be recalculated for an analysis condition set in accordance with an operation state of an actual plant, and an obtained logical expression can be visualized. As a result, a suitable analysis according to the operation state of the actual plant can be performed.

Tenth Embodiment

In the above described embodiments, a user inputs device information, connection information and analysis condition information while referencing the drawing in which the plant configuration of FIG. 22, or the like is written. An energy analysis apparatus 100 according to this embodiment further includes a plant configuration display unit for displaying, on display means such as a monitor or the like, a diagram or the like that represents a plant configuration registered in the storage device 3. A user can input device information, connection information and analysis condition information while visually grasping a plant configuration by referencing the diagram or the like on a screen displayed by the plant configuration display unit.

How to accept inputs of device information, connection information and analysis condition information by means of the energy analysis apparatus 100 according to this embodiment is described in detail below. Configurations of the energy analysis apparatus 100 according to this embodiment and a plant to be analyzed are similar to those of the above described fifth to ninth embodiments, and are as illustrated in FIGS. 21 and 22.

FIG. 51 illustrates an example of a screen SC1 displayed on the monitor or the like by the plant configuration display unit in the energy analysis apparatus 100 according to this embodiment. The screen SC1 illustrated in FIG. 51 is similar to the screen SC1 of FIG. 19. However, the screen SC1 of FIG. 51 differs from the screen SC1 of FIG. 19 in that the analysis condition input unit 2' accepts an input of analysis condition information on the screen SC1 of FIG. 51, whereas the quantifier information input unit 2 accepts an input of quantifier information on the screen SC1 of FIG. 19.

A user arranges an icon or the like that represents a facility similar to the device information 21 at a position where the user desires to add the device information 22 on the screen SC1 of FIG. 51 by operating a pointing device such as a mouse or the like. The position where a user desires to add the device information 22 on the screen SC1 indicates a position, at which the device of the device information 21 is connected to the device of the device information 11 and which is present in the same hierarchy as the device of the device information 21. Upon recognizing that a user has performed an operation—for example, the user has right-clicked the pointing device—the plant information input unit 1 displays a menu M on the screen, and causes the user to select any of menu options such as "change", "add" and "delete" for the device information 22. Here, assume that the user has selected the "add" menu option. Upon recognizing that the user has selected the menu option "add", the plant information input unit 2 newly adds the "device information 22" to the storage device 3.

Similarly, upon recognizing that the user has moved the pointer P to the position of certain device information on the screen SC1 and has selected the menu option "delete" in the menu M displayed, for example, by right-clicking the pointing device, the plant information input unit 1 deletes the corresponding device information from the storage device 3.

Upon recognizing that the user has moved the pointer P to the position of certain device information on the screen SC1 and has selected the menu option "change" in the displayed menu M, the plant information input unit 1 displays, for example, the screen illustrated in FIG. 24. When the user has changed a device name, a connection variable such as an input variable, an output variable or the like, the number of state variables, or the number of conditional expressions via the screen illustrated in FIG. 24, the plant information input unit 1 stores the changed information in the storage device 3.

As described above, evaluation axes and variables displayed for the axes are set in analysis condition information, and a running/stopping state, a substituted variable value and a value of the substituted variable are sometimes set. A user can set analysis condition information while referencing variables and a running/stopping state, which are registered as device information, via the screen SC1.

As described above, with the energy analysis apparatus 100 according to this embodiment, a diagram that represents a plant configuration is displayed on the screen of display means such as a monitor or the like. A user can input device information, connection information and analysis condition information while visually grasping the plant configuration. As a result, input errors can be effectively prevented, and the user can more easily and simply use the above described energy analysis process.

The energy analysis apparatus 100 according to this embodiment may be also configured so that "quantifier information" making an association between each of variables included in device information and a type of a quantifier to be assigned can be input, for example, as in the first to fourth embodiments.

As described above in the explanation of the fifth embodiment, the quantifier information generation unit 41 of the energy analysis apparatus 100 generates information Qi for assigning a quantifier on the basis of a variable set for an evaluation axis in an analysis condition i. However, the method of generating information Qi for assigning a quantifier is not limited to that described in the fifth embodiment. Namely, which variable among variables registered as device information is set for an evaluation axis can also be determined on the basis of information input, for example, via the screen illustrated in FIG. 7 or 16. Specifically, the analysis condition input unit 2' of the energy analysis apparatus 100 accepts an input of "quantifier information" described in the first to the fourth embodiments. Then, the quantifier information generation unit 41 determines a variable (a variable included in the set varBi in step S124 of FIG. 32) for an evaluation axis, and a variable (a variable included in the set varCi in step S126 of FIG. 32) to which an existential quantifier (∃) is to be assigned (a variable included in the set varCi in step S126 of FIG. 32).

As described above, also, by referencing quantifier information input with the method described in the first to the fourth embodiments, information Qi for assigning a quantifier can be generated similarly to the fifth to the ninth embodiments. Accordingly, also, when a configuration in which the above described first to fourth embodiments are incorporated in the fifth to ninth embodiments is employed, an analysis similar to that of the fifth to the ninth embodiments can be performed, whereby similar effects can be achieved.

The energy analysis apparatus 100 illustrated in FIGS. 1 and 21 can be configured, for example, by using an information processing device (computer) illustrated in FIG. 52. The information processing device illustrated in FIG. 52 includes a CPU (Central Processing Unit) 1001, memory 1002, an input device 1003, an output device 1004, an external storage device 1005, a medium driving device 1006 and a network connection device 1007. These components are interconnected by a bus 1008.

The memory 1002 includes, for example, a ROM (read only memory), a RAM (random access memory) and the like, and stores a program and data that are used for processes. The CPU 1001 executes needed processes by executing the program with the use of the memory 1002.

The storage device 3 illustrated in FIGS. 1 and 21 corresponds to the memory 1002. The plant information input unit 1, the quantifier information input unit 2, the first-order predicate logical expression generation unit 4, the quantifier elimination unit 5, the analysis condition input unit 2' and the visualization unit 6 correspond to functions implemented by executing the program stored in the memory 1002.

The input device 1003 is, for example, a keyboard, a pointing device, a touch panel or the like, and is used to input an instruction or information from a user. The output device 1004 is, for example, a display, a printer, a speaker or the like, and is used to output a process result and the like.

The external storage device 1005 is, for example, a magnetic disk device, an optical disk device, a magneto-optical disk device, a tape device or the like. The information processing device stores the above described program and data in the external storage device 1005, and uses the program and the data by loading them into the memory 1002 when needed.

The medium driving device 1006 drives a portable recording medium 1009, and accesses content recorded on the medium 1009. The portable recording medium 1009 is an arbitrary computer-readable recording medium such as a memory card, a flexible disk, a CD-ROM (compact disk read only memory), an optical disk, a magneto-optical disk or the like. A user stores the above described program and data onto the recording medium 1009, and uses the program and the data by loading them into the memory 1002 when needed.

The network connection device 1007 is connected to an arbitrary communication network such as a LAN (local area network), the Internet or the like, and performs a data conversion accompanying a communication. The information processing device receives the above described program and data from an external device via the network connection device 1007, and uses the program and the data by loading them into the memory 1002 when needed.

Figure 53:
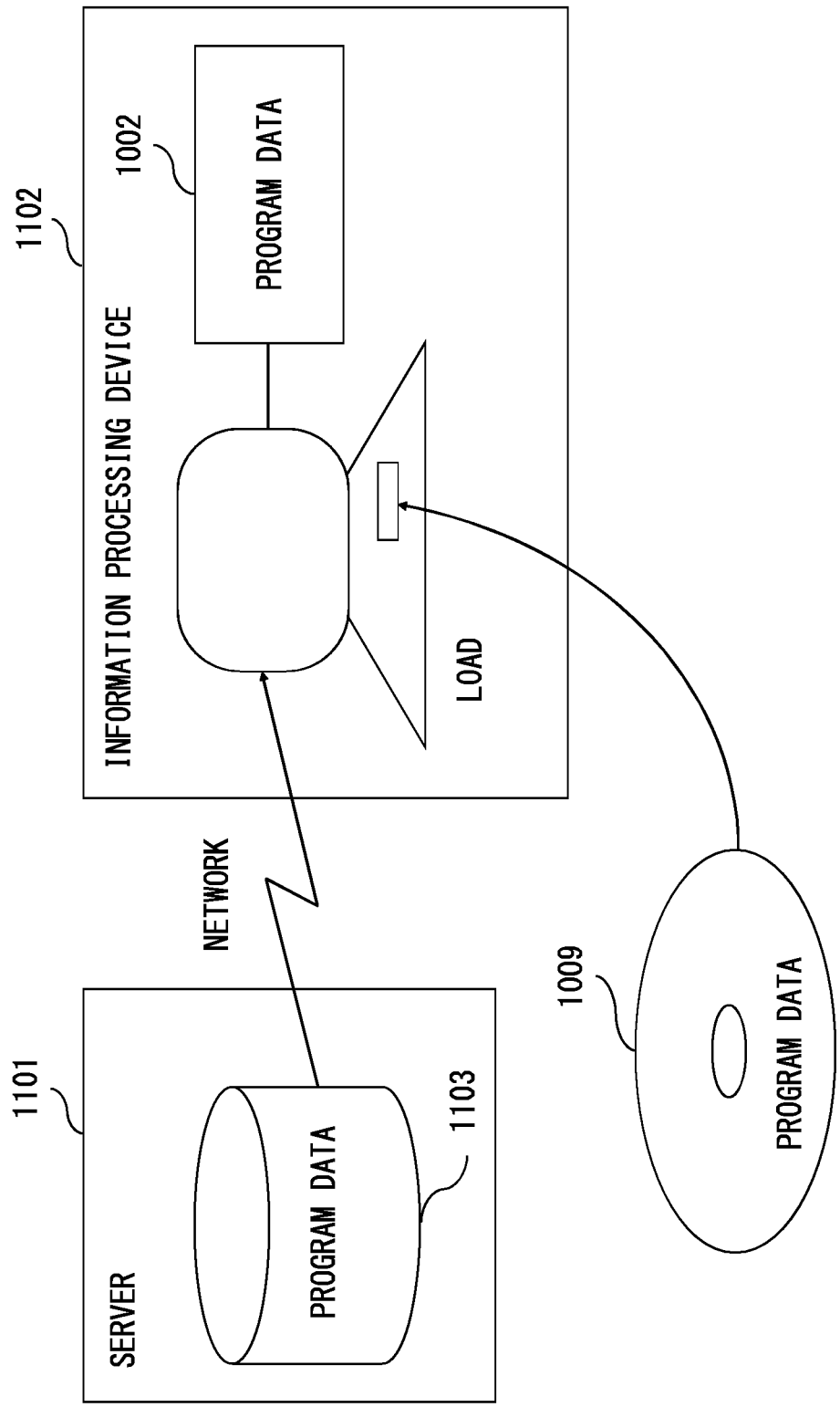
FIG. 53 illustrates recording media.

FIG. 53 illustrates computer-readable recording media that can provide a program and data to the information processing device illustrated in FIG. 52. The program and the data stored onto the portable recording medium 1009 or in a database 1103 of a server 1101 are loaded into the memory 1002 of the information processing device 1102. The server 1101 generates a carrier signal for carrying the program and the data, and transmits the generated signal to the information processing device 1102 via an arbitrary transmission medium in a network. The CPU 1001 executes needed processes by executing the program with the use of the data.

The present invention can support various cases of plant evaluations of a user, and an energy analysis based on a first-order predicate logical expression that is generally regarded as being difficult can be easily performed.

The present invention is not limited to the above described embodiments, and can be embodied by modifying components within a scope that does not depart from the gist of the present invention in a practical phase. Moreover, various inventions can be formed by suitably combining the plurality of components disclosed in the above described embodiments. For example, all the components referred to in the embodiment may be suitably combined. Additionally, the components in the different embodiments may be suitably combined. Such various modifications and applications can be performed within a scope that does not depart from the gist of the present invention, as a matter of course.

What is claimed is:

1. An energy analysis apparatus that analyzes behaviors of a plant, the apparatus comprising:
 a processor coupled with a memory device and configured to execute instructions to provide
  a plant information input unit for accepting inputs of device information indicating device models configuring the plant, and
  connection information indicating connection between the device models;
 a plant analysis condition input unit for accepting an input of a plant analysis condition;
 a first-order predicate logical expression generation unit for generating a first-order predicate logical expression on the basis of the device information, the connection information and the plant analysis condition; and
 a quantifier elimination unit for generating an equivalent logical expression having no quantifiers, wherein
 the plant analysis condition input unit accepts an input of quantifier information associated with a type of a quantifier to be assigned, for each variable included in the device information, the plant information input unit accepts, as an input thereof, a mathematical expression in a form of an equation, an inequality or a logical expression, which represents the device information, the plant information input unit further accepts a running/stopping state indicating any of a continuously running state, a continuously stopping state, and a switchable state between the continuously running state and the continuously stopping state, a conditional expression of the continuously running state and a conditional expression of the continuously stopping state, the first-order predicate logical expression generation unit generates the first-order predicate logical expression by using a conditional expression according to the set running/stopping state, the plant analysis condition input unit accepts, as part of the quantifier information, an input of an elimination priority indicating a priority level for eliminating a quantifier for said each variable included in the device information, the first-order predicate logical expression generation unit generates a first-order predicate logical expression in accordance with the elimination priority, and the quantifier elimination unit
   obtains a logical expression by eliminating the quantifier in accordance with the elimination priority, by applying a quantifier elimination algorithm to the first-order predicate logical expression, and
   outputs, to the first-order predicate logical expression generation unit, the obtained logical expression, the first-order predicate logical expression generation unit ascertaining a quantifier having a subsequent highest priority using the logical expression, and operating repeatedly with the quantifier elimination unit until no more quantifiers are included in the first-order predicate logical expression generated therein.

2. The energy analysis apparatus according to claim 1, wherein the processor is configured to execute the instructions to further provide:
   a quantifier elimination unit for generating an output logical expression having no quantifiers by applying a quantifier elimination algorithm to the first-order predicate logical expression; and
   a visualization unit for generating an image from the output logical expression.

3. The energy analysis apparatus according to claim 2, wherein
   the plant analysis condition input unit accepts an input of an evaluation axis for evaluating the plant as the plant analysis condition.

4. The energy analysis apparatus according to claim 2, wherein
   the plant analysis condition input unit accepts inputs of two axes as evaluation axes for evaluating the plant, and
   the visualization unit generates a two-dimensional graph image corresponding to the two axes.

5. The energy analysis apparatus according to claim 2, wherein
   the plant analysis condition input unit accepts an input of a running or a stopping state of a device that configures the plant, or a used or unused state as the plant analysis condition.

6. The energy analysis apparatus according to claim 2, wherein
   the plant analysis condition input unit accepts, as the plant analysis condition, an input of a variable among information input via the plant information input unit, and an input of a value to be substituted for the variable.

7. The energy analysis apparatus according to claim 2, wherein when two or more plant analysis conditions are designated,
   the quantifier elimination unit generates two or more output logical expressions that respectively correspond to the designated two or more plant analysis conditions, and
   the visualization unit generates the image from the two or more output logical expressions.

8. The energy analysis apparatus according to claim 2, wherein when two or more plant analysis conditions are designated,
   the quantifier elimination unit generates two or more output logical expressions that respectively correspond to the designated two or more plant analysis conditions, and
   the visualization unit generates a plurality of individual images from the two or more output logical expressions.

9. The energy analysis apparatus according to claim 2, wherein when a specified trigger caused by a time setting, an external signal or a user operation is applied,
   the plant analysis condition input unit sets a new plant analysis condition on the basis of information collected from the plant,
   the first-order predicate logical expression generation unit recalculates the first-order predicate logical expression in accordance with the newly set analysis condition,
   the quantifier elimination unit recalculates the output logical expression for the first-order predicate logical expression generated with the recalculation, and
   the visualization unit updates the generated image.

10. The energy analysis apparatus according to claim 2, wherein the processor is configured to execute the instructions to further provide
   a plant configuration display unit for displaying a device configuration of the plant, wherein
   the plant information input unit accepts the device information and the connection information via the device configuration of the plant displayed on the plant configuration display unit, and stores the accepted device information and connection information in a storage unit.

11. The energy analysis apparatus according to claim 1, wherein the processor is configured to execute the instructions to further provide a storage unit for storing the device information, the connection information and the quantifier information, which are inputs via the plant information input unit and the plant analysis condition input unit, wherein
   the plant information input unit accepts an addition or a deletion of the device information and the connection information to or from the storage unit, or a change in the information already stored in the storage unit.

12. The energy analysis apparatus according to claim 11, wherein the processor is configured to execute the instructions to further provide a plant configuration display unit for visually displaying a device configuration of the plant, wherein
   the plant information input unit accepts the device information and the connection information, which are inputs via the device configuration of the plant displayed on the plant configuration display unit, and the storage unit stores the accepted device information and connection information.

13. A non-transitory recording medium on which a program is stored for causing an information processing device to execute an energy analysis process for analyzing behaviors of a plant, the program comprising:

instructions to accept inputs of device information indicating device models configuring the plant, and connection information indicating connection between the device models;

instructions to accept an input of a plant analysis condition;

instructions to accept an input of quantifier information associated with a type of a quantifier to be assigned, for each variable included in the device information;

instructions to store the input device information, the connection information and the plant analysis condition;

instructions to generate a first-order predicate logical expression on the basis of the stored device information, connection information and plant analysis condition, and instructions to generate an equivalent logical expression having no quantifiers, wherein the instructions to accept the inputs of device information include instructions to accept, as an input thereof, a mathematical expression in a form of an equation, an inequality or a logical expression, which represents the device information, and instructions to accept a running/stopping state indicating any of a continuously running state, a continuously stopping state, and a switchable state between the continuously running state and the continuously stopping state, a conditional expression of the continuously running state and a conditional expression of the continuously stopping state, the instructions to generate the first-order predicate logical expression include instructions to generate the first-order predicate logical expression using a conditional expression according to the set running/stopping state, the instructions to accept the input of the quantifier information include instructions to accept, as part of the quantifier information, an input of an elimination priority indicating a priority level for eliminating a quantifier for said each variable included in the device information, the instructions to generate the first-order predicate logical expression further include instructions to generate a first-order predicate logical expression in accordance with the elimination priority, the instructions to generate the equivalent logical expression having no quantifiers include instructions to obtain a logical expression by eliminating the quantifier in accordance with the elimination priority, by applying a quantifier elimination algorithm to the first-order predicate logical expression, and instructions to output the obtained logical expression, and the instructions to generate the first-order predicate logical expression further include instructions to ascertain a quantifier having a subsequent highest priority using the logical expression, and to operate repeatedly until no more quantifiers are included in the first-order predicate logical expression generated therein.

14. An energy analysis apparatus for analyzing behaviors of a plant, the apparatus comprising:

a processor coupled with a memory device and configured to execute instructions to provide a plant information input unit for accepting inputs of device information indicating device models configuring the plant, and connection information indicating connection between the device models, the device information including at least one variable;

a quantifier information input unit for accepting an input of quantifier information associated with a type of a quantifier for each variable included in the device information;

a storage unit for storing the device information, the accepted connection information and the accepted quantifier information;

a first-order predicate logical expression generation unit for generating a first-order predicate logical expression on the basis of the device information, the connection information and the quantifier information, which are read from the storage unit; and a quantifier elimination unit for generating an equivalent logical expression having no quantifiers, wherein the plant information input unit accepts, as an input thereof, a mathematical expression in a form of an equation, an inequality or a logical expression, which represents the device information, the plant information input unit further accepts a running/stopping state indicating any of a continuously running state, a continuously stopping state, and a switchable state between the continuously running state and the continuously stopping state, a conditional expression of the continuously running state and a conditional expression of the continuously stopping state, the first-order predicate logical expression generation unit generates the first-order predicate logical expression by using a conditional expression according to the set running/stopping state, the quantifier information input unit accepts, as part of the quantifier information, an input of an elimination priority indicating a priority level for eliminating a quantifier for said each variable included in the device information, the first-order predicate logical expression generation unit generates a first-order predicate logical expression in accordance with the elimination priority, and the quantifier elimination unit obtains a logical expression by eliminating the quantifier in accordance with the elimination priority, by applying a quantifier elimination algorithm to the first-order predicate logical expression, and outputs, to the first-order predicate logical expression generation unit, the obtained logical expression, the first-order predicate logical expression generation unit ascertaining a quantifier having a subsequent highest priority using the logical expression, and operating repeatedly with the quantifier elimination unit until no more quantifiers are included in the first-order predicate logical expression generated therein.

15. A non-transitory recording medium on which a program is stored for causing an information processing device to execute an energy analysis process for analyzing behaviors of a plant, the program comprising:

instructions to accept inputs of device information indicating device models configuring the plant, and connection information indicating connection between the device models, the device information including at least one variable;

instructions to accept an input of quantifier information associated with a type of a quantifier for each variable included in the device information;

instructions to store the input device information, the connection information and the quantifier information;

instructions to generate a first-order predicate logical expression on the basis of the stored device information, connection information and quantifier information; and instructions to generate an equivalent logical expression having no quantifiers, wherein the instructions to accept the inputs of device information include instructions to accept, as an input thereof, a mathematical expression in a form of an equation, an inequality or a logical expression, which represents the device information, and instructions to accept a running/stopping state indicating any of a continuously running state, a continuously stopping state, and a switchable state between the continuously running state and the continuously stopping state, a conditional expression of the continuously running state and a conditional expression of the continuously stopping state, the instructions to generate the first-order predicate logical expression include instructions to generate the first-order predicate logical expression using a conditional expression according to the set running/stopping state, the instructions to accept the input of the quantifier information include instructions to accept, as part of the quantifier information, an input of an elimination priority indicating a priority level for eliminating a quantifier for said each variable included in the device information, the instructions to generate the first-order predicate logical expression further include instructions to generate a first-order predicate logical expression in accordance with the elimination priority, the instructions to generate the equivalent logical expression having no quantifiers include instructions to obtain a logical expression by eliminating the quantifier in accordance with the elimination priority, by applying a quantifier elimination algorithm to the first-order predicate logical expression, and instructions to output the obtained logical expression, and the instructions to generate the first-order predicate logical expression further include instruction to ascertain a quantifier having a subsequent highest priority using the logical expression, and to operate repeatedly until no more quantifiers are included in the first-order predicate logical expression generated therein.

* * * * *